(12) United States Patent
Arnold et al.

(10) Patent No.: US 11,461,428 B2
(45) Date of Patent: Oct. 4, 2022

(54) INTELLIGENTLY GENERATING AND MANAGING THIRD-PARTY SOURCES WITHIN A CONTEXTUAL HUB

(71) Applicant: Dropbox, Inc., San Francisco, CA (US)

(72) Inventors: Hudson Arnold, San Francisco, CA (US); Thomas Kleinpeter, Kirkland, WA (US); Terrence McArdle, New York, NY (US); Kristoffer Mendoza, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/937,092

(22) Filed: Jul. 23, 2020

(65) Prior Publication Data
US 2021/0382950 A1     Dec. 9, 2021

Related U.S. Application Data

(60) Provisional application No. 63/036,402, filed on Jun. 8, 2020.

(51) Int. Cl.
*G06F 17/00*     (2019.01)
*G06F 16/957*    (2019.01)
(Continued)

(52) U.S. Cl.
CPC ............ *G06F 16/957* (2019.01); *G06F 9/451* (2018.02); *G06F 16/954* (2019.01);
(Continued)

(58) Field of Classification Search
CPC ...... G06F 16/97; G06F 16/958; G06F 16/954; G06F 16/9562; G06F 16/9558;
(Continued)

(56) References Cited

U.S. PATENT DOCUMENTS 6,427,175 B1   7/2002   Khan et al.
6,584,466 B1   6/2003   Serbinis et al.
(Continued)

FOREIGN PATENT DOCUMENTS

WO   WO-2008043182 A1   4/2008
WO   WO-2014005231 A    1/2014

OTHER PUBLICATIONS

Drive4ik, "Simple Tab Groups," Retrieved from URL:https://addons.mozilla.org/en-US/firefox/addon/simple-tab-groups/ on Jun. 25, 2020, 5 pages.

(Continued)

*Primary Examiner* — Laurie A Ries
(74) *Attorney, Agent, or Firm* — Keller Preece PLLC

(57) ABSTRACT

The present disclosure is directed toward systems, methods, and non-transitory computer readable media for generating contextual hubs for organizing and presenting web-accessible content from third-party sources. In particular, the systems described herein can organize and manage within a contextual hub. For instance, the disclosed systems may perform actions on tabs based on analyzing usage signals associated with the tabs. Furthermore, the disclosed systems can organize contextually related content within contextual hubs. The disclosed systems may also facilitate collaboration between users within a contextual hub by synchronizing interactions with content within a contextual hub.

20 Claims, 39 Drawing Sheets

(51) Int. Cl.
*G06F 16/954* (2019.01)
*H04L 67/125* (2022.01)
*G06F 16/958* (2019.01)
*G06F 16/955* (2019.01)
*G06F 9/451* (2018.01)
*G06N 20/00* (2019.01)
*G06N 5/04* (2006.01)
*H04L 67/50* (2022.01)
*G06F 3/0481* (2022.01)

(52) U.S. Cl.
CPC ........ *G06F 16/958* (2019.01); *G06F 16/9558* (2019.01); *G06F 16/9562* (2019.01); *G06N 5/04* (2013.01); *G06N 20/00* (2019.01); *H04L 67/125* (2013.01); *H04L 67/535* (2022.05); *G06F 3/0481* (2013.01)

(58) Field of Classification Search
CPC ...... G06F 9/451; G06F 3/0481; G06F 3/0483; H04L 67/22; H04L 67/02; H04L 67/125; G06N 5/04; G06N 20/00
See application file for complete search history.

(56) References Cited

U.S. PATENT DOCUMENTS

| | | | |
|---|---|---|---|
| 6,801,909 B2 | 10/2004 | Delgado et al. | |
| 7,370,269 B1 | 5/2008 | Prabhu et al. | |
| 7,673,233 B2* | 3/2010 | Moore | G06F 16/957 715/246 |
| 8,146,010 B2 | 3/2012 | Scott et al. | |
| 8,166,028 B1 | 4/2012 | Reynar et al. | |
| 8,191,007 B1* | 5/2012 | Veloz, III | G06F 16/957 |
| 8,341,519 B1* | 12/2012 | Warr | G06F 3/0483 715/243 |
| 8,473,532 B1 | 6/2013 | Ben | |
| 8,635,220 B2 | 1/2014 | Garthwaite et al. | |
| 8,656,286 B2 | 2/2014 | Convertino et al. | |
| 8,996,629 B1 | 3/2015 | Datar et al. | |
| 9,002,924 B2 | 4/2015 | Saretto et al. | |
| 9,176,639 B1* | 11/2015 | Barros | G06F 3/0483 |
| 9,354,767 B2* | 5/2016 | Cruz Moreno | G06F 3/0483 |
| 9,569,412 B1* | 2/2017 | Broomhall | G06F 16/957 |
| 9,704,137 B2 | 7/2017 | Berger et al. | |
| 9,881,096 B1* | 1/2018 | Warr | G06F 16/954 |
| 9,978,040 B2 | 5/2018 | Lee et al. | |
| 10,007,729 B1 | 6/2018 | Reed et al. | |
| 10,223,458 B1 | 3/2019 | Decker et al. | |
| 10,564,814 B2* | 2/2020 | Fang | G06F 16/957 |
| 2004/0088315 A1 | 5/2004 | Elder et al. | |
| 2004/0088332 A1 | 5/2004 | Lee et al. | |
| 2005/0022132 A1 | 1/2005 | Herzberg et al. | |
| 2005/0223068 A1 | 10/2005 | Shohfi et al. | |
| 2006/0031346 A1 | 2/2006 | Zheng et al. | |
| 2007/0124208 A1 | 5/2007 | Schachter et al. | |
| 2007/0180381 A1 | 8/2007 | Rice et al. | |
| 2008/0065237 A1 | 3/2008 | Long | |
| 2008/0282198 A1 | 11/2008 | Brooks et al. | |
| 2008/0301562 A1* | 12/2008 | Berger | G06F 16/958 715/733 |
| 2009/0083338 A1 | 3/2009 | Evans et al. | |
| 2009/0094329 A1 | 4/2009 | Ambati et al. | |
| 2009/0150417 A1 | 6/2009 | Ghods et al. | |
| 2009/0307604 A1 | 12/2009 | Giles et al. | |
| 2010/0005402 A1 | 1/2010 | George et al. | |
| 2011/0276889 A1 | 11/2011 | Boshernitzan | |
| 2012/0117484 A1 | 5/2012 | Convertino et al. | |
| 2012/0131485 A1 | 5/2012 | Svendsen et al. | |
| 2012/0137316 A1 | 5/2012 | Elizarov et al. | |
| 2012/0192064 A1 | 7/2012 | Antebi et al. | |
| 2012/0192086 A1 | 7/2012 | Ghods et al. | |
| 2013/0125051 A1 | 5/2013 | Kelley et al. | |
| 2013/0173720 A1* | 7/2013 | Vasudev | H04L 67/141 709/206 |
| 2014/0026025 A1 | 1/2014 | Smith | |
| 2014/0099622 A1 | 4/2014 | Arnold et al. | |
| 2014/0149436 A1 | 5/2014 | Bahrami et al. | |
| 2014/0214919 A1* | 7/2014 | Taylor | H04L 67/28 709/203 |
| 2014/0245141 A1 | 8/2014 | Yeh et al. | |
| 2016/0112476 A1 | 4/2016 | Gudipaty et al. | |
| 2016/0139750 A1* | 5/2016 | Barrus | G06F 3/0483 715/777 |
| 2016/0147946 A1* | 5/2016 | Von Reden | G16H 10/60 705/3 |
| 2016/0358490 A1 | 12/2016 | Etzioni et al. | |
| 2017/0039172 A1* | 2/2017 | Broomhall | G06F 3/0483 |
| 2017/0199638 A1* | 7/2017 | Bhupatiraju | G06F 16/9577 |
| 2017/0293419 A1* | 10/2017 | Dipin | G06F 3/04842 |
| 2017/0371842 A1* | 12/2017 | Brunn | G06F 40/106 |
| 2018/0225388 A1* | 8/2018 | Bhupatiraju | G06F 16/9577 |
| 2018/0307390 A1* | 10/2018 | Fang | G06F 9/44 |
| 2019/0182343 A1* | 6/2019 | Lodha | H04L 67/10 |
| 2019/0258666 A1* | 8/2019 | Crimins | H04L 67/02 |
| 2019/0286683 A1* | 9/2019 | Kittur | G06F 16/9537 |
| 2020/0007677 A1 | 1/2020 | Bjontegard | |
| 2020/0042567 A1* | 2/2020 | Birch | G06F 16/954 |
| 2020/0145239 A1 | 5/2020 | Ghods et al. | |
| 2020/0234306 A1* | 7/2020 | Turgeman | G06Q 20/321 |
| 2020/0387271 A1* | 12/2020 | Andrew | G06F 16/957 |
| 2020/0394234 A1* | 12/2020 | Chikkala | G06F 3/0483 |

OTHER PUBLICATIONS

Kumar K. et al., "Segregating User Data by Tabs in Web Browsers," IEEE Asia Pacific Conference on Wireless and Mobile, Retrieved from https://73001066-a-62cb3a1a-s-sites.googlegroups.com/site/joyboseroy/APWiMob.pdf?attachauth=ANoY7cpH4cg8UUdmhCWH6ecG5nnnSLyy2qxw13N_PmzkP6d1Xi7YlqGpfXA6fA7tBEyo7vzFJ9MKdAmq9xlpHtMaFik2KmRTyPdOEn2F_Rya6T1e_kQ5BOhQbZsBFomAK5GSXa9XMFIIcitKJTojcDOCLepUosrlbUnuF5zEkUtzcDWh_46kONnnb3Wc9h19baP59IMTgHSHQEO3H7vslQqPaeT1DA%3D%3D&attredirects=0, Jul. 2014, 6 pages.

Perez S. "Google Chrome will finally help you Organize your Tabs," Retrieved from https://techcrunch.com/2020/05/13/google-chrome-will-finally-help-you-Organize-your-Tabs, May 13, 2020, 4 pages.

Non-Final Office Action from U.S. Appl. No. 16/937,208, dated Jan. 1, 2021, 20 pages.

Final Office Action from U.S. Appl. No. 16/937,208, dated May 6, 2021, 22 pages.

International Search Report and Written Opinion for PCT Application No. PCT/US2021/014909 dated Mar. 24, 2021, 10 pages.

Fuller J., "How Delicious Works," from HowStuffWorks web site, archived (2017) (WayBack Machine), 12 pages.

Non-Final Office Action from U.S. Appl. No. 16/937,208, dated Sep. 2, 2021, 27 pages.

Wikipedia, "Delicious," Retrieved from the internet: https://en.wikipedia.org/wiki/Delicious on Aug. 27, 2021, 6 pages.

Wikipedia, "Social Bookmarking," Retrieved from the Internet https://en.wikipedia.org/wiki/Social_bookmarking, on Aug. 27, 2021, 7 pages.

Benz D., et al., "The Social Bookmark and Publication Management System: Bibsonomy," 2010, The VLDB Journal 19, pp. 849-875.

Final Office Action from U.S. Appl. No. 16/937,208, dated Jan. 18, 2022, 23 pages.

Hammond T., et al., "Social Bookmarking Tools (I), A General Review," Apr. 2005, D-Lib Magazine, vol. 11 (4), 22 pages.

Hotho A., et al., "BibSonomy: A Social Bookmark and Publication Sharing System," 2006, 16 pages.

Keller R.M., et al., "A Bookmarking Service for Organizing and Sharing URLs," 1997, Computer Networks and ISDN Systems 29, pp. 1103-1114.

Lund B., et al., "Social Bookmarking Tools (II), A Case Study—Connotea," Apr. 2005, D-Lib Magazine, vol. 11 (4), 14 pages.

* cited by examiner

INTELLIGENTLY GENERATING AND MANAGING THIRD-PARTY SOURCES WITHIN A CONTEXTUAL HUB

RELATED APPLICATIONS

This application claims priority to U.S. Provisional Patent Application No. 63/036,402 to Arnold, et al., filed on Jun. 8, 2020, the entirety of which is incorporated herein by reference.

BACKGROUND

Recent years have seen significant advancements in hardware and software platforms that improve web search, browsing, and communication. As web-based functionalities such as messaging, content sharing, browsing, and searches continue to increase, many conventional web browsing systems offer ways of organizing web content. For example, many conventional web browsing systems offer tabbed browsing by which a user may switch between web pages corresponding to different tabs within a single window.

Despite these advances, however, conventional systems suffer from several technological shortcomings that result in inaccurate, inefficient, and inflexible operation. For example, conventional systems often haphazardly and inaccurately organize web browsing windows and tabs. In particular, although conventional systems often offer tabbed browsing functionalities, many conventional systems rely on user to manage web browsing tabs and windows and require users to manually open new tabs, close tabs no longer needed, or group tabs within different browser windows. However, with the nature of web browsing and the large number of web sources that a user may typically access, the result of a user managing their own tabs is often a single browser window that includes are large number of randomly ordered tabs that are difficult to navigate and make it difficult for a user to locate specific web sources and content. Thus, conventional systems of managing a user's interaction with web sources are often inaccurate because they obscure meaningful organization.

Similar to the above-discussed disadvantages, conventional systems are often inefficient. Because conventional systems often fail to surface web browsing tabs in a meaningful way, conventional systems frequently present duplicate tabs and/or otherwise unnecessary tabs. For example, users often lose track of content within web browsing tabs and windows as the inefficiency of conventional systems often make it easier for a user to continue to open new tabs and windows rather than to try and locate a previously opened tab that includes the content the user wishes to access. Thus, conventional web browsing systems must often dedicate computational resources associated with keeping multiple tabs open and active even though the many of the tabs contain duplicate or irrelevant content.

Furthermore, conventional web browsing systems often inefficiently display web browsing tabs and windows. In particular, especially if one or more web browsing windows contain multiple tabs, conventional systems often require users to click through multiple tabs and/or windows to identify the desired web content. For instance, in order to fit more tabs within a window, conventional web browsing systems often shorten tab labels to the point where a user must select and view the contents of individual tabs in order to know what content is associated with a particular tab, which results in a user having to often select multiple tabs to locate desired content. Conventional web browsing systems also often present cumbersome user interfaces for performing actions on windows and tabs. For instance, to move a tab from one window to another, conventional systems often require users to open the first window, select the tab, open the second window, and move the tab to the second window. Thus, conventional web browsing systems often present inefficient user interfaces for displaying and performing operations on web browsing tabs and windows.

Furthermore, conventional web browsing systems are often inflexible. Conventional web browsing systems are often unable to keep up with the increasing complexity of and interactions between web-based sources. For example, conventional web browsing systems are often constrained to access capabilities of a single web source within a single tab. Accordingly, conventional systems do now allow users to view and/or perform actions with respect to multiple web-based sources in an efficient manner. Rather, conventional systems included a browsing structure that is specifically designed to isolate each individual web source from other web sources. For instance, in order to search multiple web sources for a single search term, conventional systems often force the user to separately access and initiate a separate search within each individual tab.

In addition, just as conventional web browsing systems isolate individual web sources for a user, conventional web browsing systems often isolate individual users from one another with respect to the web browsing experience. Although conventional systems may allow users to access a specific web source (e.g., an online email or messaging system) to communicate via the internet, conventional browsing systems are otherwise limited in allowing user collaboration across other web sources. Indeed, conventional systems are user-centric and force users to access separate communications applications or systems to even share a link to a web source with another user. This user-centric disadvantage results in an inefficient user experience that causes a user to constantly be switching between multiple applications and or multiple tabs with multiple steps to attempt to collaborate with other users with respect to web content.

These, along with additional problems and issues, exist with regard to conventional web browsing systems.

SUMMARY

One or more embodiments described herein provide benefits and/or solve one or more of the foregoing or other problems in the art with systems, methods, and non-transitory computer readable storage media that organize and manage third-party sources (e.g., web-accessible content) within one or more contextual hubs dedicated to a particular team, project, or theme. For example, a contextual hub is a digital space that includes a graphical user interface and graphical user experience to access, organize, and manage web-accessible sources associated with the contextual hub (e.g., a specialized web browsing application or an extension program that runs on a web browser can provide a contextual hub).

In particular, the disclosed systems manage third-party sources associated with a contextual hub by monitoring and analyzing usage signals associated with the third-party sources to determine an action to perform relative to a particular third-party source. For example, in one or more embodiments, the disclosed systems can organize and manage tabs corresponding to different third-party sources within a contextual hub. To illustrate, the disclosed systems can monitor and analyze usage signals associated with a tab within a contextual hub to determine an action to automatically perform with respect to the tab (e.g., such as closing a tab within the contextual hub or adding a tab to a contextual hub).

The disclosed systems can also intelligently organize content from separate third-party sources within one or more contextual hubs. For instance, disclosed systems may behave like a smart filter to automatically provide select third-party source content relevant to a specific contextual hub. More specifically, the disclosed systems may provide a contextual hub associated with multiple web-accessible third-party sources. The disclosed systems may generate a contextual model for the contextual hub based at least in part on contextual information associated with the third-party sources. The disclosed systems can then identify, using the generated contextual model, related information from a third-party source and add a link to the related information to the contextual hub (e.g., a link to a related email or instant message from a third-party email system). Accordingly, the disclosed systems select specific information from a third-party source that is relevant to a project, team, or theme of a contextual hub, and provide a link to the specific information directly within the contextual hub interface.

Furthermore, the disclosed systems enable multiple users to collaborate on web-accessible third-party content regardless of the source. In particular the disclosed systems can associate multiple users with a contextual hub that contains various third-party sources. The contextual hub allows the users to collaborate on third-party content. For example, the contextual hub allows users to leave comments on third-party web sources that are viewable to members of a contextual hub. As another example, based on determining that one user has interacted with third-party content (e.g., a third-party web page), the disclosed systems can send notifications, to client devices of collaborating users associated with the contextual hub, that indicate the user's interaction with the third-party content. For example, the disclosed systems can provide, for display within the contextual hub, a notification indicating a "seen status" that indicates whether a particular user has viewed specific third-party content. Moreover, the contextual hub can provide a shared browsing experience that links the browsing experience of two different users to allow the users to remotely browse third-party content in a collaborative manner.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
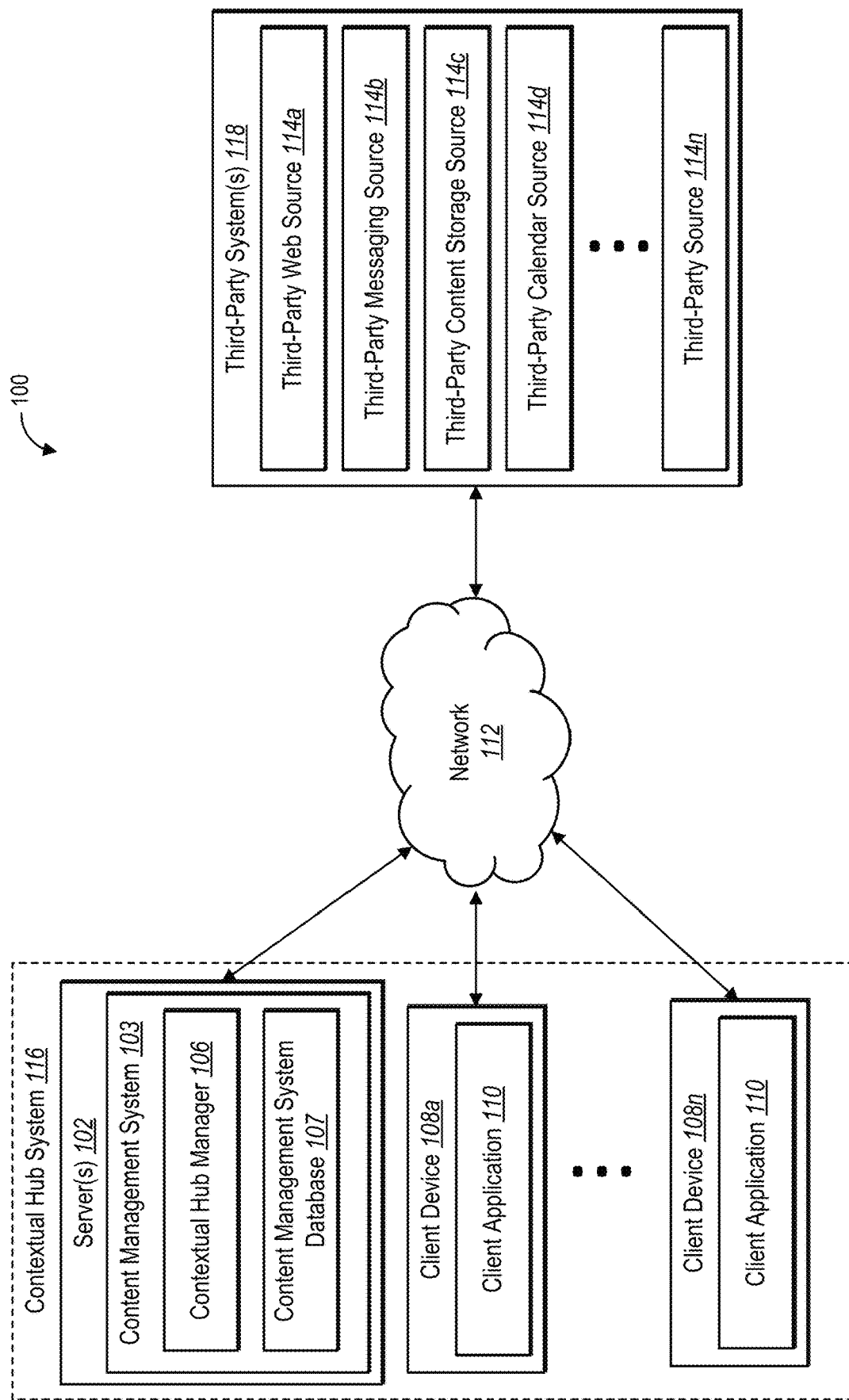
FIG. 1 illustrates an example environment within which a contextual hub system can operate in accordance with one or more embodiments.

One or more embodiments described herein include a contextual hub system that can organize and manage web-accessible third-party content from various sources within contextual hub interfaces that are dedicated to a particular group of users, a particular project, and/or a particular theme. For example, the contextual hub system can organize related content from different third-party sources within a single digital interface. Furthermore, the contextual hub system can organize and manage content within the digital space by analyzing usage signals and perform actions with respect to the content based on the usage signals. Additionally, the contextual hub system can access various third-party sources, retrieve select content from a third-party source, and intelligently organize the select content within the contextual hub management interface. Furthermore, the contextual hub system enables efficient and intuitive collaboration between users with respect to third-party content within the digital space.

Overview of Tab Organization and Management within Contextual Hubs

As part of facilitating the organization and management of web-accessible third-party sources, the contextual hub system can generate and present a contextual hub management graphical user interface that includes a tab associated with each third-party source associated with a contextual hub. The contextual hub management graphical user interface can include an organized set of links corresponding to the tabs within a contextual hub to allow a user to quickly and efficiently navigate to different third-party sources within a contextual hub. In addition, the contextual hub management graphical user interface can include links to different contextual hubs associated with different teams, projects, and/or themes to allow a user to quickly and efficiently navigate to a different set or group of third-party sources corresponding to different teams, projects, and/or themes.

Additionally, and as just mentioned, a contextual hub includes a number of tabs each associated with a third-party source. By way of association of the third-party sources with a contextual hub, the contextual hub system can facilitate targeted searching within only the third-party sources associated with a context hub. For example, the contextual hub system can provide a search bar within the contextual hub management graphical user interface within which a user can input a search term. In response to receiving a search term, the contextual hub system performs a focused search of the third-party sources associated with the contextual hub to provide one or more focused search results from the third-party sources associated with the contextual hub. Accordingly, the contextual hub system provides a unique, novel, and efficient system of searching only relevant web-accessible third-party sources (e.g., a focused search of a limited number of web-assessible sources associated with a contextual hub as compared to a general web search).

In addition to allowing a user to perform searches on contextual hubs and associated third-party sources, the contextual hub system can facilitate management of contextual hubs via the contextual hub management graphical user interface. For example, based on user interaction with various graphical user interface elements, the contextual hub system can move content from a first contextual hub to a second contextual hub by simply dragging a link from the first contextual hub to an icon associated with the second contextual hub. Thus, the contextual hub system can facilitate the viewing, access, and management of third-party sources associated with tabs within various contextual hubs.

In addition to providing tools that enable users to create and organize contextual hubs, the contextual hub system may also automatically perform actions on tabs within contextual hubs based on usage signals associated with the tabs. To illustrate, the contextual hub system can monitor usage signals associated with a tab within a contextual hub. For instance, the contextual hub system can monitor the user's view frequency, a time last accessed, the average time spent viewing, and other types of usage signals. The contextual hub system can analyze the usage signals to determine an action to perform with respect to the tab and the associated third-party source. Based on analyzing the usage signals, the contextual hub system can perform the determined action with respect to the tab. For instance, the contextual hub system might determine to automatically close a tab or suggest closing the tab, add a tab or suggest adding a tab to a contextual hub, move a tab or suggest to move a tab from a first contextual hub to a second contextual hub, as will be explained in greater detail below.

Overview of the Contextual Hub as a Content Curator

In one or more embodiments, the contextual hub system may also intelligently select and provide content from various third-party sources for display within a contextual hub. For instance, the contextual hub system may provide a contextual hub associated with multiple third-party sources. For example, third-party sources can include email sources, messaging sources, digital content item sources, and various other sources. The contextual hub system may generate a contextual model corresponding to the contextual hub based at least in part on contextual information associated with the plurality of third-party sources associated with the contextual hub. Using the contextual model, the contextual hub system can identify related information from a third-party source. Based on identifying the related information, the contextual hub system can add a link to the related information to the contextual hub management interface to allow a user to quickly and efficiently access the identified related information.

For example, the contextual hub system can utilize contextual models to determine whether content from a third-party source is contextually relevant to a contextual hub. In one or more embodiments, the contextual model can analyze content of a third-party source to identify contextually relevant information from the third-party source. For instance, instead of requiring users to open several different websites to search for emails, messages, and digital content associated with a particular project, the contextual hub system can access each of the different third-party sources (e.g., email source, message source, digital content source) to provide relevant content from those sources in a single location.

For instance, the contextual hub system can access electronic message sources (e.g., email, instant messaging, etc.)

to identify specific messages from users associated with a contextual hub or messages with content related to a contextual hub. Furthermore, the contextual hub system can access web-accessible calendars to identify specific events or meetings associated with a contextual hub. In addition, the contextual hub system can access a content management system to identify digital media items (e.g., documents, images, videos, etc.) that are relevant to a contextual hub. Accordingly, based on using a contextual model, the contextual hub system can identify relevant content from multiple third-party sources and provide links to the relevant content within a single contextual hub management graphical user interface.

The contextual hub system may also quickly and intelligently adjust parameters of contextual models. For instance, in some embodiments, the contextual model curates third-party source content by acting as a content filter. The contextual hub system can present the parameters of the content filter via the contextual hub management graphical user interface. The contextual hub system may automatically update the content within a contextual hub based on user-modified parameters of the content filter. Additionally, or alternatively, in some embodiments, the contextual model comprises a machine learning model. The contextual hub system may train parameters of the machine learning model using user input and/or training data. Thus, the machine learning model may intelligently select and sort digital content from various third-party sources into contextually relevant contextual hubs.

Overview of the Contextual Hub as a Collaboration Tool

As mentioned previously, the contextual hub system may facilitate collaboration across third-party sources between a plurality of users. To illustrate, the contextual hub system may associate a contextual hub with a group of users and a set of web-accessible sources (e.g., third-party sources). The contextual hub system can detect a user interaction with a third-party source from the set of third-party sources by a first user from the group of users. For instance, the contextual hub system can detect that the first user has added an annotation (e.g., a comment or highlight) to a source within the contextual hub. The contextual hub system can provide a notification for display within the contextual hub that indicates the user interaction.

Furthermore, the contextual hub system can provide user presence/seen functionalities with respect to third-party sources within a contextual hub. For example, the contextual hub system can provide indications within a contextual hub that a collaborating user is currently viewing a third-party source within a contextual hub. The contextual hub system may also provide notifications within a contextual hub that a particular user has not viewed or has previously viewed a third-party source. Thus, the contextual hub system can update the collaborating group of users associated with a contextual hub of user activity with respect to third-party sources in real time.

Additionally, the contextual hub system can facilitate communication between collaborators within a contextual hub. The contextual hub system can send digital messages through the use of various APIs via the contextual hub. In one example, based on detecting that a user has dragged and dropped a link to a collaborating user's avatar within a contextual hub, the contextual hub system can present options by which the contextual hub system can send the link to the collaborating user. To illustrate, the contextual hub system can send the link to the collaborating user via a third-party electronic messaging system, a third-party instant messaging system, or within the contextual hub.

Furthermore, the contextual hub system can provide real-time shared web-browsing sessions related to third-party sources and content. In particular, the contextual hub system can create a shared browsing session in which two or more collaborating users experience and interact with the same third-party source content simultaneously. For instance, the contextual hub system can monitor events reported from a first user's web browser and replicate those events in collaborating users' browsers. The contextual hub system can scale this function so that multiple collaborating users can view, in real time, the content other users are viewing and annotating.

Additionally, the contextual hub system can facilitate indexing of a private web index. Generally, web indexing comprises storing and organizing content accessed during browsing. The contextual hub system can search and identify indexed content in response to relevant queries. The contextual hub system can index the web for a specific user and also for a specified group of collaborating users. For instance, once the contextual hub system has added content to a contextual hub, the contextual hub system can search, list, and rank the content. Additionally, the contextual hub system can index content from third-party sources for individual users, groups of collaborating users, and/or entire organizations.

The contextual hub system provides several advantages over conventional systems. For example, the contextual hub system makes improvements to accuracy, efficiency, and flexibility relative to conventional systems. The contextual hub system can more accurately generate contextual hubs that contain contextually related information. The contextual hub system can utilize a contextual model to intelligently identify information from third-party sources that are related to the contextual hub. For instance, the contextual hub system can utilize the contextual model to organize content from separate third-party sources across the internet. In addition, by bringing together content from the various third-party sources, the contextual hub system can leverage additional contextual features and benefits by cross-referencing previously fragmented data in prior conventional systems. Upon determining that the information is relevant to a particular contextual hub, the contextual hub system can add the information to the contextual hub via a URL link that provides efficient and direct access to the relevant information. Thus, the contextual hub system can more accurately manage and organize third-party source content to provide relevant information in a single graphical user interface that significantly reduces the number of steps a user has to take to access relevant and related information.

Further, the contextual hub system operates more efficiently relative to conventional systems. In particular, while many conventional systems spend computing resources updating and surfacing web pages for duplicate or otherwise unnecessary tabs within a browsing window, the contextual hub system can automatically close or move idle tabs. More specifically, the contextual hub system can analyze usage signals associated with tabs within a contextual hub. Based on the usage signals, the contextual hub system can perform actions such as closing or moving tabs. Thus, the contextual hub system can reorganize or close tabs within contextual hubs to improve efficiency relative to conventional systems, reducing memory, processing, and communication usage compared to conventional systems.

Additionally, the contextual hub system provides a more efficient graphical user interface that provides content from various third-party sources. In particular, the contextual hub system can generate and provide, for display at a user device, a single graphical user interface that organizes content within one or more contextual hubs. More specifically the graphical user interface can include content from various third-party sources including messaging services, web pages, media items, in a single graphical user interface. Thus, the contextual hub system can merge, within a single graphical user interface, previously separated and difficult to organize content from separate third-party sources across the internet, regardless of the ownership or control of the third-party sources.

The contextual hub system can also improve flexibility relative to conventional systems. In particular, the contextual hub system can provide access to various third-party source functionalities from within a contextual hub. In particular, the contextual hub system can utilize a contextual model in conjunction with corresponding third-party source APIs to provide links to and/or previews of specific digital content from the third-party sources within a single location. Additionally, the contextual hub system can utilize third-party source APIs to enable a user to send messages through third-party sources from within a contextual hub, thereby significantly reducing the number of steps a user takes within a computer interface to send messages, share content, comment on content, and otherwise collaborate with other users with respect to different third-party sources.

As illustrated by the foregoing discussion, the present disclosure utilizes a variety of terms to describe features and benefits of the contextual hub system. Additional detail is now provided regarding the meaning of these terms. For example, as used herein, the term "web-accessible source" or "web-accessible content" (or simply "content") refers to a digital source or content that is accessible via the internet. Web-accessible content can refer to both third-party sources as well as internal sources. For example, the term "web-accessible third-party source" or simply "third-party source" refers to a digital source that is separate from the contextual hub system. Examples of third-party sources include third-party websites, email systems, messaging systems, calendaring systems, content management systems, data management systems, web applications, digital media management systems, or any other type of source or content accessible via the internet. In general, a third-party source is associated with or provides third-party content, examples of which are web pages, emails, other electronic messages, calendar events, digital content such as photos, videos, documents, and other digital multimedia, and other digital data associated with a particular third-party source. In contrast to third-party sources and content, the term "internal source" or "internal content" refers to a digital source that is integrated with the contextual hub system. For example, in one or more embodiments, the contextual hub system is integrated within a content management system and the contextual hub system can access and provide digital content from the content management system within a contextual hub.

As used herein, the term "contextual hub" refers to a digital space that includes contextually related web-accessible sources. In particular, the term contextual hub refers to a digital space that is associated with contextually relevant web-accessible sources and content. As mentioned above, in one or more embodiments the web-accessible content includes web-accessible third-party sources as well as internal sources to provide a cohesive management center that combines both third-party sources and internal sources of digital content. As mentioned briefly above, a contextual hub can be part of a specialized web browser or be an extension that runs on a web browser. Accordingly, the contextual hub system can provide a contextual hub within a window of a web browser that stores and displays tabs corresponding to associated third-party sources (and/or internal sources). The contextual hub system can also generate multiple contextual hubs for a single user, and thus provide the multiple contextual hubs within multiple different browser windows. In other embodiments, the contextual hub is provided via a native stand-alone application on a client device that provides the functionality and graphical user interfaces as described herein.

As used herein, the term "tab" refers to a graphic element within a contextual hub that represents a web-accessible source. For example, the term "tab" refers to a graphical control element within a contextual hub corresponding to a web-accessible source. In some embodiments a tab refers to a tab within a web browsing window. A tab can also comprise a content container that corresponds to other digital content such as a message from a digital messaging source or digital media items such as documents or images. For example, based on detecting the selection of a tab within a contextual hub, the contextual hub system can present the corresponding source or content. Additionally, a contextual hub can include multiple tabs by which a user may select to navigate between web-accessible sources.

As used herein, the term "usage signals" refers to information that indicates usage of an object or similar objects. In particular, the term "usage signals" refers to information relating to user interaction with respect to objects, sources, or content within a contextual hub. For example, usage signals include the average view frequency, time last accessed, average time spent viewing, and other information relating to a third-party source within a contextual hub. As mentioned, usage signals can also refer to information reflecting user interaction with third-party sources within a contextual hub. Furthermore, usage signals can refer to usage information relating to tabs within a contextual hub.

As used herein, the term "contextual model" refers to a model that can analyze context data of an object. In particular, a contextual model can identify contextually relevant information within a digital content item from a web-accessible source. For example, a contextual model can comprise a machine learning model trained to determine whether a digital content item from a third-party source contains information that is contextually relevant to a contextual hub. In some embodiments, a contextual model can also comprise a contextual graph (e.g., a mapping of how sources, users, and content are related), a content filter, or other type of structure that performs a contextual analysis.

As used herein, the term "contextual information" refers to data reflecting the context of an object, content, or source. In particular, contextual information relates to data associated with a source or content within a source that indicates the context of the content. For example, contextual information can be derived from metadata of content from third-party sources or by analyzing contextual features of content. In at least one embodiment, the contextual information associated with a contextual hub relates to the contextual data from each web-accessible source or content item corresponding to the contextual hub.

As used herein, the term "related information" refers to data that is related to a contextual hub. In particular, the term related information refers to content from a web-accessible source (e.g., third-party source) that is contextually related to a contextual hub. For example, related information can include an email message that contains content that is contextually relevant to the topic, team, project, or purpose of a contextual hub. Related information can also include a calendar event from a calendar source or a particular document from a content management system, for example. The following discussion provides additional examples of related information in accordance with one or more embodiments.

As used herein, the term "link" refers to a reference to data. In particular a "link" can refer to a selectable object that points to the digital location of a web-accessible source (e.g., a third-party source) or a specific content item or object within a web-accessible source. A link can be associated with a uniform resource locator and include a selectable element, such as a word, phrase, image, or other graphical object that, when selected, navigates to a web-accessible source or web-accessible content. In addition, a link can reference a contextual hub such that a user can access a contextual hub, and all corresponding web-accessible sources, with a single selection of a contextual hub link.

As used herein, the term "notification" refers to any sort of digital communication. In particular, the term "notification" can refer to a digital message, alert, or visual element that indicates information within a contextual hub. For example, a notification can include a visual element that indicates, within a contextual hub of a first user, that a second user has seen or is currently viewing a third-party source associated with a contextual hub. For example, a notification can comprise the second user's avatar displayed in conjunction with the third-party source. In general, a notification is different than an electronic message, such as an email, instant message, text message, etc. However, a notification can include an indication of a receipt of an electronic message, for example.

Contextual Hub System Overview

Additional detail regarding the contextual hub system will now be provided with reference to the figures. For example, FIG. 1 illustrates a schematic diagram of an exemplary system environment ("environment") 100 in which a contextual hub system can be implemented. As illustrated in FIG. 1, the environment 100 can include server(s) 102, client devices 108a-108n, a third-party system(s) 118, and a contextual hub system 116 connected by a network 112.

Although the environment 100 of FIG. 1 is depicted as having a particular number of components, the environment 100 can have any number of additional or alternative components (e.g., any number of servers, third-party systems, client devices, or other components in communication with the contextual hub system 116 via the network 112). Similarly, although FIG. 1 illustrates a particular arrangement of the server(s) 102, the third-party system(s) 118, the network 112, and the client devices 108a-108n, various additional arrangements are possible.

The server(s) 102, the third-party system(s) 118, the client devices 108a-108n, and the network 112 may be communicatively coupled with each other directly or indirectly (e.g., through the network 112 discussed in greater detail below in relation to FIG. 27). Moreover, the server(s) 102, the third-party system(s) 118, and the client devices 108a-108n may comprise a computing device (such as one or more computing devices as discussed in greater detail below with relation to FIG. 26).

As illustrated in FIG. 1, the environment 100 includes the contextual hub system 116. Generally, the contextual hub system 116 generates, manages, and stores data relevant to contextual hubs. For instance, the contextual hub system 116 may create contextual hubs and store data for web-accessible sources (e.g., third-party sources) associated with contextual hubs. The contextual hub system 116 also manages user data for both individual and collaborating groups of users. More specifically, the contextual hub system 116 can access, monitor, and analyze usage signals corresponding to contextual hubs and objects within contextual hubs.

FIG. 1 depicts the contextual hub system 116 located on both the contextual hub manager 106 of the server(s) 102 and on the client application 110 of the client devices 108a-108n. In some embodiments, the contextual hub system 116 may be implemented (e.g., located entirely or in part) on one or more components of the environment 100. For instance, the contextual hub system 116 may be implemented entirely (or in part) on the client devices 108a-108n. Alternatively, the contextual hub system 116 may be implemented entirely (or in part) on the server(s) 102.

In addition, in some embodiments the contextual hub system 116 is incorporated within a content management system 103, as illustrated in FIG. 1. The content management system can include a content management system database 107 that stores and manages access to digital content, such as digital files, web documents, etc. Additional details relating to the contextual hub system 116 are described below with respect to FIGS. 25A-25B. In embodiments where the contextual hub system 116 is incorporated within a content management system 103, the digital content within the content management system database 107 is considered an internal source or internal content as defined above. Accordingly, a contextual hub associated with a user can further be associated with a user account within the content management system 103 so the contextual hub system 116 can access digital content associated with the user within the content management system.

As mentioned above, the environment 100 includes the server(s) 102. The server(s) 102 can generate, store, receive, and/or transmit data relevant to contextual hubs. More specifically, server(s) 102 can store, process, and transmit web-related content. Further, the server(s) 102 can generate and store user data including user identities, contacts, search histories, and other data. Additionally, the server(s) 102 can access third-party sources. In one or more embodiments, the server(s) 102 includes a data server. The server(s) 102 can also include a communication server or a web-hosting server.

As shown in FIG. 1, the server(s) 102 include a contextual hub manager 106. Generally, the contextual hub manager 106 provides functionalities to generate, manage, share, and/or store data related to contextual hubs. For example, the contextual hub manager 106 can create a contextual hub database for each contextual hub and receive third-party sources and groups of users to associate with each contextual hub within the contextual hub database. Furthermore, the contextual hub manager 106 may connect various users via a contextual hub by linking user data. More specifically, the contextual hub manager 106 stores and updates shared contextual hubs so that collaborating users can access and modify a single shared contextual hub.

The environment 100 illustrated in FIG. 1 also includes the client devices 108a-108n. The client devices 108a-108n can generate, store, receive, and send digital data. For example, the client devices 108a-108n communicate with the server(s) 102 via the network 112. The client devices 108a-108n may comprise various types of client devices. For example, the client devices 108a-108n may include mobile devices such as laptops, tablets, mobile telephones, smartphones, etc., and non-mobile devices, such as desktop computers or other types of client devices. As mentioned, the client devices 108a-108n can store digital content items. For example, the client devices 108a-108n include hardware and software that can generate, manage, and store digital content items such as media files and other data. The client devices 108a-108n can send the digital content items to the contextual hub system 116 via the client application 110.

As further illustrated in FIG. 1, the client devices 108a-108n include the client application 110. The client application 110 may be a web application or a native application on the user client device 108 (e.g., a mobile application, a desktop application, etc.). The client application 110 can communicate with the contextual hub system 116 to provide digital data including graphical user interfaces, user interactions, contextual hubs, receive user input, and perform other operations as described herein. In some embodiments, the client application 110 may comprise a web browsing application that accesses and displays web-accessible content. The client application 110 may implement the contextual hub system 116 as part of a native application on the client devices 108a-108n. The contextual hub system 116 may operate (in part or in whole) on an extension within the client application 110. In other embodiments, the client application 110 is part of a content management system application within which a user can access a contextual hub as described herein.

Additionally, the client devices 108a-108n can communicate directly with the server(s) 102 and/or the third-party system(s) 118, bypassing the network 112. Moreover, the contextual hub system 116 can access one or more databases housed on the server(s) 102 or elsewhere in the environment 100. Further, the contextual hub system 116 can include one or more machine learning models (e.g., neural networks) which can be implemented in a variety of different ways across the server(s) 102, the network 112, and the client devices 108a-108n.

As illustrated in FIG. 1, the environment 100 also includes the third-party system(s) 118 that include third-party source and content. For instance, the contextual hub system 116 can access third-party sources and items that is not located within the server(s) 102 or the client devices 108a-108n, but rather located on the third-party system(s) 118. In one or more embodiments, the third-party system(s) 118 can be a web server, a file server, or any type of remotely accessible computing device. As illustrated in FIG. 1, the contextual hub system 116 can communicate with the third-party system(s) 118 over the network 112.

The third-party system(s) 118 can store and manage various types of data. As illustrated in FIG. 1, the third-party system(s) 118 include a third-party web source 114a, a third-party messaging source 114b, a third-party content storage source 114c, a third-party calendar source 114d, and a third-party source 114n (collectively "third-party sources 114"). The following paragraphs provide a brief overview of various types of data stored by the third-party sources 114. Although FIG. 1 illustrates the third-party sources 114 together within the third-party system(s) 118, the third-party sources 114 can be located on various and distinct third-party system(s) 118.

As illustrated in FIG. 1, the third-party system(s) 118 can comprise the third-party web source 114a. Generally, the third-party web source 114a can comprise hardware and/or software meant to display content of a web site. The third-party web source 114a stores, processes, and delivers web pages to the client devices 108a-108n via the network 112. For example, the third-party web source 114a can communicate using Hypertext Transfer Protocol (HTTP). The third-party web source 114a can convey web pages containing static content such as HTML documents, images, style sheets, etc. In addition, the third-party web source 114a can include web applications, databases, or other types of sources hosted on a web server.

The third-party system(s) 118 can also include a third-party messaging source 114b. The third-party messaging source 114b comprises any sort of messaging service. For example, the third-party messaging source 114b can include web-based messaging services such as email services and other instant messaging services. In some embodiments, the third-party messaging source 114b includes web-independent messaging services such as SMS, paging, and others.

As further illustrated in FIG. 1, the environment 100 also includes the third-party content storage source 114c. The third-party content storage source 114c can generate, manage, and store digital content items. The third-party content storage source 114c can store, organize, find, manage, distribute, and analyze file-based digital content items. For instance, the third-party content storage source 114c can store digital media files including images, audio, videos, and documents. The third-party content storage source 114c may store file-based digital content items or web documents (e.g., using cloud storage) or on physical hardware (e.g., using local storage).

The third-party system(s) 118 also includes the third-party calendar source 114d. The third-party calendar source 114d generates, stores, and manages calendars. For instance, the third-party calendar source 114d can comprise a web-based calendar system that stores calendars and events. The third-party calendar source 114d can provide calendars to a user or a group of connected users. The third-party calendar source 114d can store and manage events, invites, and other data and provide such data within on a digital calendar accessible via the internet. While FIG. 1 illustrates various examples of third-party sources 114, third-party system(s) 118 can include any number or type of third-party source. For instance, the third-party source 114n can represent any number and any type of third-party source as defined herein.

As will be understood based on the disclosure herein, various functions and processes of the contextual hub system 116 can be located on the server(s) 102 and the client devices 108a-108n. In some embodiments, the contextual hub system 116 cooperates with the client application 110 on the client devices 108a-108n to provide the functions and features described herein. Alternatively, the functions and features may be performed solely on the client devices 108a-108n as a particular application of the contextual hub system 116 requires.

Generally, the contextual hub system 116 generates and organizes web-accessible sources and content within contextual hubs associated with one or more users. The contextual hub system 116 can perform at least the three following functionalities: tab organization and management, content curation, and group collaboration. The following figures and corresponding description provide additional detail regarding each of these functionalities. In particular, FIGS. 2-6 and the accompanying discussion provide additional detail regarding how the contextual hub system 116 generates contextual hubs for tab organization and management in accordance with one or more embodiments. FIGS. 7-15 illustrate how the contextual hub system 116 can curate content in accordance with one or more embodiments. FIGS. 16-24 provide additional detail regarding how the contextual hub system 116 facilitates group collaboration by utilizing contextual hubs.

Tab Organization and Management within a Contextual Hub

Generally, the contextual hub system 116, can organize and manage content from various web-accessible sources across the internet. The contextual hub system 116 helps resolve the issue of crowding web browsing windows with excessive numbers of tabs. The contextual hub system 116 can generate contextual hubs that organize tabs by context. Thus, the contextual hub system 116 can keep related tabs together, enable quick access of tabs from within contextual hubs, and efficiently perform operations such as moving tabs between contextual hubs.

Figure 2A:
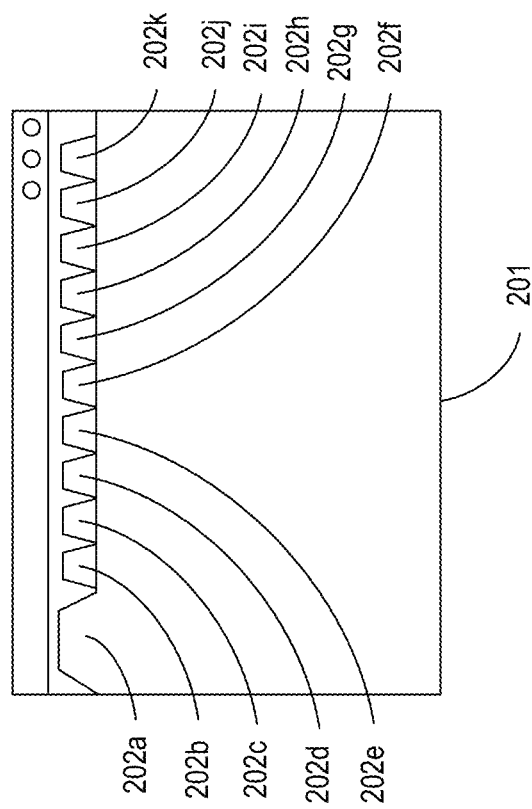
FIGS. 2A-2B illustrate an example of tab organization within contextual hubs in accordance with one or more embodiments.
Figure 2A:
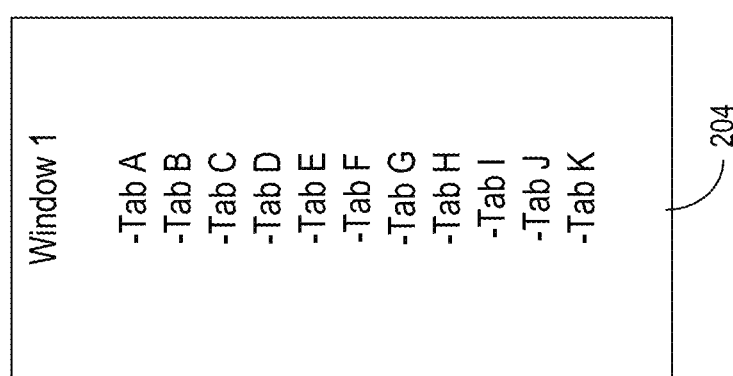
Figure 2B:
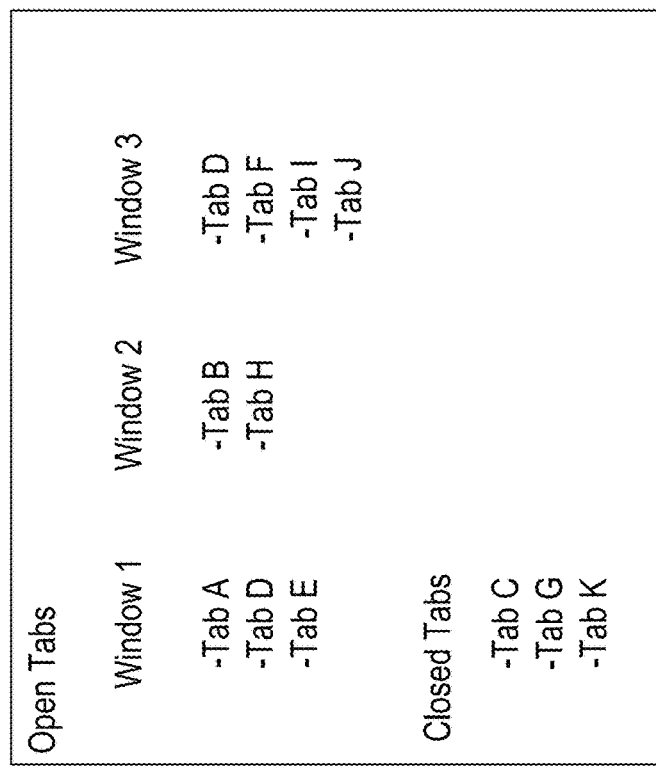
Figure 2B:
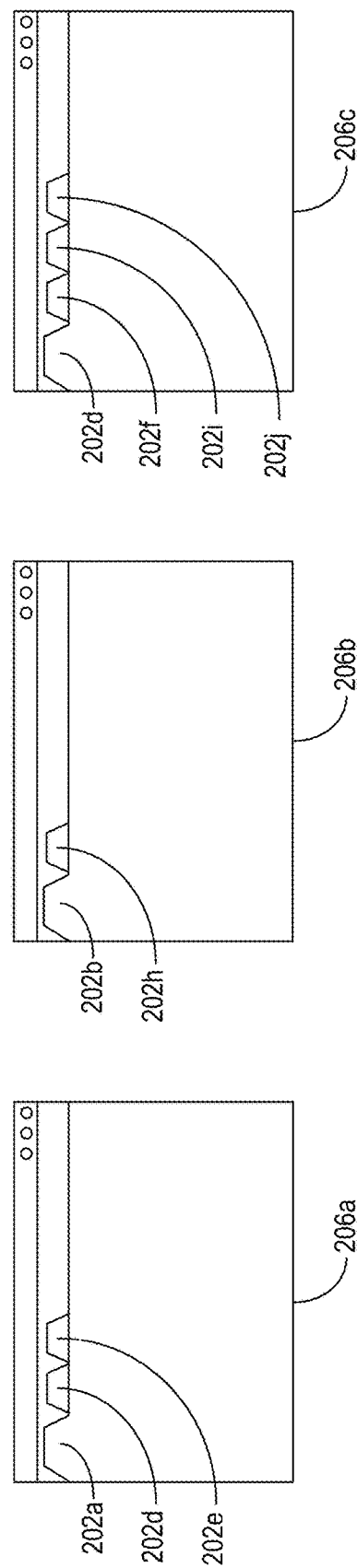

FIGS. 2A-2B illustrate an example of how the contextual hub system 116 can organize tabs within one or more contextual hubs in accordance with at least one embodiment. FIG. 2A illustrates a window 201 of a window of a browser per conventional systems. The window 201 includes tabs 202a-202k organized according to a window structure 204 associated with the window 201. For instance, the window structure 204 represents the tab labels for tabs 202a-202k within the window 201. As illustrated, because the window 201 is limited in size, the window 201 obscures the tab labels of the tabs 202a-202k.

The contextual hub system 116 resolves the problem of having too many tabs open within a window by creating contextual hubs that organize tabs within a window or multiple windows. For example, the contextual hub system 116 may organize tabs within one or more contextual hubs. In at least one embodiment, a contextual hub is associated with a web browsing window. FIG. 2B illustrates contextual hubs 206a-206c. The contextual hubs 206a-206c are associated with the underlying structure 208. As illustrated in FIG. 2B, the contextual hubs 206a-206c can comprise web browsing windows that include web browsing tabs. More specifically, the contextual hub 206a includes the tabs 202a, 202d, and 202e. The contextual hub 206b includes the tabs 202b and 202h. The contextual hub 206a includes the tabs 202d, 202f, 202i, and 202g. In at least one embodiment, and as illustrated, the contextual hubs 206a-206c comprise web browsing windows. In at least one other embodiment, and as will be discussed in additional detail below, the contextual hubs 206a-206c can comprise other units of organization. For instance, the contextual hubs 206a-206c can comprise any sort of digital space comprising a collection of web-accessible sources and content and/or links to web-accessible sources and content.

FIG. 2B also illustrates the underlying structure 208. The underlying structure 208 represents the organization of tabs within windows. For example, the contextual hub 206a corresponds to window 1 in the underlying structure 208, the contextual hub 206b corresponds to window 2 in the underlying structure 208, and the contextual hub 206c corresponds to window 3 in the underlying structure 208. The contextual hub system 116 may determine to present the underlying structure 208 as part of a contextual hub management graphical user interface. For instance, though not illustrated, the contextual hub system 116 can generate an additional tab in each of the contextual hubs 206a-206c corresponding to the underlying structure 208 that provides links to each of the different contextual hubs and any associated web-accessible sources and content associated with each contextual hub.

The contextual hub system 116 may create a new contextual hub, create a new tab within a contextual hub, move a tab from one contextual hub to another, remove or delete tabs from contextual hubs or remove contextual hubs based on user interaction with the displayed underlying structure or the contextual hubs 206a-206c. For instance, a user may efficiently move a tab between contextual hubs by dragging and dropping the tab between contextual hubs. Additionally, or alternatively, the contextual hub system 116 can determine that a user has moved a tab within the underlying structure 208. FIGS. 3A-3F and the corresponding discussion provide additional detail regarding example contextual hub management graphical user interfaces in accordance with one or more embodiments.

As further illustrated in FIG. 2B, the contextual hub system 116 can perform a number of actions to organize tabs within the contextual hubs 206a-206c. For instance, the contextual hub system 116 can create a new contextual hub and add one or more tabs to the contextual hub. As illustrated in FIG. 2B, the contextual hub system 116 creates the contextual hubs 206a-206c and moves tabs to each of the contextual hubs 206a-206c. The contextual hub system 116 organizes the tabs by moving related tabs to the same contextual hub. By creating new separate contextual hubs and adding tabs to the new contextual hubs based on the context of each tab, the contextual hub system 116 can avoid overcrowding any one contextual hub. For instance, whereas the tabs 202a-202k in the window 201 of FIG. 2A are compressed and crowded, the tabs 202a, 202d, and 202e in the contextual hub 206a are more widely spaced and easy to select for navigation purposes.

Furthermore, as illustrated in FIG. 2B, the contextual hub system 116 may remove or close tabs within the contextual hubs 206a-206c. For instance, as illustrated in FIG. 2, the contextual hub system 116 closed tabs 202c, 202h, and 202k corresponding to tabs c, g, and k in the underlying structure 208. Closing or removing tabs from within the contextual hubs 206a-206c further improves the visibility and spacing of remaining tabs within the contextual hubs 206a-206c. As will be discussed in additional detail below, the contextual hub system 116 can close select tabs (and contextual hubs) automatically and/or based on user input. In addition, if a user desires to access closed tabs associated with a closed contextual hub, a user can simply select a link associated with the closed contextual hub and the contextual hub system 116 will open the closed tabs and repopulate them with the web-accessible source associated with each previously closed tab. Thus, a user can navigate from one contextual hub to another, closing and opening contextual hubs as needed, and the contextual hub system 116 can automatically repopulate the re-opened tabs with the associated third-party source or internal source as the case may be. This system obviates the need for a user to keep a large number of tabs open because the contextual hub system keeps groups of tabs organized and available for quick access even when a group of tabs is closed. Indeed, a user can open multiple tabs associated with multiple web-accessible sources with a single input selection of a link associated with a contextual hub, as will be further described below.

In addition to organizing tabs within a window, the contextual hub system 116 can provide selectable links via a contextual hub management graphical user interface corresponding to a contextual hub, where the links reference other contextual hubs. The contextual hub management graphical user interface can enable a user to easily navigate between contextual hubs and move content (e.g., tabs) from one contextual hub to another contextual hub. FIGS. 3A-3F and the description that follows illustrate various example embodiments of contextual hub management graphical user interfaces and features in accordance with the features and functions as described above.

Figure 3A:
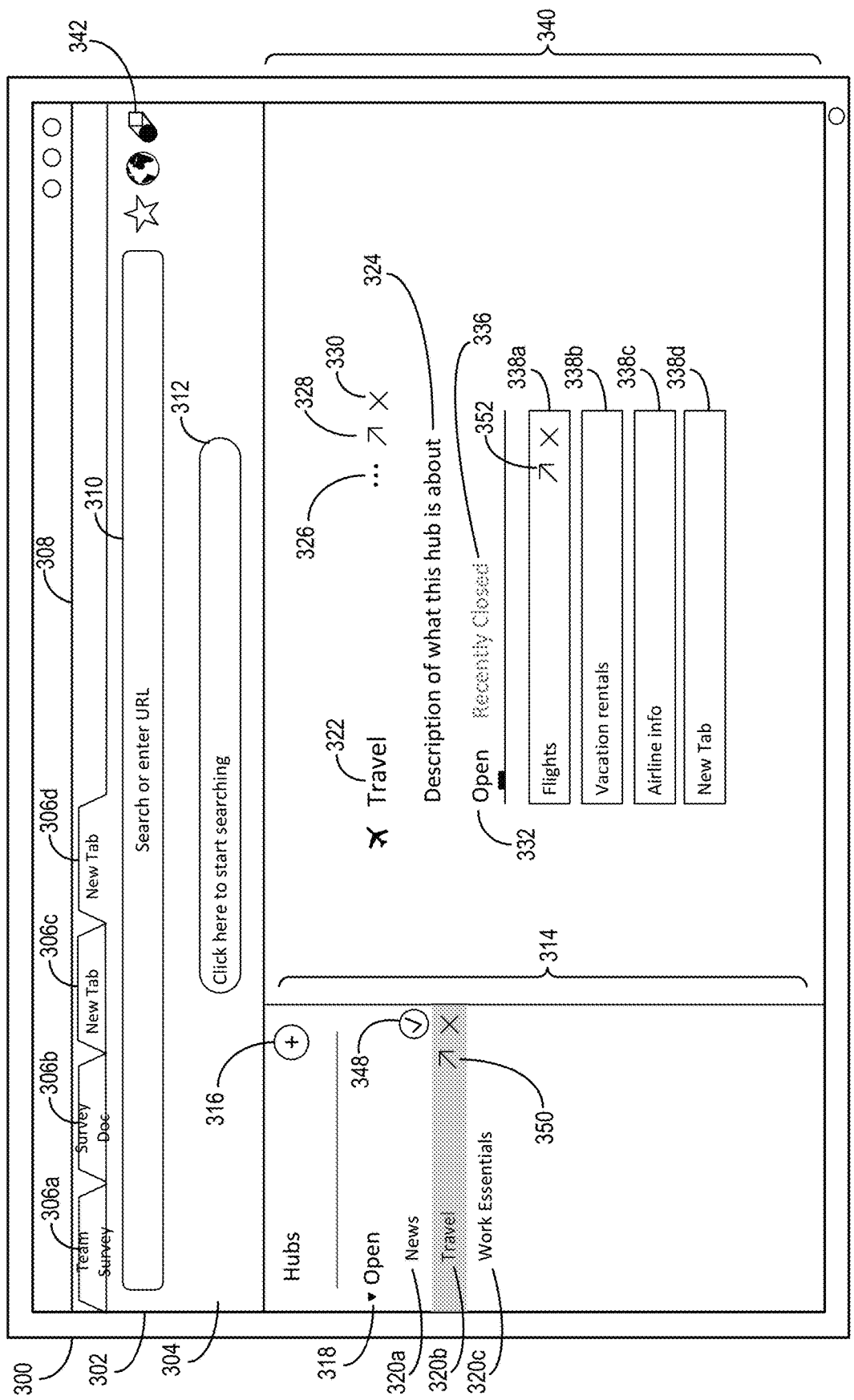
FIGS. 3A-3F illustrate an example series of contextual hub management graphical user interfaces for organizing and managing tabs within one or more contextual hubs in accordance with one or more implementations.

In one or more embodiments, the contextual hub system 116 can provide graphical user interfaces to client devices via client applications installed thereon. For example, FIG. 3A illustrates client device 300 displaying a contextual hub management graphical user interface 304 via a screen 302. The contextual hub system 116 provides various display areas and display elements as part of the contextual hub management graphical user interface 304. In one or more embodiments, the contextual hub management graphical user interface 304 includes tabs 306*a*-306*d* within a contextual hub 308. Additionally, the contextual hub management graphical user interface 304 includes a contextual hub menu 314 displaying contextual hub elements 320*a*-320*b* and a tab menu 340 displaying tab elements 338*a*-338*d*.

In at least one embodiment, and as illustrated in FIG. 3A, the contextual hub system 116 can operate as an extension within a web browser. As used herein, the term "extension" refers to a software module applied to a web browser, such as an add-on software module that is provided by a third party and that can be integrated into the web browser's user interface. In particular, an extension can comprise a software application that adds a capacity or functionality to a web browser. Furthermore, an extension can access functionalities of application program interfaces (APIs) available through the web browser along with the extension's own APIs. Although FIG. 3A illustrates the contextual hub system 116 operating within an extension of a web browser, the contextual hub system 116 may also be part of a web browser application or be part of or an extension to another native application (e.g., a content management system application).

The contextual hub system 116 may provide the contextual hub management graphical user interface 304 for display based on detecting various user interactions. For example, as illustrated in FIG. 3A, the contextual hub system 116 may display the contextual hub management graphical user interface 304 based on detecting user selection of a contextual hub manager icon 342. For instance, the contextual hub manager icon 342 comprises an extension icon. Additionally, or alternatively, the contextual hub system 116 may present the contextual hub management graphical user interface 304 as part of opening a new web browsing tab within a window. For example, and as illustrated in FIG. 3A, the contextual hub system 116 automatically presents the contextual hub management graphical user interface 304 within the screen 302 as part of opening the tab 306*d* within the contextual hub 308. For example, the client device 300 may present the contextual hub management graphical user interface 304 as part of opening a new tab or browser window.

While FIG. 3A illustrates components of the contextual hub management graphical user interface 304 within the tab 306*d*, the contextual hub system 116 can provide components of the contextual hub management graphical user interface 304 within other graphical elements. For instance, the contextual hub system 116 can present components of the contextual hub management graphical user interface 304 within a separate window, a side navigation bar, a tray, task bar, or other elements.

Generally, the contextual hub system 116 provides, via the contextual hub management graphical user interface 304, an overview of existing contextual hubs and tabs within those contextual hubs. The contextual hub management graphical user interface 304 acts as a central user interface by which a user can efficiently navigate and manage tabs and contextual hubs. For example, as illustrated in FIG. 3A, the contextual hub management graphical user interface 304 includes the contextual hub menu 314 displaying the contextual hub elements 320*a*-320*b* as well as a tab menu 340 displaying tab elements 338*a*-338*d* associated with a contextual hub label 322 (e.g., a contextual hub for travel).

Though not illustrated in FIG. 3A, the contextual hub system 116 may also list tabs corresponding to the contextual hub elements 320*a*-320*b* within the contextual hub menu 314 as sub-links under the links for contextual hub elements 320*a*-320*b*.

As mentioned, the contextual hub system 116 can associate a contextual hub with a web browser window. In some embodiments, for example, the contextual hub system 116 associates each of the contextual hub elements 320*a*-320*b* with a separate window. Additionally, the contextual hub system 116 can indicate an active contextual hub. As illustrated in FIG. 3A, the contextual hub system 116 can present an active contextual hub icon 348 indicating in which contextual hub the user is currently operating. For instance, the contextual hub system 116 displays the active contextual hub icon 348 to indicate that the user is currently operating within the contextual hub 308 associated with the contextual hub element 320*a*. Thus, based on user input of a search or URL within a web search element 310, the contextual hub system 116 will add a tab with the corresponding new search or URL to the active contextual hub (i.e., associated with the contextual hub element 320*a*). Additionally, the contextual hub system 116 can organize the tabs 306*a*-306*c* within the contextual hub 308 associated with the contextual hub element 320*a* based on detecting user selection and movement of the tabs 306*a*-306*c*.

As mentioned, the contextual hub system 116 can include, within a particular contextual hub, references to other contextual hubs to facilitate tab management. Generally, the contextual hub system 116 can display references to and manage tabs of a second contextual hub within an active contextual hub. As illustrated in FIG. 3A, the contextual hub system 116 presents the contextual hub elements 320*a*-320*b* within the contextual hub menu 314. The contextual hub system 116 may update information displayed in the tab menu 340 to provide detail regarding any of the contextual hub elements 320*a*-320*b* based on user interaction with the contextual hub elements 320*a*-320*b*. For example, as illustrated in FIG. 3A, the contextual hub system 116 detects user selection of the contextual hub element 320*b* corresponding to "Travel." Thus, although the contextual hub 308 is associated with the contextual hub element 320*a* relating to "News," the contextual hub system 116 presents the tab elements 338*a*-338*d* and information associated with a contextual hub relating to "Travel" (as indicated by the contextual hub label 322) within the tab menu 340.

As mentioned, the contextual hub management graphical user interface 304 provides several elements that enable navigation between contextual hubs. As illustrated in FIG. 3A, the contextual hub system 116 can activate a contextual hub by displaying the window associated with the contextual hub and its component tabs. The contextual hub system 116 activates the contextual hub based on detecting selection of elements for activating the particular contextual hub and/or activating component tabs. For instance, based on detecting user selection of a contextual hub link 328 and/or a contextual hub link 350, the contextual hub system 116 can activate the "Travel" contextual hub (associated with the contextual hub element 320*b*). In at least one embodiment, the contextual hub system 116 activates the "Travel" contextual hub by displaying or otherwise activating the window associated with the contextual hub label 322 on the screen 302 of client device 300. Additionally, the contextual hub system 116 activates the "Travel" contextual hub based on detecting user selection of a tab link 352. For instance, based on selection of the tab link 352, the contextual hub system 116 displays content linked to the tab element 338*a* within the corresponding contextual hub window. In one or more embodiments, the contextual hub system 116 activates a contextual hub based on a secondary selection of the contextual hub elements 320a-320c. For instance, based on detecting that a user has double-clicked on one of the contextual hub elements 320a-320c, the contextual hub system 116 activates the corresponding contextual hub.

The contextual hub management graphical user interface 304 also includes elements that enable navigation between tabs within a contextual hub. Generally, the contextual hub management graphical user interface 304 includes elements for navigating between tabs both of an active window and also inactive windows. For instance, as illustrated in FIG. 3A, the contextual hub system 116 surfaces content associated with the tabs 306a-306d of the contextual hub 308 based on detecting user selection of the tabs 306a-306d. Additionally, the contextual hub system 116 activates or surfaces content associated with the tab elements 338a-338d based on detecting selection of the tab elements 338a-338d. For instance, the user can double click the tab elements 338a-338d and/or select the tab link 352. As illustrated in FIG. 3A, the contextual hub system 116 displays the tab link 352 based on detecting that a user pointer is hovering over the tab element 338a. In one or more embodiments, the contextual hub system 116 displays permanent tab links for each of the tab elements 338a-338d.

Additionally, the contextual hub management graphical user interface 304 includes elements for navigating, organizing, and managing tabs within a contextual hub. As illustrated in FIG. 3A, the tab menu 340 includes information specific to the contextual hub represented by the contextual hub label 322. For instance, the tab menu 340 displays contextual hub label 322, the tab elements 338a-338d, a contextual hub description 324, an open tabs element 332, and a recently closed tabs element 336. Generally, the contextual hub description 324 includes a brief summary describing the source and/or content within the contextual hub linked to the contextual hub label 322. As illustrated, based on user selection of the open tabs element 332 or the recently closed tabs element 336, the contextual hub system 116 can present currently open tabs or recently closed tabs associated with the contextual hub label 322, respectively.

The contextual hub system 116 facilitates organization of tabs within contextual hubs. In particular, the contextual hub system 116 can reorder tabs within a hub, move a tab to a different contextual hub, move a tab to a new contextual hub, add a new tab to a hub, remove a tab from a hub, edit tabs' names or other properties, and perform other operations. In at least one embodiment, the contextual hub system 116 reorders tabs displayed within a window of a contextual hub. As illustrated in FIG. 3A, the contextual hub system 116 can reorder the tabs 306a-306d. In at least one embodiment, the contextual hub system 116 reorders the tabs 306a-306d based on detecting that a user has selected and dragged one of the tabs 306a-306d from its original position to a new position. Additionally, the contextual hub system 116 can reorder the tabs 306a-306d based on detecting that a user has selected and dragged one of the tab elements 338a-338d from an original first position to a new position. For instance, a user can select the tab element 338c and drag it to a new position above tab element 338a. In response, the contextual hub system 116 reorders the tab elements 338a-338d within the tab menu 340 to display the tab element 338c first. Thus, when the contextual hub system 116 activates the contextual hub associated with the contextual hub label 322, the tab associated with the tab element 338c will appear before the tab associated with the tab element 338a within the updated window.

Additionally, as mentioned, the contextual hub system 116 can efficiently move a tab to a different contextual hub. In at least one embodiment, contextual hub system 116 moves tabs to different contextual hub based on drag and drop gestures. For example, a user can select and drag any of the tabs 306a-306d and/or the tab elements 338a-338d to any contextual hub. As illustrated in FIG. 3A, the contextual hub system 116 can move a tab into any of the contextual hub elements 320a-320b based on detecting that a user has dragged and dropped a tab on to any one of the contextual hub elements 320a-320b. For instance, a user can select the tab 306c, drag the tab 306c to an area around the contextual hub element 320b, and drop the tab 306c within the area. Based on this user dragging and dropping, the contextual hub system moves the tab 306c from the contextual hub associated with the contextual hub 308 to the contextual hub represented by the contextual hub element 320b. Additionally, or alternatively, the contextual hub system 116 can move any of the tabs 306a-306d to the contextual hub corresponding to the contextual hub element 320b by detecting a user drag and drop gesture of the selected tab into an area of the tab menu 340.

Additionally, the contextual hub system 116 can move tabs listed within the tab menu 340 to another contextual hub by detecting that a user has selected, dragged, and dropped a tag to another contextual hub. For instance, as illustrated in FIG. 3A, a user can move any of the tabs represented by the tab elements 338a-338d to the contextual hub 308 by dragging one of the tab elements 338a-338d to an area around the contextual hub element 320a. Additionally, or alternatively, the user can drag one of the tab elements 338a-338d to an area in front of, between, or behind the tabs 306a-306d. Thus, the contextual hub system 116 can reorganize tabs within windows based on intuitive user selections and gestures.

As mentioned, the contextual hub system 116 can create a new contextual hub using an existing tab. For instance, FIG. 3A illustrates the new contextual hub element 316 within the contextual hub management graphical user interface 304. A user may select any of the tabs 306a-306d and/or the tab elements 338a-338d. Based on detecting that the user has dragged the selected tab and dropped the selected tab onto or within an area around the new contextual hub element 316, the contextual hub system 116 adds the selected tab to a new contextual hub. Furthermore, and as will be discussed in greater detail below with respect to FIG. 3B, the contextual hub system 116 may also create a new and empty (i.e., does not include any pre-existing tabs) contextual hub based on user selection of the new contextual hub element 316.

Figure 3B:
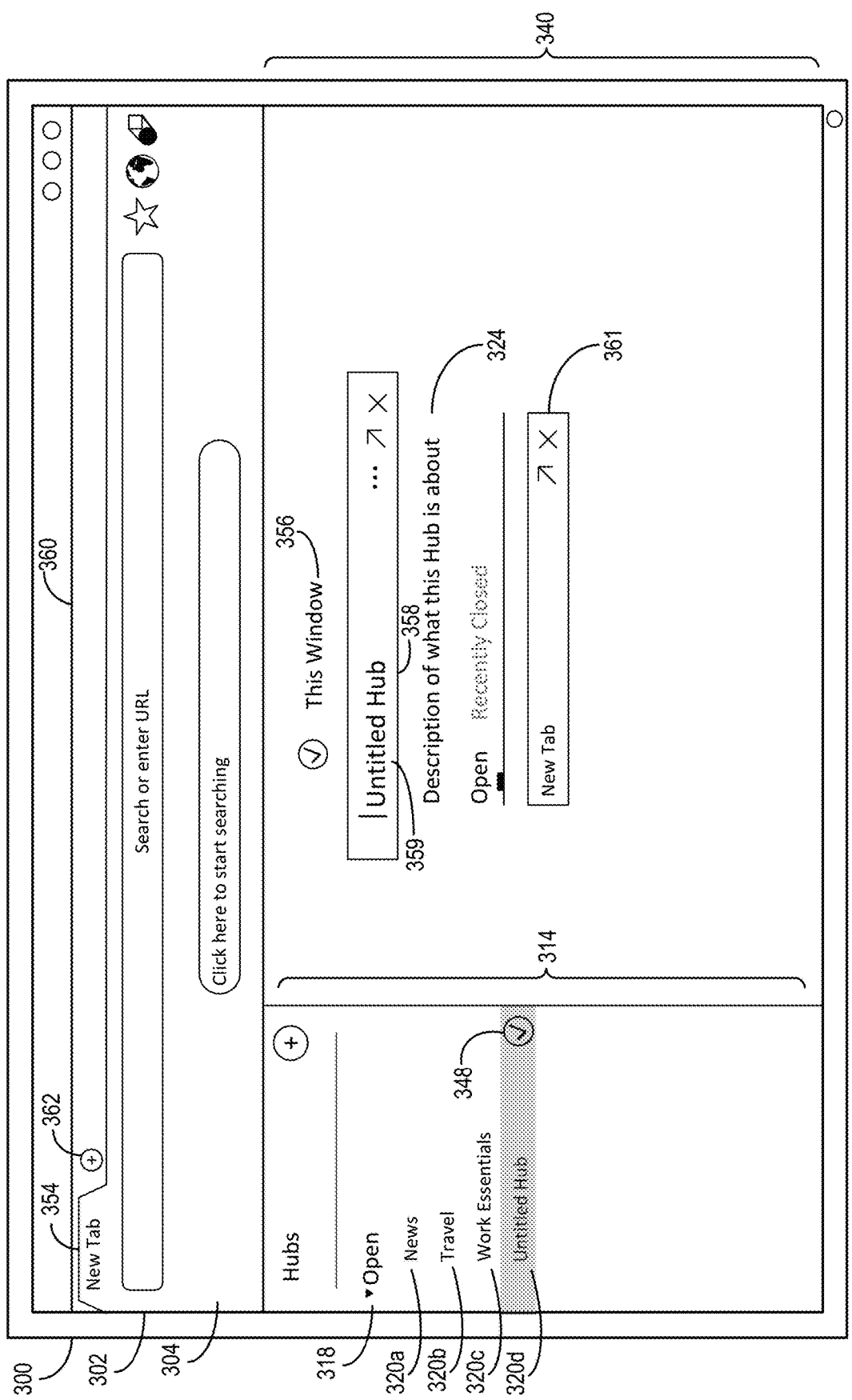
Figure 3C:
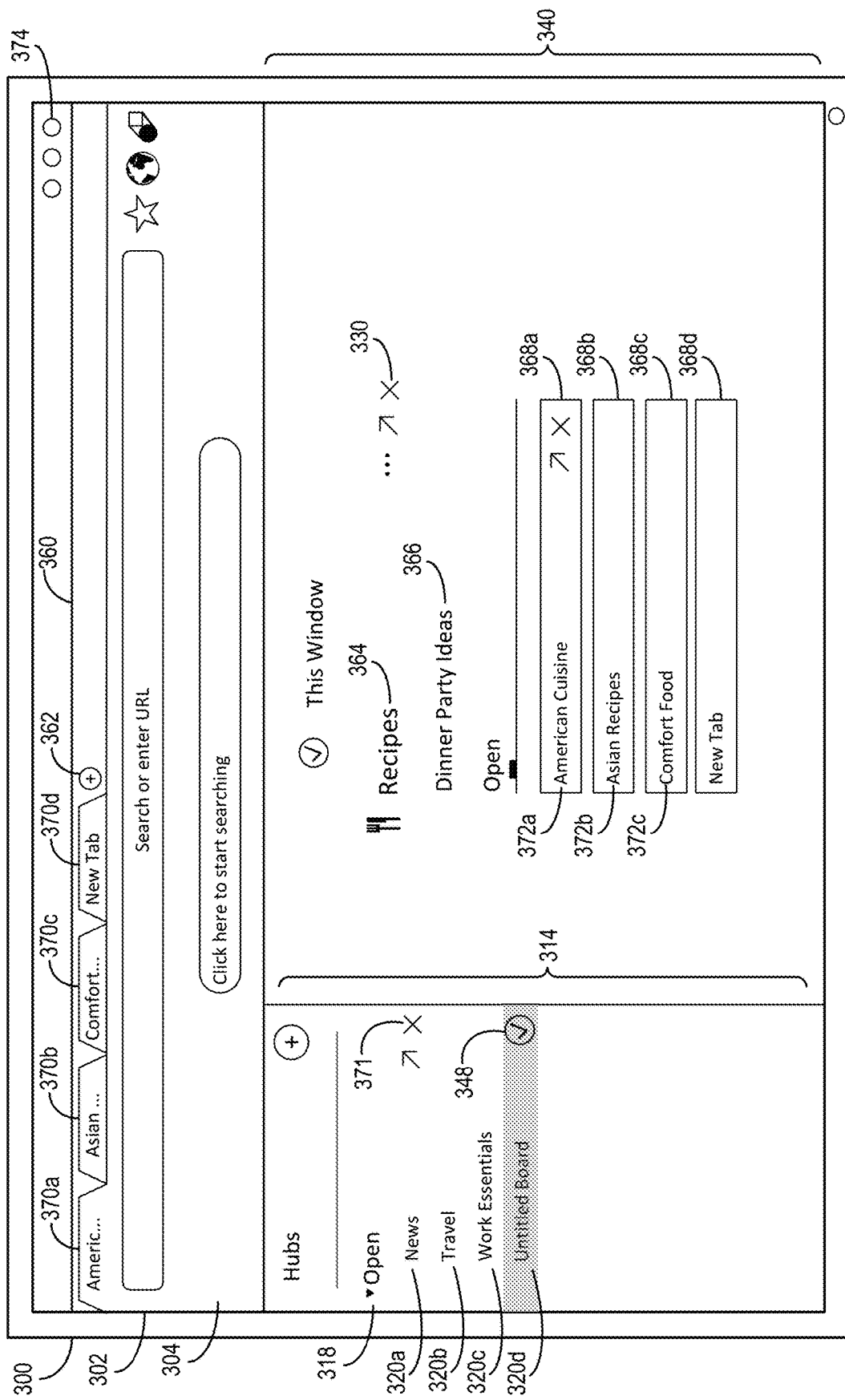
Figure 3D:
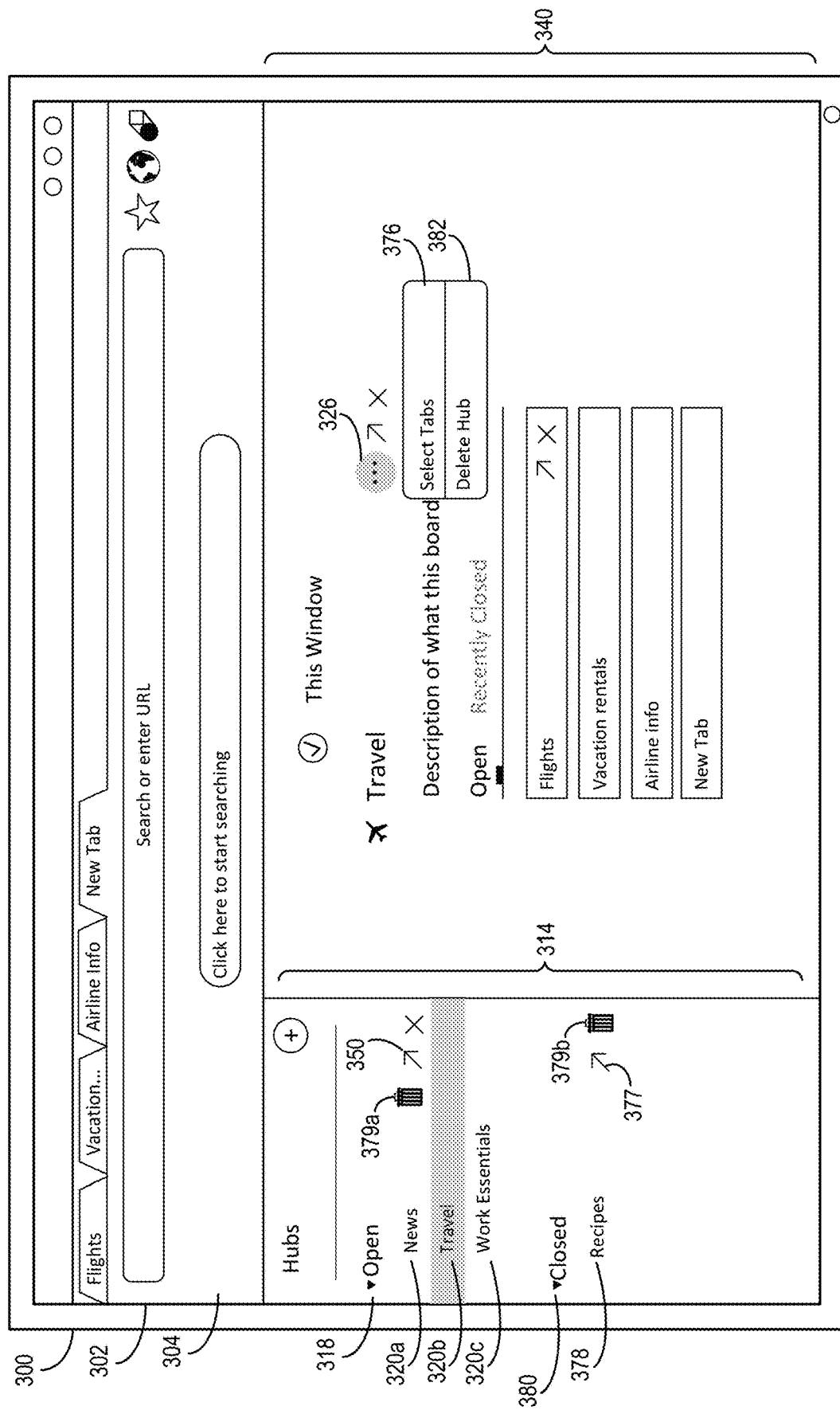
Figure 3E:
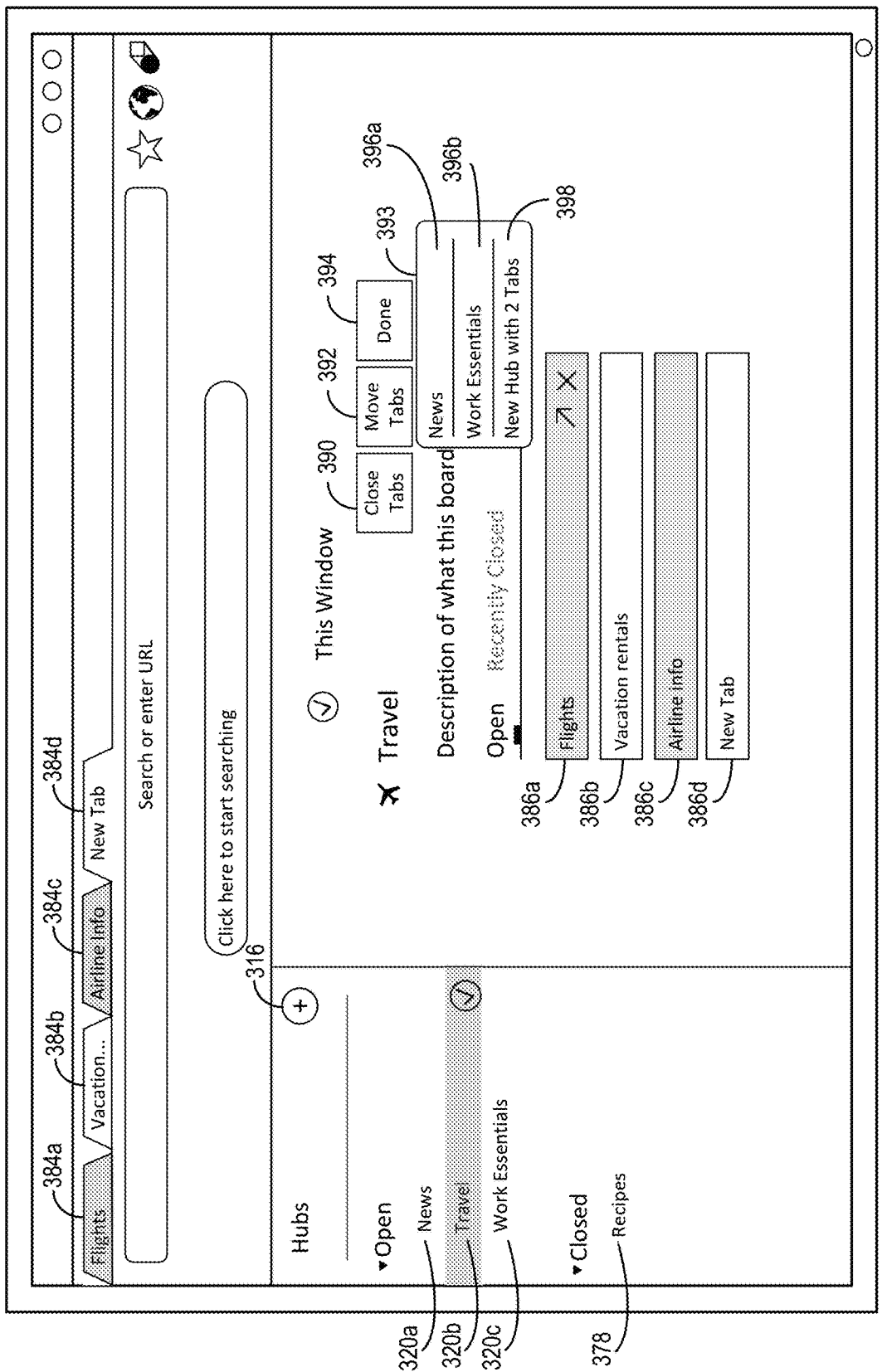
Figure 3F:
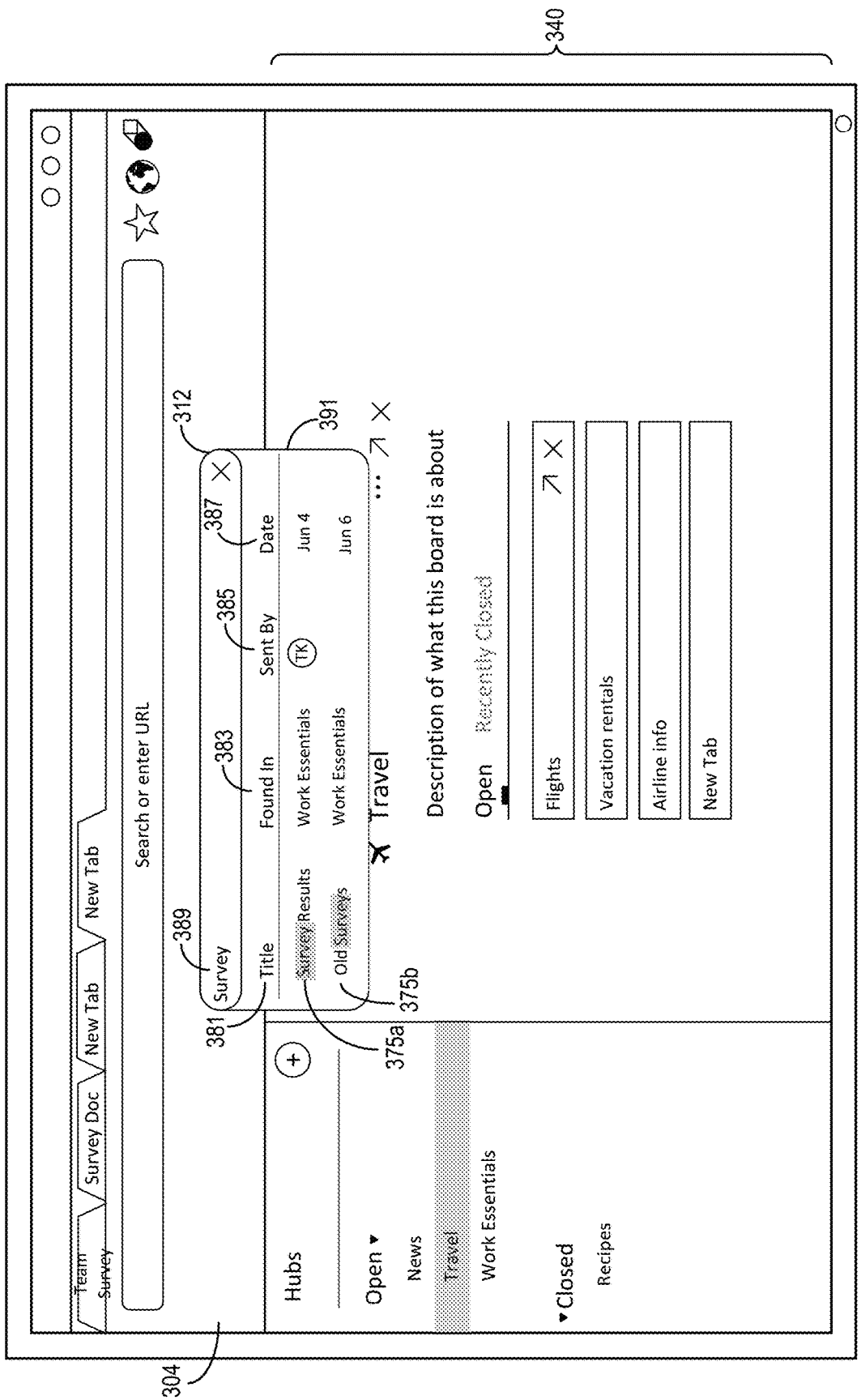

The contextual hub system 116 also provides elements and features for performing searches within one or more contextual hubs. For example, as illustrated in FIG. 3A, the contextual hub system 116 presents a contextual hub search element 312. FIG. 3F and the corresponding discussion below provide additional detail with respect to the contextual hub search element 312.

FIG. 3A and the corresponding discussion provide an overview of various elements and features within the contextual hub management graphical user interface 304. FIGS. 3B-3F and the accompanying disclosure provide additional detail relating to specific elements and features of the elements mentioned with respect to FIG. 3A. For instance, as illustrated in FIG. 3A, the contextual hub management graphical user interface 304 includes various elements for creating and opening a new contextual hub. For example, the contextual hub management graphical user interface 304 includes a new contextual hub element 316. Based on detecting user interaction with the new contextual hub element 316, the contextual hub system 116 updates the contextual hub management graphical user interface 304 to display elements as illustrated in FIG. 3B.

FIG. 3B illustrates an example contextual hub management graphical user interface 304 corresponding to generation of a new tab within a new contextual hub. In particular, FIG. 3B illustrates the contextual hub management graphical user interface 304 on the screen 302 of the client device 300. More particularly, the contextual hub management graphical user interface 304 displays a contextual hub 360 including a tab 354. As further illustrated, the contextual hub system 116 updates the contextual hub menu 314 to include a contextual hub element 320*d* corresponding to the contextual hub 360 and the contextual hub element 358.

FIG. 3A illustrated an example graphical user interface in which the tab menu 340 displayed information regarding a different contextual hub (i.e., relating to "Travel") than the active window (i.e., relating to "News"). In contrast, FIG. 3B illustrates the contextual hub management graphical user interface 304 in which the tab menu 340 displays information regarding the e.g., the contextual hub 360 that includes tab 354. As illustrated in FIG. 3B, the contextual hub system 116 indicates that the contextual hub 360 corresponds to the contextual hub indicator 358 displayed within the tab menu 340 by presenting an active window indicator 356. For example, the tab 354 displayed within the contextual hub 360 corresponds to a tab element 361 listed within the tab menu 340

As illustrated in FIG. 3B, the contextual hub management graphical user interface 304 provides various elements by which a user may add tabs to a contextual hub. For instance, to add a tab to the contextual hub 360 (associated with the contextual hub element 358), the user can select a new tab element 362. Additionally, although not illustrated in FIG. 3B, the contextual hub system 116 can display a new tab element listed within the tab menu 340. For instance, the contextual hub system 116 can include a new tab element under the tab element 361.

The contextual hub system 116 enables customization of contextual hubs and tabs by renaming contextual hubs, contextual hub descriptions, and tabs. As further illustrated in FIG. 3B, the contextual hub system 116 can change a contextual hub label 359 of the contextual hub 360 displayed within the contextual hub element 358 and/or the contextual hub description 324 based on user selection of the contextual hub element 358 and the contextual hub description 324. In at least one embodiment, the contextual hub label 359 of the contextual hub element 358 comprises an interactive interface element. A user may select the contextual hub label 359 and enter a desired label in the contextual hub element 358. Similarly, the user may select and edit the contextual hub description 324. In at least one embodiment, tabs listed within the tab menu 340 also comprise selectable elements that, when selected, enable the user to update the name of tabs. In one or more embodiments, the contextual hub system 116 updates the names of contextual hubs based on user interaction with the contextual hubs 320*a*-320*d* listed within the contextual hub menu 314.

Although, as illustrated in FIG. 3B, the contextual hub system 116 may update names and labels of contextual hubs, descriptions, and tabs based on user input, the contextual hub system 116 may also generate predicted labels for contextual hubs, contextual hub descriptions, and tabs based, for example, on the contents of the tabs. FIG. 3C illustrates the contextual hub management graphical user interface 304 including a predicted contextual hub label 364, a predicted contextual hub description 366, and predicted tab labels 372*a*-372*c*. As further illustrated, the contextual hub 360 illustrated in FIG. 3C displays tabs 370*a*-370*d*.

As illustrated in FIG. 3C, the contextual hub system 116 can generate the predicted contextual hub label 364 based on contextual data associated with the sources and content of a contextual hub. In particular, the contextual hub system 116 can utilize a naming algorithm to generate the predicted contextual hub label 364 based on the content of tabs within the contextual hub. For example, the contextual hub system 116 begins collecting contextual data as the contextual hub system 116 adds tabs to the contextual hub. As illustrated, the contextual hub system 116 adds the tabs 368*a*-368*c* to the contextual hub 360. The contextual hub system 116 can determine the predicted contextual hub label 364 based on domain names or content within the tabs 368*a*-368*c*. In at least one embodiment, the contextual hub system 116 analyzes the actual content associated with the tabs 368*a*-368*d* to predict the contextual hub label 364. For instance, the contextual hub system 116 can extract feature vectors from URL addresses, text, images, and other data from the third-party sources. The contextual hub system 116 can compare the feature vectors from the third-party sources to identify common themes, and the contextual hub system 116 can generate the contextual hub label 364 based on the common themes.

In some embodiments, instead of constantly changing and updating the predicted contextual hub label 364, the contextual hub system 116 generates the predicted contextual hub label 364 and fixes the predicted contextual hub label 364. In one embodiment, the contextual hub system 116 fixes the predicted contextual hub label 364 based on analyzing the content from one or more tabs associated with the contextual hub. For instance, the contextual hub system 116 can determine the fixed label "Recipes" based on the first three tabs opened within the contextual hub.

Additionally, in some embodiments, the contextual hub system 116 automatically updates or provides suggestions to update the contextual hub label 364 when the contextual hub system 116 adds new tabs. For instance, based on adding a threshold number of new unrelated or tangentially related tabs to the contextual hub, or based on removing one or more previously associated tabs, the contextual hub system 116 can automatically update the predicted contextual hub label 364 and/or provide a notification that suggests an updated label. For example, the contextual hub system 116 can determine based on either adding or removing tabs that the current contextual hub label is no longer accurate by comparing an updated feature vector from the updated set of third-party content to the previous feature vector created from the original set of third-party content. If the updated feature vector differs by a set threshold amount from the previous feature vector, the contextual hub system 116 can generate a new hub label and/or provide a notification to change the label. In one or more embodiments, the contextual hub system 116 can provide a setting for automatically updating the contextual hub label 364 as tabs are removed or added so that a user can interact with the setting to either create a fixed contextual hub label or have the system update the label as the content within the contextual hub evolves over time.

In at least one embodiment, and as illustrated in FIG. 3C, the contextual hub system 116 generates predicted tab labels 372*a*-372*c*. Generally, the predicted tab labels 372*a*-372*c* indicate content linked by the tabs 368a-368c. The contextual hub system 116 presents the predicted tab labels 372a-372c in the tabs 368a-368c. The contextual hub system 116 can generate the predicted tab labels 372a-372c by extracting a title from the URL or content of the linked web page or third-party source. In some embodiments, the contextual hub system 116 simply uses the third-party source address as the predicted tab labels 372a-372c. Additionally, in one or more embodiments, the contextual hub system 116 generates predicted tab labels by comparing the content linked to a particular tab with content linked by other tabs within a contextual hub. Based on comparing the content, the contextual hub system 116 may identify content and/or topics unique to the particular tab and generate a predicted tab name based on the unique content and/or topic.

The contextual hub system 116 also presents graphical user interface elements for closing contextual hubs. More specifically, the contextual hub system 116 provides elements for closing both active and inactive contextual hubs. As illustrated in FIG. 3C, the contextual hub management graphical user interface 304 also includes close window element 374 and close hub element 330 by which a user can close an active contextual hub. Based on detecting user selection of the close window element 374, the contextual hub system 116 closes the currently active window or contextual hub indicated by the active contextual hub icon. Similarly, based on detecting user selection of the close hub element 330, the contextual hub system 116 closes the contextual hub presented within the tab menu 340. As illustrated in FIG. 3C, the contextual hub system 116 closes the contextual hub titled "Recipes" based on detection selection of either the close window element 374 or the close hub element 330.

As mentioned, the contextual hub system 116 may close inactive contextual hubs. As illustrated in FIG. 3C, the contextual hub system 116 presents, via the contextual hub management graphical user interface 304, a close contextual hub element 371 and the close hub element 330. The contextual hub system 116 can display the close contextual hub element 371 next to any of the contextual hub elements 320a-320d displayed in the contextual hub menu 314. As illustrated in FIG. 3C, the contextual hub system 116 presents the close contextual hub element 371 based on detecting that a user's cursor is hovering over the contextual hub element 320a. Based on detecting selection of the close contextual hub element 371, the contextual hub system 116 closes the contextual hub 308 corresponding to the contextual hub element 320a. Although not illustrated in FIG. 3C, the contextual hub system 116 may close an inactive contextual hub based on detecting user selection of the close hub element 330. For example, the contextual hub system 116 can present data corresponding to an inactive contextual hub within the tab menu 340. Based on detecting selection of the close hub element 330 associated with the presented inactive contextual hub, the contextual hub system 116 closes the window of the contextual hub.

The contextual hub system 116 can store and present closed contextual hubs for display via a client device. The contextual hub system 116 can provide access to and perform operations on (e.g., searches) closed contextual hubs. FIG. 3D illustrates an updated contextual hub management graphical user interface 304 based on closing the "Recipes" contextual hub. For example, as illustrated in FIG. 3D, the contextual hub management graphical user interface 304 presents, within the contextual hub menu 314, the open contextual hubs element 318 and a closed contextual hubs element 380. While the open contextual hubs element 318 lists contextual hubs corresponding to separate windows, the closed contextual hubs element 380 lists closed contextual hubs. For instance, the closed contextual hubs element 380 lists a closed contextual hub element 378 corresponding to the closed "Recipes" contextual hub.

The contextual hub system 116 may reopen or reactivate closed contextual hubs. As illustrated in FIG. 3D, the contextual hub system 116 presents, within the contextual hub management graphical user interface 304, a closed hub link 377. Based on detecting user selection of the closed hub link 377, the contextual hub system 116 re-opens the closed contextual hub element 378 within a new window and activates the closed contextual hub element 378 by displaying the closed contextual hub element 378 and populating the tabs associated with the contextual hub. Accordingly, based on receiving a single selection of the closed hub link 377, the contextual hub system 116 provides the user with all third-party source content related to the contextual hub element 378 allowing the user to search, view, access, and browse an organized set of third-party sources.

Additionally, the contextual hub system 116 may delete a closed contextual hub. As illustrated in FIG. 3D, the contextual hub system 116 presents a delete hub element 379b. Based on detecting user selection of the delete hub element 379b, the contextual hub system 116 deletes the closed contextual hub corresponding to the contextual hub element 378.

In addition to illustrating graphical user interface elements and features for deleting a closed contextual hub, FIG. 3D also illustrates elements and features for deleting open contextual hubs. The contextual hub system 116 can delete both inactive and active contextual hubs. For instance, as illustrated in FIG. 3D, the contextual hub management graphical user interface 304 can include delete hub element 379a for deleting the inactive contextual hub corresponding to the contextual hub element 320a. The contextual hub system 116 can present the delete hub element 379a together with the contextual hub link 350 based on detecting that a user cursor is hovering over an area of the contextual hub element 320a. The contextual hub system 116 may present similar delete hub elements (permanent or temporary) together with the contextual hub elements 320b-320c.

FIG. 3D also illustrates a delete hub element 382 within the tab menu 340 of the contextual hub management graphical user interface 304. For example, in at least one embodiment, based on detecting user selection of the additional options element 326, the contextual hub system 116 presents a select tabs element 376 and a delete hub element 382. Based on detected user selection of the delete hub element 382, the contextual hub system 116 deletes the contextual hub (i.e., the "Travel" contextual hub) displayed within the tab menu 340.

The contextual hub system 116 can perform operations on tabs within a contextual hub. For example, based on detecting selection of the select tabs element 376 illustrated in FIG. 3D, the contextual hub system 116 can begin selecting multiple tabs displayed within the tab menu 340. Additionally, the contextual hub system 116 presents elements for performing operations on the one or more selected tabs. FIG. 3E and the corresponding discussion provide examples of operations that the contextual hub system 116 can perform on one or more tabs within a contextual hub.

In response to detecting selection of the select tabs element 376 (illustrated in FIG. 3D) and a selection of one or more tabs, the contextual hub system 116 presents options for performing operations on the selected one or more tabs. As illustrated in FIG. 3E, the contextual hub system 116 presents, within the contextual hub management graphical user interface 304, a close tabs element 390, a move tabs element 392, and an end selection element 394. Additionally, FIG. 3E illustrates tabs 384a-384d that correspond to the tab elements 386a-386d.

The contextual hub system 116 indicates the selection of one or more tabs. For example, as illustrated in FIG. 3E, the contextual hub system 116 indicates user selection of the tab elements 386a and 386c by modifying a color of the tab elements 386a and 386c. In other embodiments, the contextual hub system 116 indicates user selection using different interface elements such as by displaying check marks next to selected tabs. Additionally, the contextual hub system 116 indicates multiple tab selections via the tabs 384a-384d. For instance, and as illustrated in FIG. 3E, the contextual hub system 116 changes the colors of the tab 384a (corresponding to the selected tab element 386a) and the tab 384c (corresponding to the selected tab 386c).

The contextual hub system 116 may simultaneously move multiple selected tabs to a different contextual hub. For instance, and as illustrated in FIG. 3E, a user can drag the selected tabs (e.g., the tab elements 386a and 386c and/or the tabs 384a and 384c) on or to an area around the contextual hub elements 320a-320b or even the closed contextual hub element 378. Additionally, or alternatively, the contextual hub system can move the selected tabs to different contextual hubs based on user interaction with the move tabs element 392. For instance, based on detecting that a user has selected or otherwise interacted with (e.g., hovers over) the move tabs element 392, the contextual hub system 116 presents a move tabs menu 393. The move tabs menu 393 presents contextual hubs to which the contextual hub system 116 may move the selected tabs. As illustrated in FIG. 3E, the move tabs menu 393 includes the contextual hub elements 396a (corresponding to the contextual hub element 320a) and 396b (corresponding to the contextual hub element 320c). Based on detecting user selection of any of the contextual hub elements 396a-396b, the contextual hub system 116 moves the selected tabs (384a and 384c) to the corresponding contextual hub.

The contextual hub system 116 may also create a new contextual hub using the selected multiple tabs. For instance, and as illustrated in FIG. 3E, the contextual hub system 116 creates a new contextual hub using the tab elements 386a and 386c based on detecting that the user has dragged and dropped the selected multiple tabs to or around the new contextual hub element 316. Additionally, or alternatively, the contextual hub system 116 creates a new contextual hub using the selected multiple tabs based on user selection of a new hub element 398 within the move tabs menu 393.

As further illustrated in FIG. 3E, the contextual hub system 116 may deselect or otherwise complete operations related to the selected multiple tabs based on user selection of the end selection element 394. Additionally, the contextual hub system 116 can deselect the selected multiple tabs by detecting user selection of blank space within the contextual hub management graphical user interface 304.

As previously mentioned with respect to FIG. 3A, the contextual hub system 116 presents a contextual hub search element 312 within the contextual hub management graphical user interface 304. The contextual hub system 116 creates an index of tabs within contextual hubs. The contextual hub system 116 provides, via the contextual hub management graphical user interface 304, elements for searching the index of tabs. FIG. 3F illustrates the contextual hub management graphical user interface 304 including the contextual hub search element 312 with an input search term. For example, FIG. 3F illustrates contextual hub management graphical user interface 304 including predicted results 391 indicating result titles 381, result locations 383, result origins 385, and result dates 387.

As illustrated in FIG. 3F, the contextual hub system 116 has received a search term 389 within the contextual hub search element 312. The contextual hub system 116 searches the contextual hub index for tabs related to the search term 389. The contextual hub system 116 can identify tabs that are related to the search term 389 and present the identified tabs and corresponding locations of the identified tabs within the predicted results 391. As illustrated in FIG. 3F, the contextual hub system 116 presents identified tab labels 375a-375b within the predicted results 391. The contextual hub system 116 may present, within the predicted results 391, any and all potential results. In at least one embodiment, the contextual hub system 116 lists a specific number of identified tabs within the predicted results 391 and presents the specific number of the most relevant tabs.

The contextual hub system 116 presents information related to the predicted results 391 to provide relevant tab data to facilitate selection of the desired tab. As illustrated in FIG. 3F, the contextual hub system 116 presents the result titles 381. In at least one embodiment, the result titles 381 correspond to the tab names or labels. For instance, the result titles 381 can comprise user-defined or predicted labels corresponding to the identified tabs. Based on selection of the result titles 381, the contextual hub system 116 rearranges the identified tab labels 375a-375b by alphabetical order or reverse alphabetical order. Additionally, in at least one embodiment, the contextual hub system 116 lists the identified tab labels 375a-375b based on relevance of tab title or label.

The contextual hub system 116 can also present the location of identified tabs within the predicted results 391. As illustrated in FIG. 3F, the contextual hub system presents the result locations 383. In at least one embodiment, the result locations 383 reflect the contextual hub in which an identified tab is located. For instance, as illustrated in FIG. 3F, both of the identified tab labels 375a-375b are located within the work essentials contextual hub. Based on user selection of the result locations 383, the contextual hub system 116 can list the identified tab labels 375a-375b grouped by contextual hub. In at least one embodiment, the contextual hub system 116 can list search results located within a certain contextual hub first. For instance, the contextual hub system 116 can list identified tabs located within the travel contextual hub first because the travel contextual hub is currently displayed within the tab menu 340. Though not illustrated, the contextual hub system 116 may also include identified tabs located within closed contextual hubs.

The contextual hub system 116 can present the origin of identified tabs. For example, as illustrated in FIG. 3F, the contextual hub system 116 presents, within the predicted results 391, the result origins 385. The result origins 385 can include names of collaborating users that sent or created the corresponding identified tab. For instance, as illustrated in FIG. 3F, the identified tab label 375 was sent by a collaborating user identified as "TK." Based on user selection of a particular user identifier (e.g., the identifier "TK"), the contextual hub system 116 can present identified tabs sent by the particular user first within the predicted results 391.

The contextual hub system 116 may also sort identified tabs within the predicted results 391 based on date. For instance, as illustrated in FIG. 3F, the contextual hub system can present the identified tab labels 375a-375b based on the creation date of the identified tab labels 375a-375b. Based on detected selection of the result date 387, the contextual hub system 116 can list the identified tab labels 375a-375b in order of most recent or oldest creation date. Additionally, though not illustrated in FIG. 3F, the contextual hub system 116 can first list tabs closest to a particular date based on detecting selection of a particular date. For instance, based on detecting selection of the date "June 4" associated with the identified tab label 375a, the contextual hub system 116 can list the following identified tabs in order of proximity to June 4.

Although FIG. 3F illustrates a basic search function for searching the index of contextual hubs and tabs, the contextual hub system 116 can also provide more-refined searches of the index of contextual hubs. For instance, instead of conducting a broad search across all available contextual hubs, the contextual hub system 116 can conduct searches within specified contextual hubs. For instance, the contextual hub system 116 can search a single contextual hub, e.g., the currently active contextual hub. The contextual hub system 116 can also search two or more particular contextual hubs based on user selection of the two or more particular hubs. Additionally, the contextual hub system 116 can enable a user to specify searches within one or more particular third-party source types such as within third-party web sources, third-party messaging sources, third-party content storage sources, third-party calendar sources, or other third-party sources. Furthermore, although FIG. 3F illustrates the contextual hub system 116 identifying search terms within tab labels or names, the contextual hub system 116 may also present identified tabs whose source content include the search terms. Furthermore, the contextual hub system 116 can limit searches to related web sources. For instance, the contextual hub system 116 can present identified tabs comprising source content from a specific website (e.g., youtube.com) or domain (e.g. ".com," "org.," ".gov," etc.).

In some embodiments, the contextual hub system 116 automatically performs search functions on updated content. In particular, based on receiving a search term, the contextual hub system 116 updates content of the contextual hub and/or all the contextual hubs before performing the search. For example, based on receiving the search term 389 for searching a particular contextual hub (e.g., indicated by "Travel"), the contextual hub system 116 accesses and updates content referenced by each of the tabs within the particular contextual hub. Thus, the contextual hub system 116 performs a search on the most recent content referenced from within the contextual hub.

In other embodiments, the contextual hub system 116 performs search functions on cached or stored content. In particular, the contextual hub system 116 may store the last-accessed version of content corresponding to one or more contextual hubs. For example, the contextual hub system 116 generates and updates a cache containing data for tabs when the tab is active (i.e., the user is currently viewing content within the tab). The contextual hub system 116 performs a search function on the cache to identify relevant data. For instance, the contextual hub system 116 can search recently closed tabs by accessing the cache and searching the last-accessed version of the closed tabs.

Figure 4:
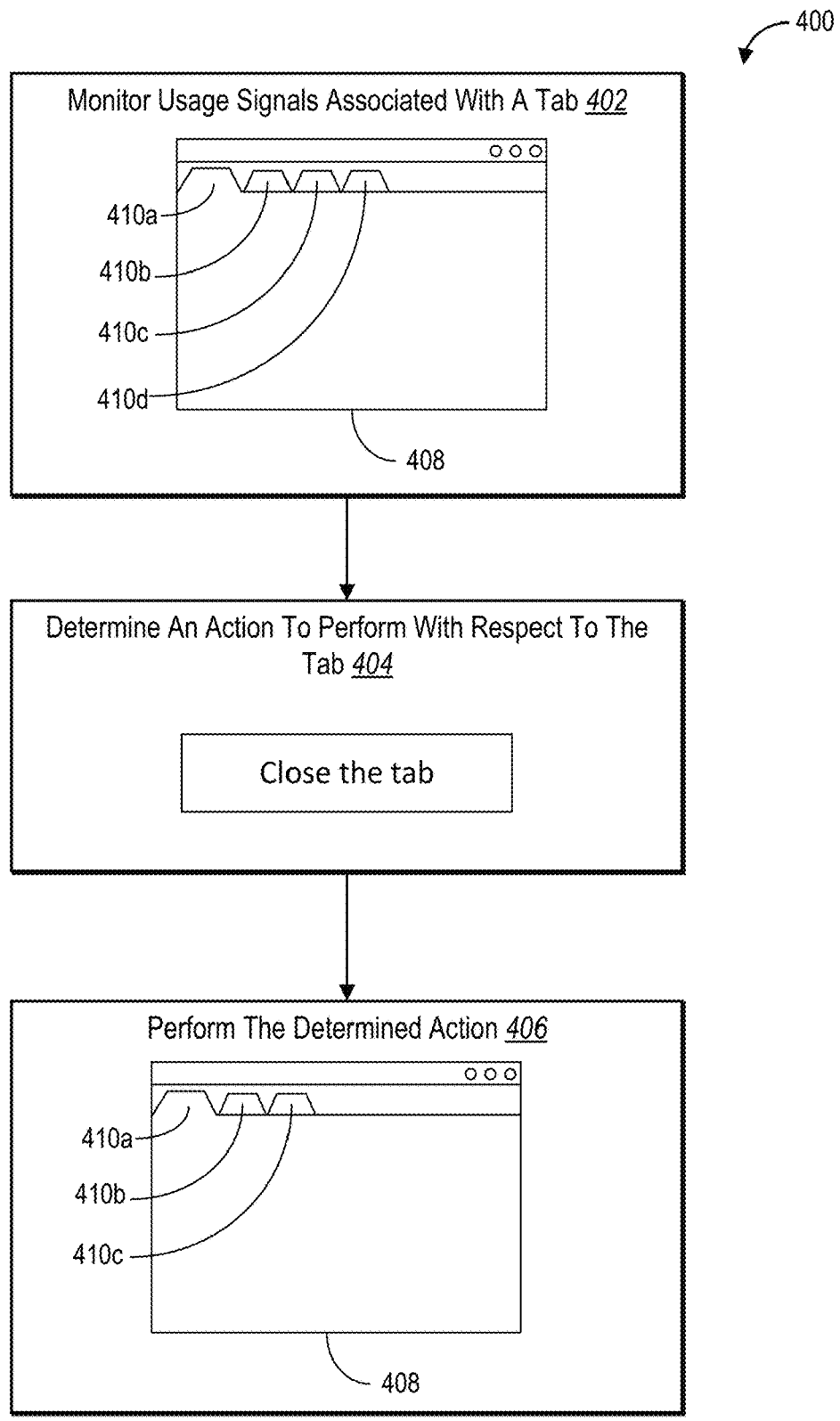
FIG. 4 illustrates a flow diagram illustrating performing an action with respect to a tab in accordance with one or more embodiments.

FIGS. 3A-3F provide example contextual hub management graphical user interfaces by which the contextual hub system 116 can receive user input for organizing tabs within contextual hubs. As mentioned previously, the contextual hub system 116 may also determine and automatically perform actions on tabs within contextual hubs without user input. FIG. 4 illustrates a general overview of the contextual hub system 116 performing a determined action on a tab of a contextual hub. FIG. 4 illustrates a series of acts 400 by which the contextual hub system 116 performs a determined action on a tab. In particular, the series of acts 400 includes an act 402 of monitoring usage signals associated with a tab, an act 404 of determining an action to perform with respect to the tab, and the act 406 of performing the determined action.

The series of acts 400 includes the act 402 of monitoring usage signals associated with a tab. Generally, the contextual hub system 116 receives and analyzes signals that indicate which tabs should remain open within a contextual hub and which tabs should be closed or otherwise deleted from a contextual hub. For example, the contextual hub system 116 can receive event reports from a contextual hub and analyze signals within the event report, such as view frequency, time last accessed, the type of content, the time spent viewing, and other signals. Additionally, the contextual hub system 116 can access user preferences relating to specific tabs.

Additionally, or alternatively, the contextual hub system 116 can monitor contextual hub features in determining an action to perform with respect to a tab. In particular, the contextual hub system 116 can analyze contextual hub features such as the number of tabs within the contextual hub, content within the contextual hub, and other features. As mentioned, the contextual hub system 116 can analyze the number of tabs within the contextual hub. For instance, based on determining that a contextual hub contains less than a threshold number of tabs, the contextual hub system 116 can determine to keep the contextual hub open. In contrast, based on determining that a contextual hub contains more than a threshold number of tabs, the contextual hub system 116 may automatically close or suggest closing tabs within the contextual hub. The contextual hub system may also analyze the content within the contextual hub. For instance, the contextual hub system 116 can determine the relevance of a tab within a contextual hub or whether content within a tab is repeated (i.e., duplicate web pages).

Figure 5:
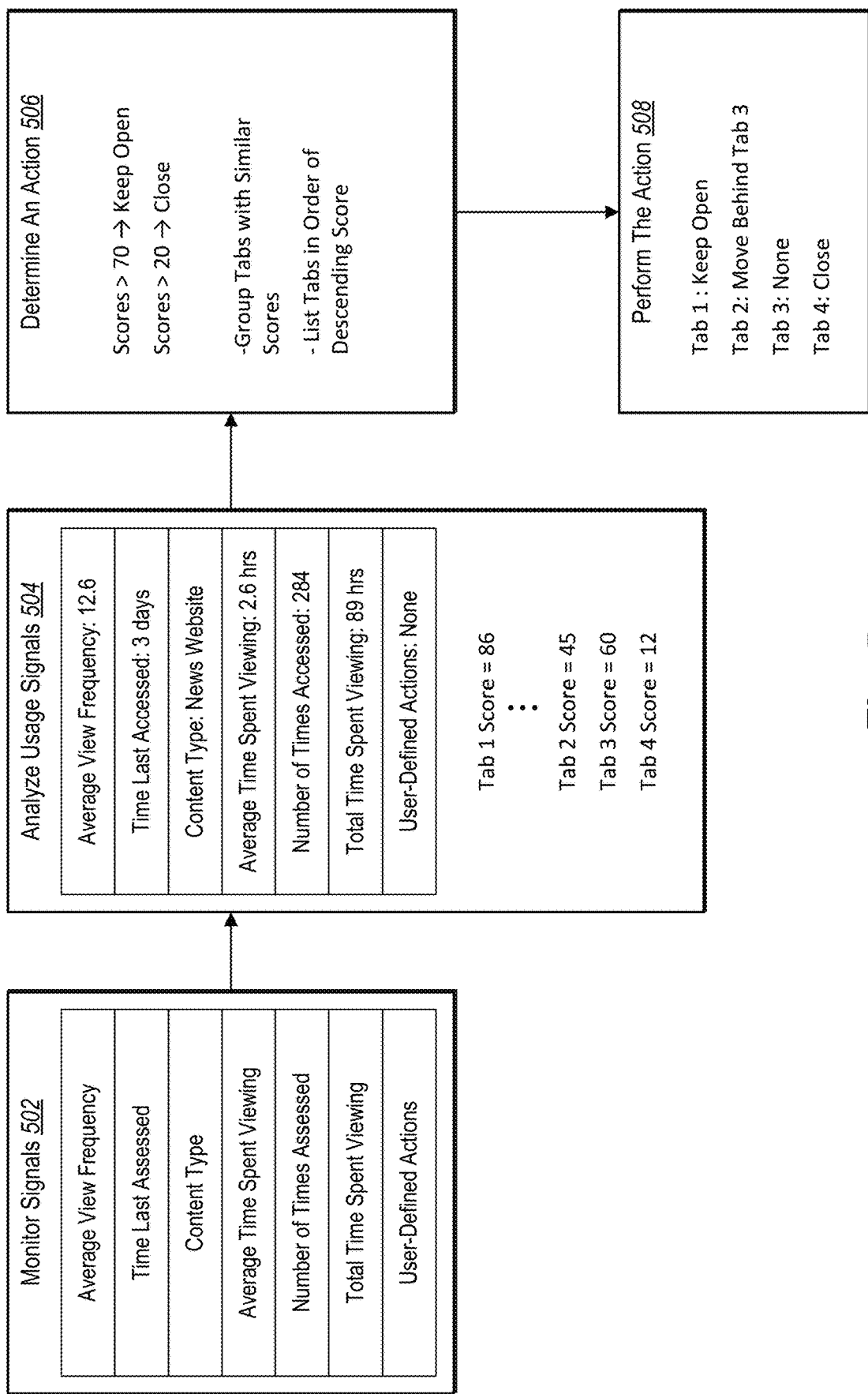
FIG. 5 illustrates an example series of acts for determining and performing an action with respect to a tab in accordance with one or more embodiments.

As illustrated in FIG. 4, a contextual hub 408 includes tabs 410a-410d. The contextual hub system 116 can monitor usage signals associated with each of the tabs 410a-410d. As further illustrated in FIG. 4, the series of acts 400 includes the act 404 of determining an action to perform with respect to the tab 410d. Generally, the contextual hub system 116 determines an action based on the usage signals associated with a tab. For instance, in at least one embodiment, the contextual hub system 116 assigns a usage score to each of the tabs within the contextual hub 408. The contextual hub system 116 may identify an appropriate action based on the usage score of the tab 410d. For instance, as illustrated in FIG. 4, the contextual hub system 116 determines an action of closing the tab based on a usage score that falls below a threshold. Additional examples of actions include suggesting, to the user, to close the tab, move the tab to a different contextual hub, or move the tab to a new contextual hub. FIG. 5 and the corresponding discussion provide additional detail regarding how the contextual hub system 116 determines an action to perform.

The series of acts 400 also includes the act 406 of performing the determined action. Generally, the contextual hub system 116 performs the action determined in the previous act. For example, as illustrated in FIG. 4, the contextual hub system 116 performs the determined action of closing the tab 410d. After the contextual hub system 116 closes the tab 410d, the contextual hub 408 includes only the tabs 410a-410c.

While FIG. 4 provides a broad overview of how the contextual hub system 116 performs actions on a tab within the contextual hub, FIG. 5 provides additional detail regarding how the contextual hub system 116 analyzes usage signals to determine and perform an action. FIG. 5 illustrates a series of acts 500 including an act 502 of monitoring signals, an act 504 of analyzing signals, an act 506 of determining an action, and an act 508 of performing the action.

As illustrated in the act 502 of FIG. 5, the contextual hub system 116 monitors usage signals. Generally, usage signals refer to information relating to user interaction with respect to a tab or related tabs within a contextual hub. The contextual hub system 116 can analyze different types of usage signals. For instance, and as illustrated, the contextual hub system 116 can monitor tab-specific signals 510 and source-specific signals 520 as part of monitoring usage signals. Generally, the tab-specific signals 510 include usage signals relating to a particular tab. For instance, the contextual hub system 116 monitors user interaction with the tab from the time the contextual hub system 116 creates the tab in the contextual hub to the present moment. Source-specific signals 520 relate to the source linked within the tab. For instance, if a tab represents or is associated with a specific website, the contextual hub system 116 can access and monitor usage signals associated with the particular website.

As illustrated, the tab-specific signals 510 include a number of times accessed, a time last accessed, and a total time spent viewing. The number of times accessed refers to the number of times a user selected and opened the particular tab since the tab was created. The time last accessed refers to the time when the user last selected and opened the particular tab. The contextual hub system 116 can measure the time last accessed by determining a time that has elapsed since the user last opened the particular tab. The total time spent viewing refers to the time spent by the user viewing the contents of the particular tab. Though not illustrated, the tab-specific signals 510 can also include additional signals such as tab-specific usage patterns. More specifically, the contextual hub system 116 can monitor what times of day, what days of the week, or what weeks of a month the user interacts with a particular tab.

As mentioned, usage signals also refer to the source-specific signals 520. Source-specific signals comprise use information related to the source of the tab. As illustrated in FIG. 5, the source-specific signals 520 include an average view frequency, content type, time spent viewing, duplicate status, content type, and user defined actions. The contextual hub system 116 monitors the average view frequency by accessing the number of times a user visits a web page over a defined period of time. For instance, the contextual hub system 116 can determine the average number of times a user visits a particular web page over the course of a day, week, month, etc. Time spent viewing reflects how much time a user spends on a particular web page. In one embodiment, the contextual hub system 116 monitors the total time a user has spent viewing a particular web page. In another embodiment, the contextual hub system 116 monitors an average time spent on a web page over the course of a day, week, month, etc. Duplicate status refers to whether the tab includes a source that is currently open in another tab. For instance, the contextual hub system 116 can compare the URL or address for the source within a tab with URL or source addresses of other tabs to determine whether a tab with the same source is already open.

As mentioned, as part of monitoring the source-specific signals 520, the contextual hub system 116 can monitor content type. Content type refers generally to the type of content within a web page. For instance, the contextual hub system 116 may access the URL to determine that a web page is a news source, digital messaging source, e-commerce source, or any other type of source. To determine the content type, the contextual hub system 116 can generate a matrix associating various web addresses with pre-determined content types. Additionally, or alternatively, the contextual hub system 116 can access the content of a web page as part of monitoring the content type.

Additionally, as part of monitoring the content type in monitoring the source-specific signals 520, the contextual hub system 116 can monitor the source of the web page. For instance, the contextual hub system 116 can determine whether the web page is an intermediate web page. For instance, a user may select a link, and the contextual hub system 116 can create a tab with an intermediate web page. The intermediate web page may redirect users to another website or open an application on the client device. Thus, the contextual hub system 116 can determine that intermediate web pages rarely contain information that will be accessed by the user. Furthermore, the contextual hub system 116 can monitor whether the web page within a tab is a landing page (e.g., the contextual hub system 116 opened the tab in response to user selection of a link) or a home page.

Additionally, as mentioned, the contextual hub system 116 can monitor usage signals based on user defined actions as part of monitoring the source-specific signals 520. The contextual hub system 116 can receive, from the client device, rules associated with particular web pages or categories of web pages. For instance, the contextual hub system 116 may whitelist particular web pages that the contextual hub system 116 will never automatically close. Additionally, the contextual hub system 116 may receive rules that dictate web pages or types of web pages that should automatically be closed.

As described, the contextual hub system 116 can monitor source-specific signals for the specific web page or source associated with the tab. In at least one embodiment, the contextual hub system 116 can also monitor source-specific signals associated with related web pages or sources. For instance, the contextual hub system 116 monitors or otherwise accesses signals associated with the specific URL of the tabbed web page. In at least one embodiment, the contextual hub system 116 accesses signals for web pages related to the linked web page. For instance, the contextual hub system 116 can monitor usage signals associated with URLs sharing the same domain name as the tabbed web page.

As further illustrated in FIG. 5, the contextual hub system 116 performs the act 504 of analyzing the usage signals. In at least one embodiment, the contextual hub system 116 compiles metrics for each of the monitored signals for a tab. For example, as illustrated, the contextual hub system 116 determines that the average view frequency for the web page is 12.6 times per day. The contextual hub system 116 determines that the user last accessed the web page 3 days prior, and that the content type is a news website. Additionally, the contextual hub system 116 determines that the user spends an average time of 2.6 hours per day on the particular web page, has accessed the web page 284 times, and has spent 89 hours on the web page.

The contextual hub system 116 may utilize a signal processing algorithm as part of the act 504 of analyzing the usage signals. In at least one embodiment, the contextual hub system 116 utilizes the signal processing algorithm to generate a score for a tab. Using the signal processing algorithm, the contextual hub system 116 can apply different weights to different usage signals to determine the score for a tab. In at least one embodiment, the contextual hub system 116 applies a greater weight to average view frequency than to time last accessed. For example, the contextual hub system 116 might determine that the time last accessed can be less important, especially if a user does not access a work-related source simply because it is the weekend. In at least one embodiment, the contextual hub system 116 solely analyzes the user-defined action if a user-defined action exists. For example, if the contextual hub system 116 determines that a particular web page has been whitelisted, the contextual hub system 116 can complete its usage signal analysis and proceed to determining an action.

In at least one embodiment, as part of the act 504 of analyzing tab signals, the contextual hub system 116 generates a tab score. For instance, a higher tab score corresponds to a higher probability that the user will reopen and access the particular tab. Lower tab scores correspond to a lower likelihood that the user will return to access the particular tab. For example, as illustrated in FIG. 5, the contextual hub system 116 assigns a relatively high tab score of 86 to tab 1 indicating that, based on the tab signals, the user is more likely to access tab 1. In contrast, the contextual hub system 116 assigns a lower tab score of 12 to tab 4, indicating that the user likely will not return to tab 4.

As illustrated in FIG. 5, the contextual hub system 116 performs the act 506 of determining an action. In particular, the act 506 comprises determining an action to perform with respect to the contextual hub. The contextual hub system 116 may determine to perform at least the following actions on a tab: close the tab, keep the tab open, move the tab to a new or different contextual hub, and reorder the tab within the same contextual hub. Additionally, or alternatively, the contextual hub system 116 may determine an action of sending a notification suggesting a course of action. For example, the contextual hub system 116 can provide, for display at a client device, a notification suggesting that the user close the tab or suggest a different contextual hub to which the user can move the tab.

As illustrated in FIG. 5, the contextual hub system 116 determines an action based on the tab scores determined in the previous act. For instance, the contextual hub system 116 can determine or receive a threshold open tab score and a threshold close tab score. Based on determining that a particular tab score meets a threshold open tab score, the contextual hub system 116 will determine to keep a tab open. For instance, the contextual hub system 116 can determine or receive a threshold open score of 70. Thus, based on determining that the score of tab 1 is above the threshold open score (i.e., 86>70), the contextual hub system 116 determines to keep tab 1 open.

As mentioned, the contextual hub system 116 may receive or determine a threshold open score. Based on determining that a particular tab score falls below the threshold close tab score, the contextual hub system 116 may either automatically close the particular tab or provide a notification to the user that suggests closing the tab. For example, as illustrated in FIG. 5, the contextual hub system determines that the tab score for tab 4 (i.e., score=12) falls below the threshold close tab score of 20. Thus, the contextual hub system 116 either automatically or suggests closing tab 4.

Additionally, the contextual hub system 116 can associate particular actions with ranges of tab scores. In one embodiment, and as illustrated in FIG. 5, the contextual hub system 116 determines to group tabs with similar scores. In particular, the contextual hub system 116 determines to move tabs 2 and 3 within the same contextual hub based on determining that the tab scores for tabs 2 and 3 fall within a predetermined range of 40-70. Additionally, or alternatively, the contextual hub system 116 can determine a range of tab scores based on the tab scores of tabs within an existing contextual hub. For instance, based on determining that a loose tab (i.e., a single tab within its own contextual hub or window) has a tab score within a range of tab scores, the contextual hub can either automatically move the loose tab to the existing contextual hub or provide a notification suggesting that the user move the loose tab to the existing contextual hub.

In one or more embodiments, the contextual hub system 116 determines to perform an action based on usage patterns associated with a tab. In particular, the contextual hub system 116 can determine patterns of a user accessing one or more tabs to determine two tabs are related. For instance, the contextual hub system can determine a time of day a user accesses a tab and more specifically determine hours when the user most actively interacts with the tab. In at least one embodiment, the contextual hub system 116 calculates usage patterns by determining the length of average usage session for each hour of the day for a determined period of time (e.g., day, week, month, year, etc.).

The contextual hub system 116 may determine to move a tab from one contextual hub to another based on usage patterns. Generally, the contextual hub system 116 can group tabs within a contextual hub to consolidate tabs that the user will likely access at the same time. In particular, the contextual hub system 116 may determine to group tabs based on frequency of use. For example, the contextual hub system 116 may group a first set of tabs that are used on a daily basis and a second set of tabs that are used less frequently. Furthermore, the contextual hub system 116 may determine to group tabs based on common access hours. For example, the contextual hub system may create a first contextual hub comprising tabs that are normally accessed during work hours (e.g., 9 am to 5 pm) and a second contextual hub comprising tabs that are normally accessed during off-work hours. Similarly, the contextual hub system 116 move a tab to a contextual hub based on determining that tabs within the contextual hub are usually accessed during weekends, and that usage patterns associated with the tab suggest that the tab is accessed during weekends.

Moreover, the contextual hub system 116 may detect that a user is performing a back-and-forth tab navigation between two or more tabs as a usage pattern. In other words, by detecting that a user is accessing a first tab, then a second tab, then a first tab again within a threshold period of time (e.g., 10 minutes) the contextual hub system 116 determines that it is likely the user accessing both tabs for the same project and can suggest to the user to combine the tabs into a single contextual hub. In addition, the contextual hub system 116 may detect a threshold number of times the user has to perform the back-and-forth tab navigation prior to determining to suggest or combine the tabs. In some embodiments, the contextual hub system can automatically combine the tabs and provide a notification to the user that the tabs have been combined. The contextual hub system 116 can detect other navigational or usage patterns. Other usage patterns include detecting a copy and paste usage pattern from a source to one or more other sources. In addition, a usage pattern can include the detecting a particular navigational sequence (e.g., source A, then source B, then source C) a threshold number of times to identify a relationship between source A, source B, and source C to determine whether to suggest to combine or automatically combine the sources into a contextual hub.

In addition to usage patterns, the contextual hub system 116 can determine to suggest or to automatically combine two tabs in a particular contextual hub based on a content similarity score between content within a tab and contextual information related to a contextual hub. For instance, the contextual hub system 116 can compare content within a web-accessible source (e.g., content within a third-party web site or content within a document within a content management system) to contextual information of a contextual hub to generate a content similarity score. If, for example, the content similarity score between the web-accessible source and the contextual hub matches a defined threshold (which can be user or system defined), then the contextual hub system 116 can suggest adding the web-accessible source to the contextual hub. In one or more embodiments the contextual hub system 116 identifies key words associated with a source to generate the word vector for the source. Similarly, the contextual hub system 116 can identify key words associated with a contextual hub and generate a word vector for the contextual hub. Then, the contextual hub system 116 can compare the two word vectors to determine a difference between the word vectors, which results in the content similarity score. Thus, the lower the difference, the more similar the source and the contextual hub. Other scoring systems can be used as well, including counting and/or comparing key words.

The contextual hub system 116 may also determine to perform actions within a contextual hub based on the analyzed usage signals, usage patterns, and/or content similarities. For example, and as illustrated, the contextual hub system 116 can list tabs within a contextual hub in order of descending score. In certain embodiments, the contextual hub system 116 lists tabs in ascending order. In addition to determining actions to perform with respect to a tab based on tab scores, the contextual hub system 116 may also determine to perform actions based on user-submitted contextual hub preferences. In particular, the contextual hub system 116 may receive contextual hub preferences from the user. Tab and contextual hub preferences may be usage signal-based or content-based. A user might submit a usage signal-based contextual hub preference for closing tabs after a certain period of inactivity (e.g., hours, days, etc.). Similarly, a user might submit a signal-based contextual hub preference for keeping tabs open based on a base activity level. For instance, the contextual hub system 116 may keep a tab open as long as it is accessed once a day. Additionally, the contextual hub system 116 can receive content-based contextual hub preferences.

Additionally, the contextual hub system 116 can receive time constraints for user-submitted contextual hub preferences. In particular, the contextual hub system 116 can determine when to apply or disregard user-submitted contextual hub preferences. For instance, the contextual hub system 116 may disregard user-submitted contextual hub preferences outside of regular work hours.

The foregoing discussion provides several examples of how the contextual hub system 116 performs the act 506 of determining an action based on analyzing tab usage signals. In other embodiments, the contextual hub system 116 may utilize other methods to determine an action. In particular, in at least one embodiment, the contextual hub system 116 can utilize a trained action prediction machine learning model to receive and analyze tab signals to predict actions with respect to a tab. The contextual hub system 116 trains the action prediction machine learning model by inputting training data including training tab signals. The machine learning model generates predicted actions based on the training data. The contextual hub system performs a loss function by comparing the predicted actions with ground truth actions. The contextual hub system 116 modifies parameters of the action prediction machine learning model to reduce the loss. During application, the contextual hub system 116 applies the action prediction machine learning model to tab usage signals from the client device. The contextual hub system 116 may further modify parameters of the action prediction machine learning model based on user feedback including whether the user accepts or rejects the predicted actions. Thus, the contextual hub system 116 may intelligently perform the act 506 of determining an action.

As illustrated in FIG. 5, the series of acts 500 includes the act 508 of performing the action. Generally, the contextual hub system 116 executes the action determined in the previous act. For instance, the contextual hub system 116 can close the tab, keep the tab open, move the tab to a new or different contextual hub, and reorder the tab within the same contextual hub.

Figure 6:
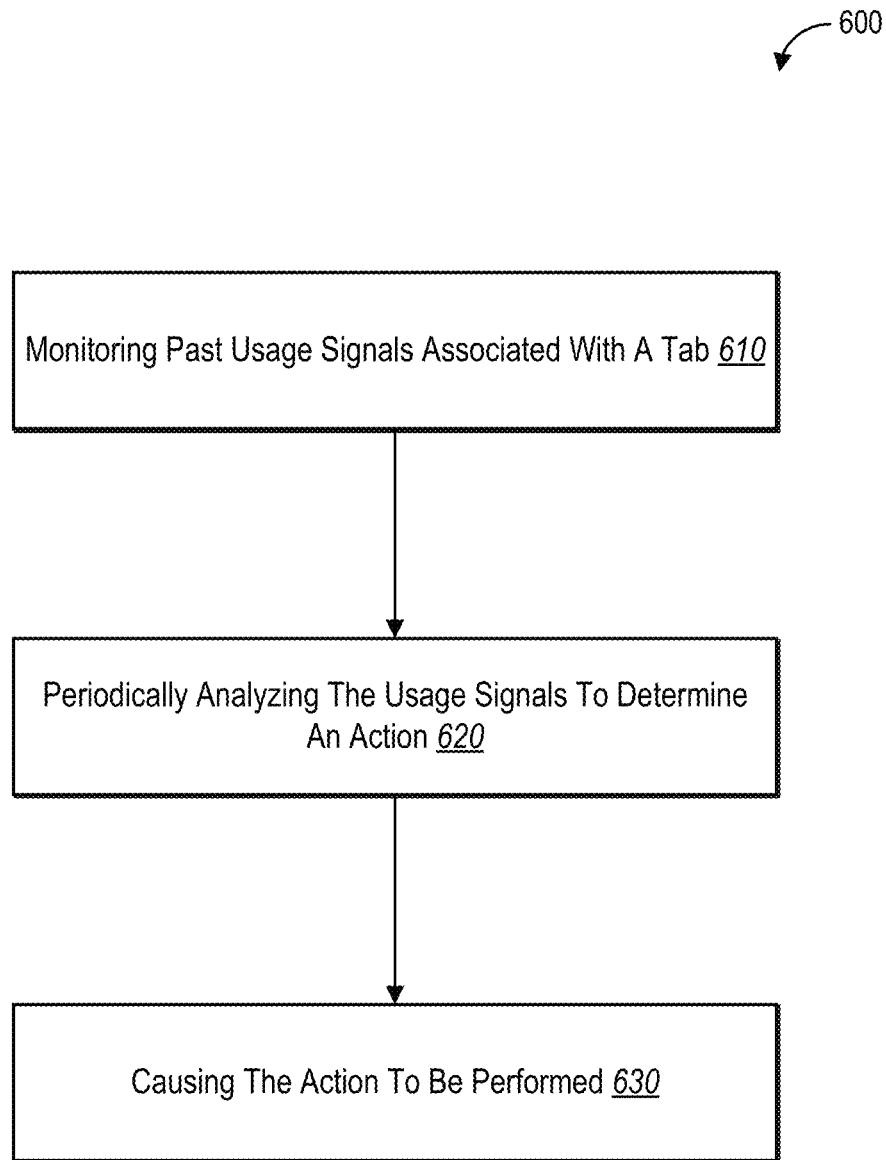
FIG. 6 illustrates a flowchart of a series of acts for determining and performing an action with respect to a tab in accordance with one or more embodiments.

FIGS. 1-5, the corresponding text, and the examples, provide a number of different systems and devices for performing actions on tabs. In addition to the foregoing, embodiments of the present disclosure can also be described in terms of flowcharts comprising acts and acts in a method for accomplishing a particular result. For example, FIG. 6 illustrates a flowchart of exemplary methods in accordance with one or more embodiments of the present disclosure. The methods described in relation to FIG. 6 may be performed with fewer or more act/acts or the act/acts may be performed in a different order. Additionally, the act/acts described herein may be repeated or performed in parallel with one another or in parallel with different instances of the same or similar act/acts.

FIG. 6 illustrates a flowchart of one example method 600 of performing an action on a tab within a contextual hub. The method 600 includes an act 610 of monitoring past usage signals associated with a tab. In particular the act 610 comprises monitoring past usage signals associated with a tab of a plurality of tabs within a contextual hub, wherein the plurality of tabs comprise content from a plurality of third-party sources. In at least one embodiment, the plurality of tabs is associated with third-party sources. Additionally, in at least one embodiment, the past usage signals comprise at least one of: view frequency, time last accessed, content type, time viewed, or user-defined traits. In at least one embodiment, the third-party sources comprise third-party websites.

As illustrated in FIG. 6, the method 600 includes an act 620 of periodically analyzing the usage signals to determine an action. In particular, the act 620 comprises periodically analyzing, by at least one processor, the past usage signals to determine an action to perform with respect to the tab. In at least one embodiment, the act 620 comprises periodically analyzing, by at least one processor, the past usage signals to determine an action to perform with respect to the tab by generating a usage score for the tab. In at least one embodiment, analyzing the past usage signals in act 620 comprises comparing the past usage signals associated with the tab with past usage signals associated with the plurality of tabs. In at least one embodiment, the action comprises automatically closing the tab or presenting a notification to close the tab. In at least one embodiment, the act 620 comprises determining the action to perform with respect to the tab based on user-defined tab management preferences.

As illustrated in FIG. 6, the method 600 includes an act 630 of causing the action to be performed. In particular, the act 630 comprises causing, by the at least one processor, the action to be performed with respect to the tab. Additionally, in at least one embodiment, the act 630 comprises based on the usage score for the tab, causing, by the at least one processor, the action to be performed with respect to the tab.

The method 600 can comprise the additional acts of monitoring usage patterns associated with the tab and at least one tab from a second contextual hub; and moving the tab from the first contextual hub to the second contextual hub based on the usage patterns.

The method 600 can further comprise the additional acts of comparing content associated with the tab with contextual information associated with at least one tab from a second contextual hub to generate a content similarity score; and moving the tab from the first contextual hub to the second contextual hub based on the content similarity score.

In one or more embodiments, the method 600 further comprises the additional acts of generating, by the at least one processor, a usage score for the tab based on the past usage signals; comparing, by the at least one processor, the usage score with a plurality of usage scores associated with the plurality of tabs; and based on the comparison, causing, by the at least one processor, the action to be performed with respect to the tab.

The Contextual Hub as a Content Curator

In addition to organizing and managing tabs within a contextual hub, the contextual hub system 116 may also intelligently curate content for display within a contextual hub. FIGS. 7-15 and the corresponding discussion provide details regarding how the contextual hub system 116 may curate content within a contextual hub. For instance, as mentioned, a contextual hub can curate content and provide relevant web-accessible content from across various third-party sources in a single interface. To provide this functionality, the contextual hub system 116 can generate a contextual model that identifies related web-accessible content to group relevant content within a single contextual hub. For instance, by utilizing third-party source APIs and the contextual model, the contextual hub system 116 can identify digital messages, websites, calendar items, and other content from across various third-party sources that is relevant to the contextual hub topic.

To illustrate, the contextual hub system 116 may associate a contextual hub with a variety of third-party sources such as digital messaging sources, digital media sources, calendar sources, and others. As mentioned previously, the contextual hub system 116 can generate a contextual model that corresponds to a particular contextual hub based on contextual information associated with the plurality of third-party sources within the contextual hub. For instance, the contextual hub system 116 can identify common themes, projects, set of users, or other traits of content within a particular hub. The contextual hub system 116 may utilize the contextual hub to identify related information from a third-party source (or internal source) and add a link to the related information to the contextual hub.

Figure 7:
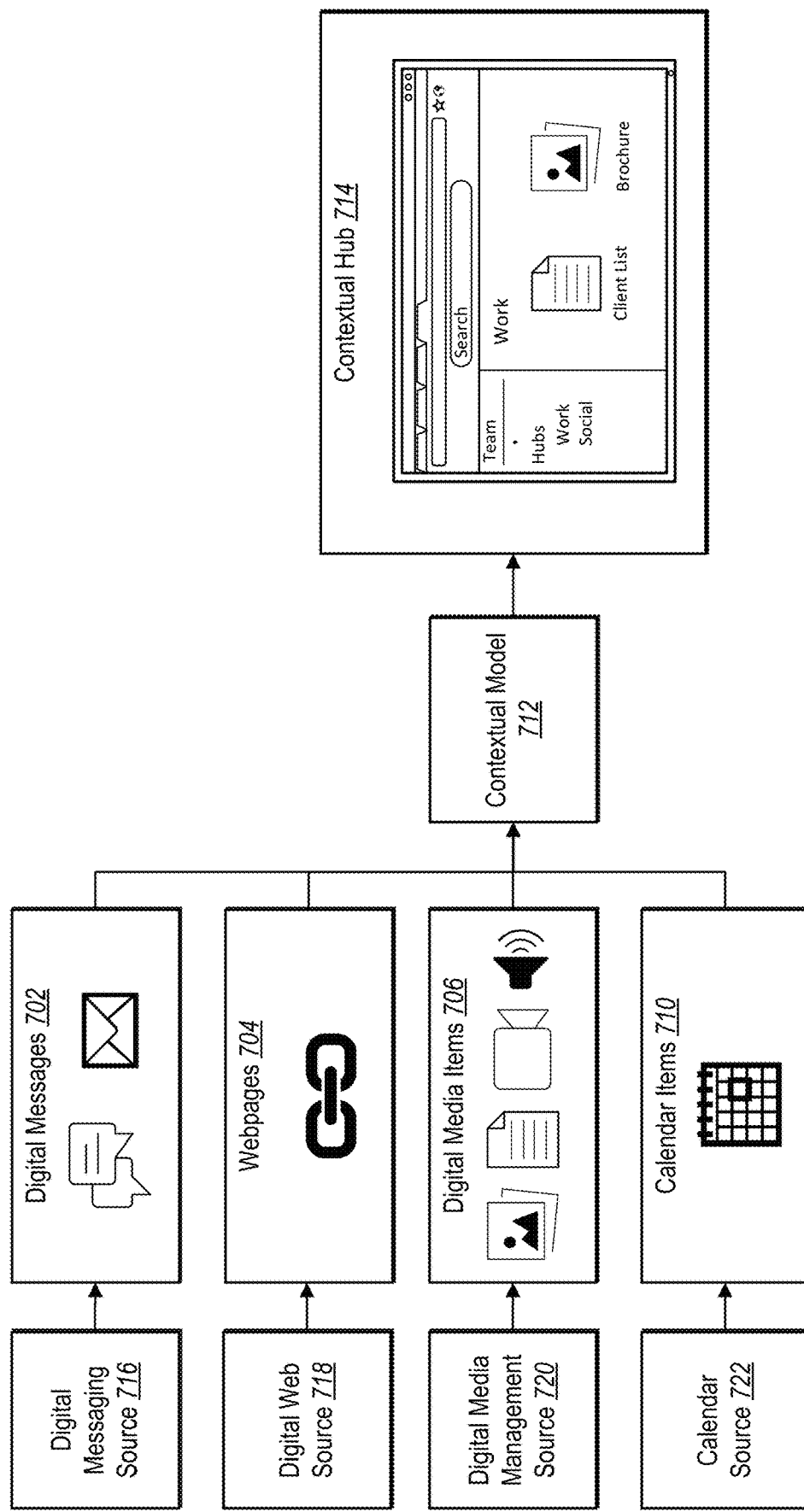
FIG. 7 illustrates example third-party sources and web-accessible content in accordance with one or more embodiments.

FIG. 7 illustrates several examples of types of web-accessible content from third-party sources that the contextual hub system 116 may associate with a contextual hub. As illustrated in FIG. 7, the contextual hub system 116 may include information from a plurality of third-party sources within a single contextual hub. Examples of third-party sources include a digital messaging source 716, a digital web source 718, a digital media management source 720, and a calendar source 722. The following paragraphs describe each of these sources and web-accessible content from these sources. Based on determining that the identified information is related to a contextual hub 714, the contextual hub system 116 can add links to the related information to the contextual hub 714.

As illustrated in FIG. 7, examples of the third-party sources include the digital messaging source 716. Generally, the digital messaging source 716 can comprise any sort of digital messaging system. In particular, the digital messaging source 716 can include digital messaging systems that transmit digital messages from one user to another across a network. For example, the digital messaging source 716 can include an email system, an instant messaging system, a text messaging system, or other types of messaging systems.

Generally, the digital messaging source 716 stores and manages communication information including digital messages 702. In particular, the digital messages 702 include data transmitted from one user to another user within the digital messaging source 716. For example, the digital messages 702 can include emails, instant messages, text messages, and others comprising text data, image data, audio data, video data, and other types of media files. The contextual hub system 116 can determine to include links to individual digital messages, attachments, and/or conversations comprising a series of digital messages, within the contextual hub 714. Additionally, the digital messages 702 also includes links to other web-accessible sources that have been sent via the digital messaging source 716.

As further illustrated in FIG. 7, another example of a third-party source includes the digital web source 718. Generally, the digital web source 718 comprises any type of web storage and management system. In particular, the digital web source 718 includes a web server or servers that stores web server software and component files for a website. For example, the digital web source 718 can comprise one or more web servers that store, process, and deliver websites, web pages, web documents, and/or web applications to client devices. The contextual hub system 116 can access web pages 704 from the digital web source 718. In particular, the contextual hub system 116 can determine to include links to individual web pages, and/or excerpts of digital web pages within the contextual hub 714. For instance, the web pages 704 can include web pages that a user has visited through a web browser and/or via the contextual hub 714.

As further illustrated in FIG. 7, the third-party sources may also include the digital media management source 720. Generally, the digital media management source 720 comprises systems that store and manage digital content. In particular, the digital media management source 720 can include cloud storage systems that facilitate the storage, management, and or editing of digital media items 706. For example, the digital media management source 720 can include image, document, video, audio, and other file type management systems. In one or more embodiments, the digital media management source 720 can be the content management system illustrated in FIG. 1. Accordingly, in some embodiments the digital media management source 720 can be either a third-party source or an internal source, as described above with respect to FIG. 1.

As illustrated, the contextual hub system 116 can access the digital media items 706 from the digital media management source 720. Generally, the digital media items 706 comprise any type of digital content available as a file. In particular, a digital media item can include an online cloud storage document, a portable document format (e.g., a "PDF") document, or a digital media file (e.g., a digital video file, a digital image file, a digital audio file), or other types of digital media content. As mentioned, the contextual hub system 116 can provide links to the digital media items 706 within the contextual hub 714. The contextual hub system 116 can provide, within the contextual hub 714, a link for a single digital media content item (e.g., a photo, document, video, audio file, etc.) and/or a group of digital media content items (e.g., a folder).

The third-party sources may also include the calendar source 722. Generally, the calendar source 722 includes any sort of calendar management system. In particular, the calendar source 722 can comprise a calendar system that allows one or more users to edit and optionally share access to an online calendar. For instance, the calendar source 722 can comprise a web application that generates, stores, manages, and associates calendars with one or more users.

The contextual hub system 116 can access calendar items 710 from the calendar source 722 and add links to the calendar items 710 to the contextual hub 714. In particular, the calendar items 710 comprise digital content items associated with an online calendar. For instance, the calendar items 710 can include individual events, a group of events, or even entire calendars.

Although FIG. 7 illustrates some examples of third-party sources, the contextual hub system 116 can access other third-party sources not illustrated. In particular, third-party sources can comprise any type of third-party system that manages and provides web-accessible content as described herein.

As illustrated in FIG. 7, the contextual hub system 116 utilizes the contextual model 712 to identify related content from third-party sources. The contextual hub system 116 can generate the contextual model 712 based on user-defined rules and/or based on characteristics of the contextual hub 714. As will be discussed in additional detail below, the contextual model 712 can comprise a machine learning model, a contextual graph (e.g., with nodes and edges indicating content and user relationships), or a contextual filter. Generally, the contextual model 712 analyzes contextual information associated with a plurality of sources within the contextual hub to determine common themes, users, and other content. Based on determining the common content, the contextual model 712 identifies related information from the third-party sources.

In some embodiments, the contextual hub system 116 accesses a repository of contextual models to identify and select a pre-generated contextual model. In particular, the contextual hub system 116 may store contextual models as the contextual hub system 116 generates them. Furthermore, the contextual hub system 116 can store characteristics of the pre-generated contextual models. For instance, the contextual hub system 116 can associate pre-generated contextual models with contextual information of the corresponding contextual hub. Thus, the contextual hub system 116 can simply compare contextual information of a contextual hub with characteristics of the pre-generated contextual models to designate a closest matching pre-generated contextual model as the contextual model 712.

As further illustrated in FIG. 7, the contextual model 712 adds links to related information from various third-party sources within the contextual hub 714. Generally, the contextual hub 714 comprises a single space that provides access to contextually related content from various web-accessible sources (e.g., third-party sources and/or internal sources). As previously described, the contextual hub 714 presents tabs corresponding to various sources. In addition to organizing and presenting tabs within the contextual hub 714, the contextual hub system 116 can organize and present content and information from other third-party sources.

Thus, instead of requiring a user to open several different websites to access electronic mail, digital media items, instant messaging systems, etc. to identify project-specific channels or messages, the contextual hub 714 acts as a single user interface that surfaces links to relevant information and content. For instance, the contextual hub system 116 can identify relevant information to the contextual hub 714 in a web page, an email, a messaging conversation, and an electronic calendar, and the contextual hub system can provide for presentation within the contextual hub interface a link to each of the relevant information items.

As mentioned, the contextual hub 714 contains contextually related information and content. In particular, content within a contextual hub 714 can be related to particular topics, things, goals, projects, tasks, people, and other categories. Additionally, the contextual hub system 116 can generate and manage a plurality of contextual hubs—each emphasizing a different theme. As illustrated in FIG. 7, the contextual hub 714 displays various accessible contextual hubs directed toward the topics "Work," and "Social." As will be discussed in additional detail below, the contextual hub 714 may display additional information such as history, related links, and other information.

Figure 8:
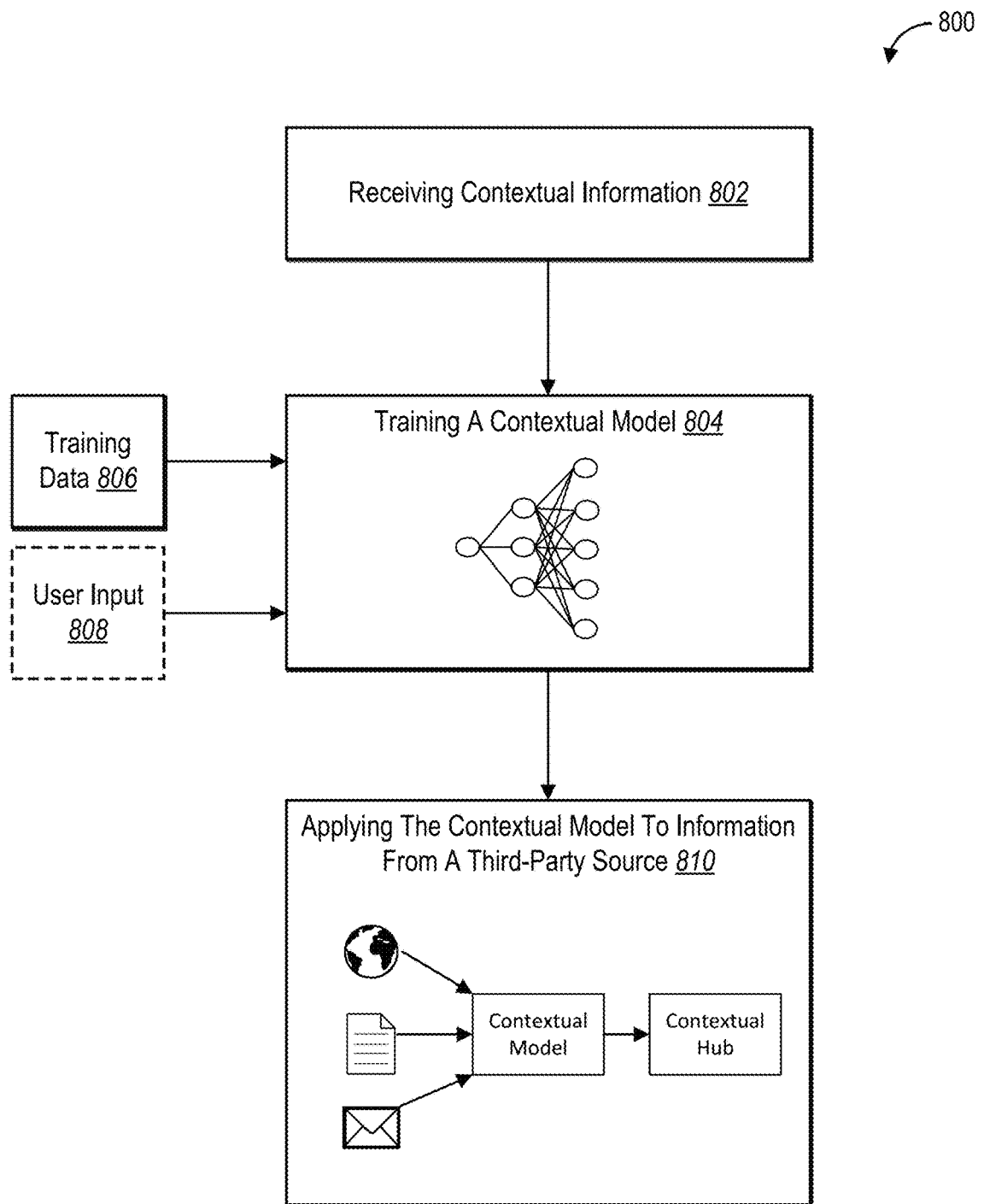
FIG. 8 illustrates an example series of acts for training and applying a contextual model in accordance with one or more embodiments.

As previously mentioned, the contextual model can train a machine learning contextual model. FIG. 8 illustrates a series of acts 800 for training and applying a machine learning contextual model in accordance with one or more embodiments. As illustrated, the series of acts 800 comprises an act 802 of receiving contextual information, act 804 of training a contextual model, and act 810 of applying the contextual model to information from a third-party source.

As illustrated in FIG. 8, the series of acts 800 includes the act 802 of receiving contextual information. In particular, and as previously mentioned, contextual information refers to data from content within a contextual hub. In at least one embodiment, content within a contextual hub comprises content that a user has manually entered into a contextual hub. For example, content within a contextual hub can include content from various third-party sources, links sent to the contextual hub, open tabs within the contextual hub, historical browsing history within the contextual hub, links sent from the contextual hub, and other signals. Information that the contextual hub system 116 can access includes, but is not limited to, metadata for content within the contextual hub, keywords associated with the content, and other contextual information. Furthermore, the contextual hub system 116 can access information related to the contextual hub but not necessarily within the contextual hub. For instance, the contextual hub system 116 can analyze user-defined rules, users associated with the contextual hub, user defined labels, and other related information.

Figure 9:
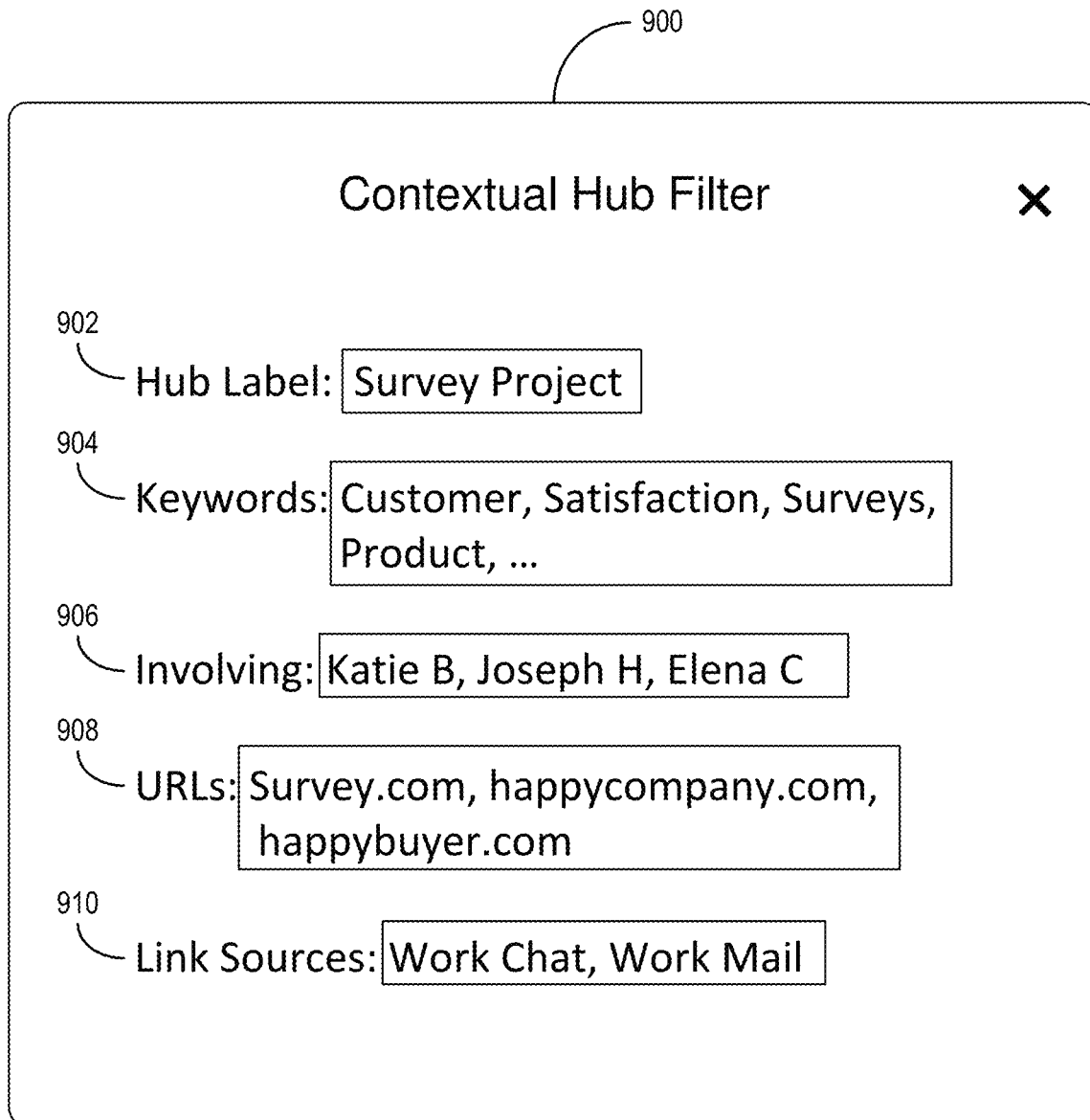
FIG. 9 illustrates an example contextual hub filter in accordance with one or more embodiments.
Figure 10:
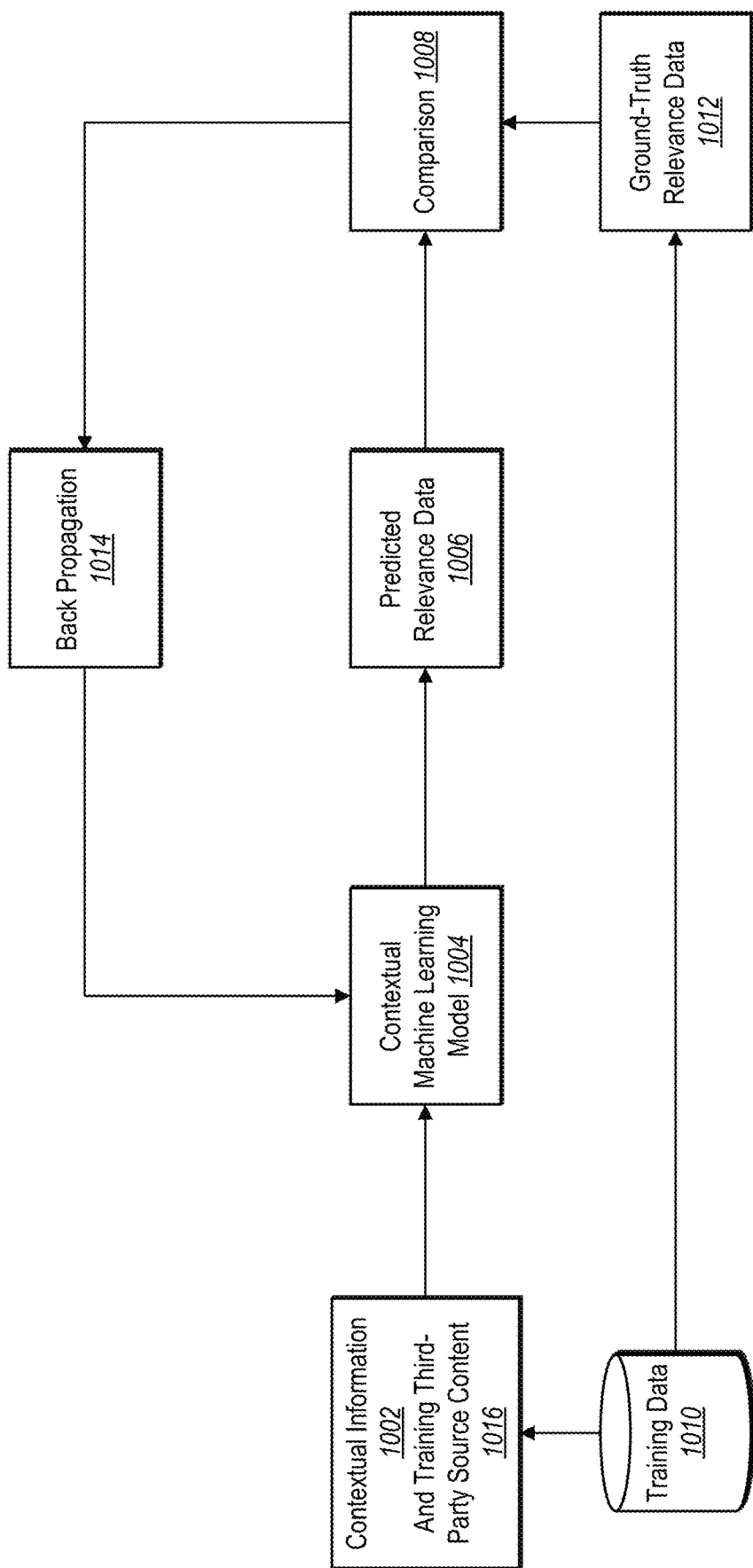
FIG. 10 illustrates training a contextual machine learning model to generate predicted contextual models in accordance with one or more embodiments.

The series of acts 800 also includes the act 804 of training a contextual model. In at least one embodiment, and as illustrated, the contextual model comprises a contextual machine learning model. FIG. 10 and the corresponding discussion provide additional detail regarding training a contextual machine learning model. In at least one embodiment, the contextual model comprises a dynamic filter. FIG. 9 and the accompanying discussion provide additional detail regarding the contextual model as a filter.

As illustrated in FIG. 8, the contextual hub system 116 performs the act 804 of training the contextual model by utilizing training data 806. Generally, the training data 806 comprises an initial set of data that includes training contextual information and training contextual model parameters. In some embodiments, the contextual hub system 116 utilizes training data that is specific to a particular user or group of users associated with the contextual hub. For instance, the contextual hub system 116 utilizes, as training data, parameters dictated by the user or group of users and the content within the contextual hub. In other embodiments, the contextual hub system 116 utilizes training data from related contextual hubs. For instance, in at least one embodiment, the contextual hub system 116 accesses parameters and content for all contextual hubs accessible to the contextual hub system 116 and/or contextual hubs that include content items from the same or similar third-party sources. To illustrate, the contextual hub system 116 can generate more specific and accurate contextual models by accessing the training data 806 from specific third-party sources (e.g., a particular email system, a particular instant messaging system, etc.) across various contextual hubs and associated users.

As part of performing the act 804 of training the contextual model, the contextual hub system 116 may also utilize user input 808. Generally, the contextual hub system 116 can further modify parameters of the contextual model to better suit a particular user's needs by receiving the user input 808. In at least one embodiment, the contextual hub system 116 trains the contextual model, and based on the contextual model, suggests adding content to the contextual hub. The contextual hub system 116 can receive the user input 808 which indicates whether the content is related to the contextual hub. The contextual hub system 116 can utilize the user input 808 to further modify the parameters of the contextual model to deliver more accurate and more personalized results to the user. Additionally, or alternatively, the contextual hub system 116 can utilize the user input 808 in the initial training of the contextual model. For example, the contextual hub system 116 can receive explicit user-defined preferences for the contextual hub.

As illustrated in FIG. 8, the contextual hub system 116 performs the act 810 of applying the contextual model to information from a third-party source. Generally, the contextual hub system 116 identifies related information using the contextual model. In at least one embodiment, the contextual hub system 116 applies the contextual model to information that a user is currently accessing via the contextual hub. For instance, if the user accesses a web page, the contextual hub system 116 applies the contextual model to the web page to identify related content to the particular contextual hub. Based on detecting that the web page includes content related to a different contextual hub, the contextual hub system 116 can open the web page in a window corresponding to the different contextual hub. Thus, the contextual hub system 116 can actively manage tabs within a contextual hub to ensure that tabs within the contextual hub are all related to a common topic or theme.

Additionally, or alternatively, the contextual hub system 116 can retroactively apply the contextual model to information sent, accessed, or otherwise associated with a user. In particular, in at least one embodiment, the contextual hub system 116 applies the contextual model to links associated with a user in the past. More specifically, the contextual hub system 116 can create a repository of links comprising links sent to and from the user via various third-party sources (e.g., digital messaging systems, instant messaging systems, etc.). Thus, the contextual hub system 116 can suggest or automatically add links that have been communicated with or sent by the user to a particular contextual hub. Additionally, in some embodiments, the repository of links further comprises all links within a web browsing history associated with the user. For instance, the repository of links can include all URLs for web pages visited by the user. Thus, based on applying the contextual model to the repository of links, the contextual hub system 116 can also provide a sorted focused web browsing history to the user via the contextual hub.

Figure 11:
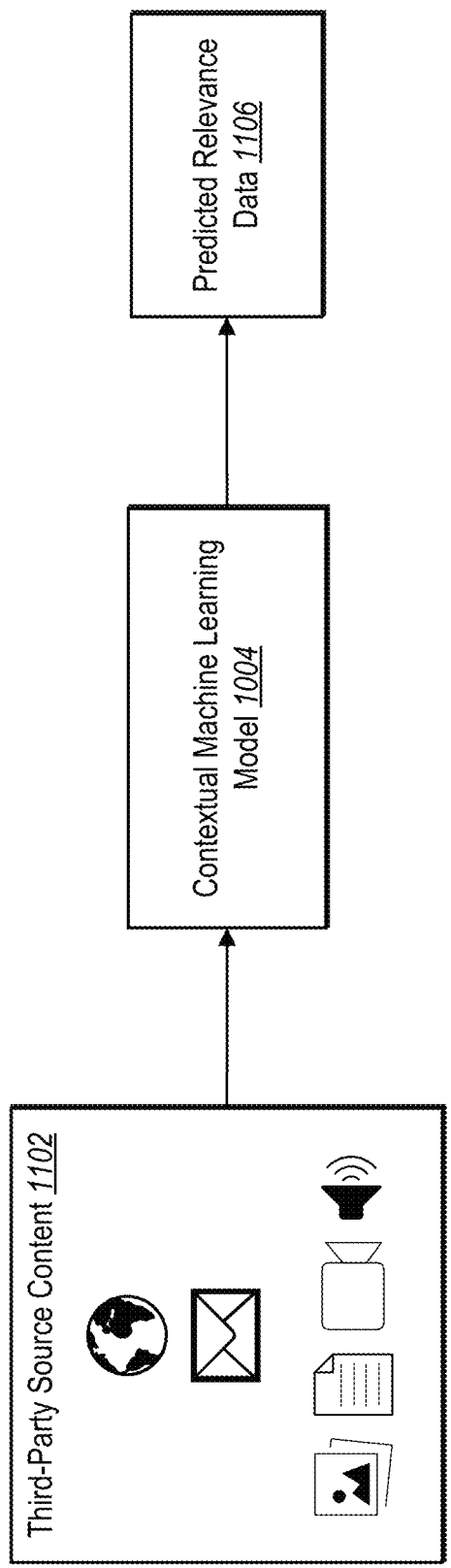
FIG. 11 illustrates applying the contextual machine learning model to add related information to a contextual hub in accordance with one or more embodiments.

As discussed previously, the contextual hub system 116 can generate and train various types of contextual models. For instance, the contextual model can comprise a filter as illustrated in FIG. 9. Additionally, the contextual model can comprise a contextual machine learning model. FIGS. 10-11 and the corresponding discussion provide additional detail regarding training and applying a contextual machine learning model.

FIG. 9 illustrates an example contextual hub filter element 900 that the contextual hub system 116 can present to a user via a graphical user interface. The contextual hub filter element 900 can illustrate various contextual hub characteristics that the contextual hub system 116 can use to identify related information to add to a contextual hub. The contextual hub filter element 900 includes various contextual hub characteristics that the contextual hub system 116 can utilize to filter information that is related to the focus of a contextual hub. For instance, the contextual hub filter element 900 includes a hub label element 902, a keywords element 904, a related users element 906, a URL element 908, and a link source element 910.

As mentioned above, the contextual hub system 116 may generate a contextual model based, at least in part, on user-defined preferences. In at least one embodiment, the contextual hub system 116 presents the contextual hub filter element 900 to the user at the time of creating a contextual hub. The contextual hub system 116 may utilize user input into the contextual hub filter element 900 to define information that the contextual hub system 116 will add to a contextual hub. For example, the contextual hub system 116 can present the contextual hub filter element 900 with empty fields. The contextual hub system 116 can receive, as input, user responses within the hub label element 902, the keywords element 904, the related users element 906, the URL element 908, and the link source element 910.

In other embodiments, instead of requiring a user to explicitly dictate the constraints of a contextual hub filter, the contextual hub system 116 can analyze content that a user has already accessed within a contextual hub, determine characteristics of the contextual hub, and predict the constraints of the contextual hub filter. The contextual hub system 116 may begin automatically filtering content according to the predicted contextual hub filter. For instance, the contextual hub system 116 may predict a contextual hub label, keywords, users, URLs, link sources, and other characteristics of the contextual hub. In at least one embodiment, the contextual hub system 116 can surface the predicted contextual hub filter for display via the user client device based on receiving a user request. The component elements of the contextual hub filter element 900 can comprise interactive elements so the user can select and modify individual filter constraints.

The following discussion describes each of the example contextual hub filter constraints illustrated in FIG. 9. Generally, the contextual hub filter constraints are determined based on characteristics of contextual hub content. The contextual hub system 116 may utilize any one or a combination of the following constraints to identify relevant information from third-party sources. For instance, as illustrated by the hub label element 902, the contextual hub system 116 can identify related information based on a contextual hub label. As previously mentioned, the contextual hub system 116 can automatically determine the contextual hub label or receive the contextual hub label as input. The contextual hub filter may identify related information from third-party sources based on determining that the content of a third-party source is significantly related to the contextual hub label. For instance, the contextual hub system 116 can perform a semantic analysis of content from third-party sources to determine whether the content is significantly related to the contextual hub label.

Similarly, as illustrated by the keywords element 904, the contextual hub system 116 may utilize keywords identified within the contextual hub to identify related information from third-party sources. Generally, the contextual hub system 116 can identify one or more keywords associated with a contextual hub. For instance, the contextual hub system 116 may automatically identify a keyword within content of a contextual hub by determining that the keyword occurs in the content at least a threshold number of times. In other embodiments, the contextual hub system 116 can analyze metadata of content within the contextual hub to determine common themes or keywords. Based on determining that information from a new third-party source includes the identified keywords (and/or related words), the contextual hub system 116 can determine that the information is related to the contextual hub.

As further illustrated by the related users element 906 in FIG. 9, the contextual hub system 116 can identify related information based on users associated with the contextual hub. Generally, the contextual hub system 116 can identify users associated with a contextual hub by determining collaborating users that have access to the contextual hub and/or by identifying users that have sent or received information that is included in the contextual hub. Based on identifying related users or users associated with the contextual hub, the contextual hub system 116 can determine to include information from third-party sources based on an association with the related users. For instance, the contextual hub system 116 can include content from a third-party source based on determining that a link to the content was sent by or sent to a collaborating user of the contextual hub. In another example, the contextual hub system 116 identifies a contact that is associated with an email that the user added to the contextual hub. The contextual hub system 116 identifies content from third-party sources that is associated with the content—for instance, the contextual system can identify links to emails, instant messages, documents, links, or other content that the contact has sent to, received from, or collaborated with the user.

As illustrated by the URLs element 908 in FIG. 9, the contextual hub system 116 can identify related information based on URLs or other addresses of content within the contextual hub. The contextual hub system 116 can determine that a URL or address is associated with a contextual hub. For instance, the contextual hub system 116 might associate a URL or other address with the contextual hub based on determining that the URL occurs within the contextual hub at least a threshold number of times. In some embodiments, the contextual hub system 116 adds information to a contextual hub based on detecting that the information is from a particular URL or other address. For example, as illustrated, the contextual hub system 116 determines that information from third-party sources having the URLs surevey.com, happycompany.com, and happybuyer.com is related to and should be included in the contextual hub labeled "Survey Project. In at least one embodiment, the contextual hub system 116 determines a whitelist comprising URLs or other addresses from which the contextual hub system 116 adds information to the contextual hub system. For example, the contextual hub system can identify URLs and addresses for content within the contextual hub and require that new information added to the contextual hub be from or related to the identified URLs.

As further illustrated by the link source element 910 in FIG. 9, the contextual model can determine to add a link to a contextual hub based on a link's source. Generally, the contextual hub system 116 can associate a particular link source with a contextual hub based on identifying links from the particular link sources within a contextual hub. The contextual model may determine to identify additional links from the same source to the contextual hub. For example, a user can click on a link within a third-party source (such as a messaging system, a shared media system, etc.), and the contextual hub system 116 will proceed to open the web page corresponding to the link in a contextual hub. The contextual hub system 116 can determine to open the link in a particular contextual hub based on determining an association between the link source and the contextual hub. For example, the contextual hub system 116 can determine to open links sent within a certain instant messaging or electronic mailing system within a particular contextual hub.

More specifically, the contextual hub system 116 can associate third-party system structures and/or groupings with particular contextual hubs. In at least one embodiment, the contextual hub system 116 can access organizational structures within specific third-party systems and associate units within the third-party systems with a particular contextual hub. In at least one embodiment, the contextual hub system 116 may, by accessing the APIs of third-party systems, identify organizational structures or units within third-party systems. The contextual hub system 116 may then associate organizational structures or units with a particular contextual hub based on determining that the organizational structures or units are directed to the same topic or focus as the contextual hub. For instance, the contextual hub system 116 can determine that a third-party instant messaging system comprises a "Work Chat" conversation (i.e., organizational unit). Based on determining that a contextual hub comprises several chat messages, links, and/or exchanges from the "Work Chat" conversation, the contextual hub system 116 may associate the "Work Chat" conversation with the contextual hub. Thus, the contextual hub system 116 might suggest that future links, messages, and/or conversations from "Work Chat" should be added to the contextual hub.

FIG. 9 illustrates several example contextual hub characteristics by which the contextual hub filter can identify related information to add to the contextual hub. In other embodiments, the contextual hub system 116 can identify other characteristics by which to define the contextual hub filter. For instance, the contextual hub system 116 may utilize a machine learning model to determine latent features and characteristics by which the contextual hub filter may more accurately identify related content.

As mentioned, the contextual hub system 116 can utilize a contextual machine learning model to determine the relevance of third-party source content with respect to a contextual hub. In particular, the contextual hub system 116 can train a contextual machine learning model to predict whether content from a third-party source is relevant to a contextual hub. FIG. 10 illustrates training a contextual machine learning model 1004 in accordance with one or more implementations.

As shown in FIG. 10, the contextual hub system 116 accesses contextual information 1002 for a contextual hub from training data 1010. In addition, the contextual hub system 116 accesses a ground-truth relevance data 1012 for the contextual hub. The ground-truth relevance data 1012 indicates whether or not information (i.e., training third-party source content 1016) is related to the contextual hub. In some implementations (e.g., implementations where the contextual learning model 1004 is a probability determination neural network rather than a binary classification neural network), the ground-truth related information includes a ground truth relevance score (represented as a probability that the content is related to a contextual hub) for the training third-party source content 1016.

In addition, the contextual hub system 116 inputs the contextual information 1002 and training third-party source content 1016 into the contextual machine learning model 1004 (e.g., a binary classification neural network or a probability determination neural network). The contextual machine learning model 1004 analyzes the contextual information 1002 to generate and pass latent features and other data between various neurons and layers to ultimately generate predicted relevance data 1006 based on the contextual information 1002 and the training third-party source content 1016. The predicted relevance data 1006 includes a prediction of a binary classification (e.g., related or not related) to indicate whether or not the training third-party source content 1016 is related to a contextual hub associated with the contextual information 1002. In some implementations, the predicted relevance data 1006 is not a binary classification but is rather a probability of whether or not the training third-party source content 1016 is related to the contextual hub.

To determine a measure of loss or error associated with the contextual machine learning model 1004, the contextual hub system 116 further performs a comparison 1008. Particularly, the contextual hub system 116 compares the ground truth predicted relevance data 1006 with the ground-truth relevance data 1012. For example, the contextual hub system 116 performs the comparison 1008 by implementing a loss function such as a cross entropy loss function or a mean square error loss function. In any event, the contextual hub system 116 utilizes a loss function to determine an error or a measure of loss associated with the contextual machine learning model 1004 by comparing the predicted relevance data 1006 with the ground-truth relevance data 1012.

As further illustrated in FIG. 10, the contextual hub system 116 performs a back propagation 1014. In particular, the contextual hub system 116 back propagates to adjust or modify various internal parameters of the contextual machine learning model 1004. For example, the contextual hub system 116 modifies weights, relationships, and other parameters to change the way the neurons and layers generate and pass information, thereby altering how the contextual machine learning model 1004 determines features from an input and ultimately generates an output. Thus, the contextual hub system 116 attempts to minimize or reduce the measure of loss or error associated with the contextual machine learning model 1004 by modifying the internal parameters to subsequently generate more accurate predictions.

Upon back propagating to modify various parameters, the contextual hub system 116 further repeats the training process illustrated in FIG. 10. Indeed, the contextual hub system 116 repeats the training for a particular number of iterations or epochs and/or until the contextual machine learning model 1004 satisfies a threshold measure of loss (or until the predicted relevance data 1006 is within a threshold similarity of the ground-truth relevance data 1012).

For example, the contextual hub system 116 identifies new relevance contextual information and new training third-party source content from the training data 1010 and corresponding to new ground truth relevance data. The contextual hub system 116 further inputs the new relevance contextual information and new training third-party source content into the contextual machine learning model 1004 to generate new predicted relevance data. Further the contextual hub system 116 compares the new predicted relevance data with the new ground-truth relevance data utilizing a loss function. Additionally, the contextual hub system 116 back propagates to further modify weights and parameters of the contextual machine learning model 1004 to generate accurate predicted relevance data based on contextual information of a contextual hub.

As mentioned, the contextual hub system 116 can apply a trained contextual machine learning model (e.g., the contextual machine learning model 1004) to determine predicted related information (e.g., predicted relevance data) for third-party source content. FIG. 11 illustrates applying the trained contextual machine learning model 1004 to generate predicted relevance data 1106 for the third-party source content 1102 in accordance with one or more implementations.

As illustrated in FIG. 11, the contextual hub system 116 identifies the third-party source content 1102. As mentioned, the third-party source content 1102 may include content from third-party sources for which a user is currently requesting access or has already accessed. The contextual hub system 116 inputs the third-party source content 1102 into the contextual machine learning model 1004. The contextual machine learning model 1004, in turn, generates the predicted relevance data 1106 corresponding to the third-party source content 1102. Indeed, the contextual machine learning model 1004 generates a prediction of whether or not the third-party source content 1102 includes relevant information based on the predicted relevance data 1106 (e.g., a classification of relevant). In some implementations the contextual machine learning model 1004 generates the predicted relevance data 1106 in the form of a probability that the third-party source content 1102 contains relevant information. In these implementations, the probability can indicate a relevance score for the third-party source content 1102.

Figure 12:
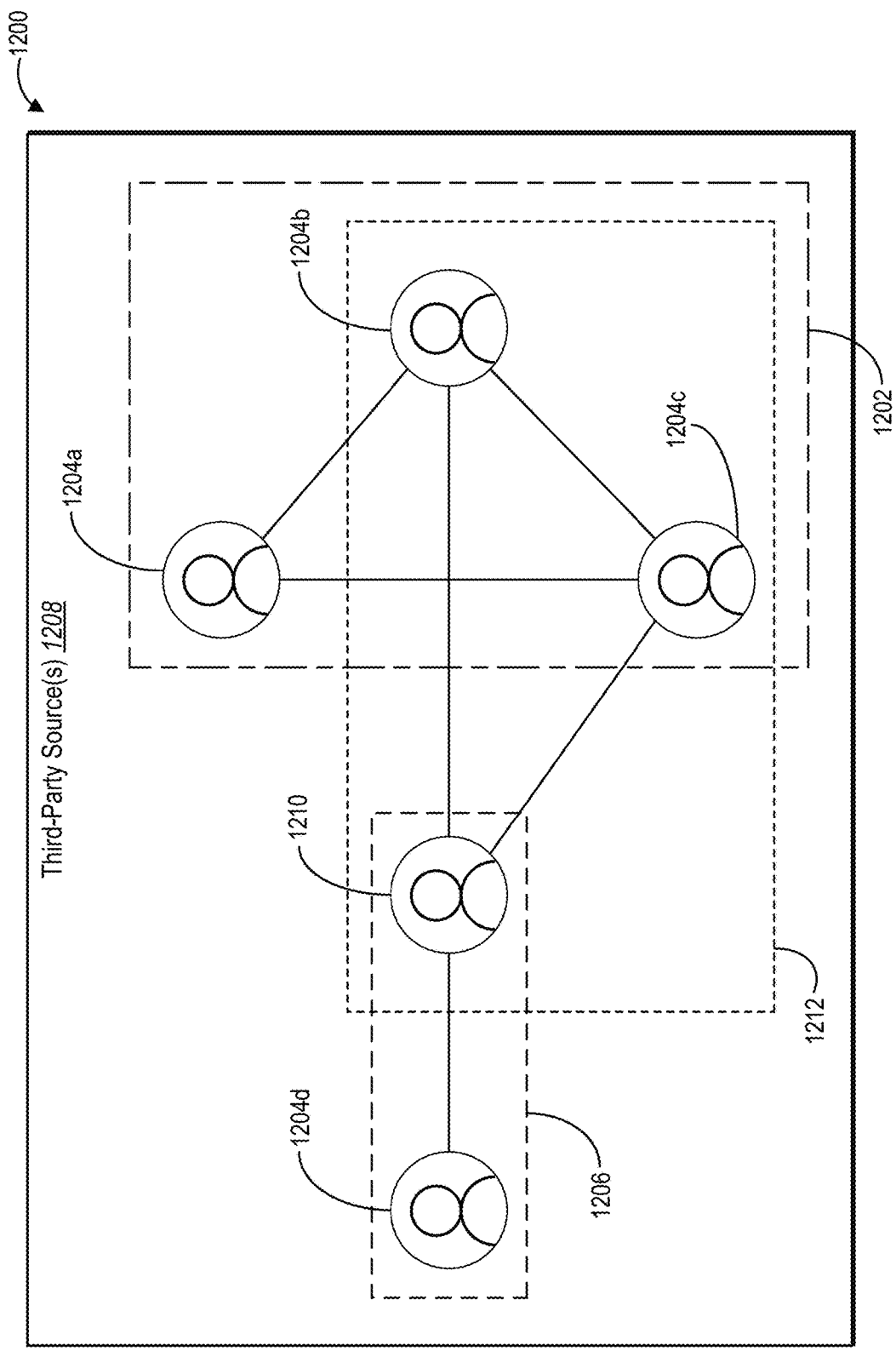
FIG. 12 illustrates an example social graph as a contextual model in accordance with one or more embodiments.

FIGS. 10-11 illustrate various methods by which the contextual hub system 116 can generate a contextual model corresponding to a contextual hub. In the primary embodiments described in FIGS. 10-11, the contextual hub system 116 identifies characteristics of related content within contextual hubs to create a contextual model. In such embodiments, the contextual hub system 116 relies, in part, on the user manually populating the contextual hub with contextually related information. However, in other embodiments, the contextual hub system 116 may suggest contextual hubs based on generating contextual models without requiring the user to add content to a contextual hub. For instance, the contextual hub system 116 may generate a contextual model before a user has begun accessing content via a contextual hub. Additionally, or alternatively, the contextual hub system 116 may generate one or more contextual models that organize user-accessed content in a meaningful way. FIG. 12 provides an example of how the contextual hub system 116 may generate suggested contextual hubs using a contextual graph.

FIG. 12 illustrates how a contextual hub system 116 may utilize a contextual graph 1200 of third-party source(s) 1208 to generate contextual hub suggestions in accordance with one or more embodiments. The contextual graph 1200 includes a user 1210 and co-users 1204*a*-1204*d*. The user 1210 is connected to the co-users 1204*b*-1204*d* by edges that represent social relationships. The contextual graph 1200 includes various groups including a group 1202 comprising the co-users 1204*a*-1204*c*, a group 1206 comprising the user 1210 and the co-user 1204*d*, and a group 1212 comprising the user 1210 and the co-users 1204*b* and 1204*c*.

The third-party source(s) 1208 may comprise one or a combination of the third-party sources described in conjunction with FIG. 7. For instance, the third-party source(s) 1208 may comprise a digital messaging source, a digital web source, a digital media management source, and/or a calendar source. In particular, the third-party source(s) 1208 comprise third-party sources that manage and store social relations of some sort between users. The contextual hub system 116 may access the contextual graph 1200 from the third-party source(s) 1208 via APIs for the third-party source(s) 1208. The contextual hub system 116 may generate the contextual graph 1200 based on compiled social information from one or more third-party source(s) 1208.

The contextual hub system 116 may identify social relationships between users of the third-party source(s) 1208. For instance, the contextual hub system 116 can represent social relationships within the contextual graph 1200 using edges. Generally, social relationships refer to any sort of social connection. In particular, social relationships refer to connections between users of the third-party source(s). For example, users of a digital messaging sources, digital media management sources, and/or calendar sources who share each other's contact information can share a social relationship. Additionally, users may be connected by a social relationship by being connected (e.g., friends or connections) on digital web sources (e.g., social media sources). As illustrated, the user 1210 is connected to the co-users 1204*b*-1204*d* via social relationships. The contextual hub system 116 can identify social relationships within various third-party source(s) 1208 as part of generating the contextual graph 1200. For instance, the user 1210 may be connected to the co-user 1204*d* within a first third-party source and connected to the co-users 1204*b* and 1204*c* within a second third-party source.

In addition to identifying social relationships, the contextual hub system 116 may identify social groups from the third-party source(s) 1208. Generally, groups within the third-party source(s) 1208 comprise users who are actively collaborating, sharing data, or communicating with each other within the third-party source(s) 1208. For example, the group 1202 can comprise users connected within a digital messaging group conversation within a digital messaging source (e.g., email threads, instant messaging channels, etc.), the group 1212 can comprise user collaborating on a shared document within a digital media management source, and the group 1206 can comprise users that have access to a shared event within a calendar source. Groups within the third-party source(s) 1208 can comprise any number of grouping of users within the third-party source(s) 1208.

The contextual hub system 116 can generate contextual hub suggestions based on the contextual graph 1200. In particular, the contextual hub system 116 can utilize social relationship data and/or groups to suggest contextual hubs. The contextual hub system 116 can determine that particular sets of users correspond to contextually similar content. In one embodiment, the contextual hub system 116 can generate a suggested contextual hub based on co-users within a group. For instance, the contextual hub system 116 can generate a contextual hub that stores and presents links sent to and from the user 1210 and the co-users 1204*b* and 1204*c* within the group 1212. Although the user 1210 could also be connected with the co-user 1204*d* within the same third-party source, the contextual hub system 116 might determine to exclude information associated with the co-user 1204*d* based on determining that the group 1206 is distinct from the group 1212.

The contextual hub system 116 may also generate contextual hub suggestions for the user 1210 based on co-user connections, even if the co-user is not connected with the user 1210. Generally, the contextual hub system 116 can analyze connections between co-users to identify significant sets of co-users. For instance, the contextual hub system 116 can determine that a set of co-users meets a threshold significance based on determining that the set of users is connected within multiple groups. In at least one embodiment, the contextual hub system 116 assigns relevance scores to sets of users within the contextual graph 1200. As illustrated in FIG. 12, the user 1210 is connected with the co-users 1204*b* and 1204*c* within the group 1212. The contextual hub system 116 also identifies that the co-users 1204*b* and 1204*c* are connected with the co-user 1204*a* within the group 1202. The contextual hub system 116 can assign a higher relevance score to the set of users comprising the co-users 1204*b* and 1204*c* based on determining that the co-users 1204*b* and 1204*c* are connected within multiple groups. Thus, based on the higher relevance score, the contextual hub system 116 may generate a proposed contextual hub for the user 1210 that focuses on content sent to and received from the co-users 1204*b*-1204*c*.

Figure 13A:
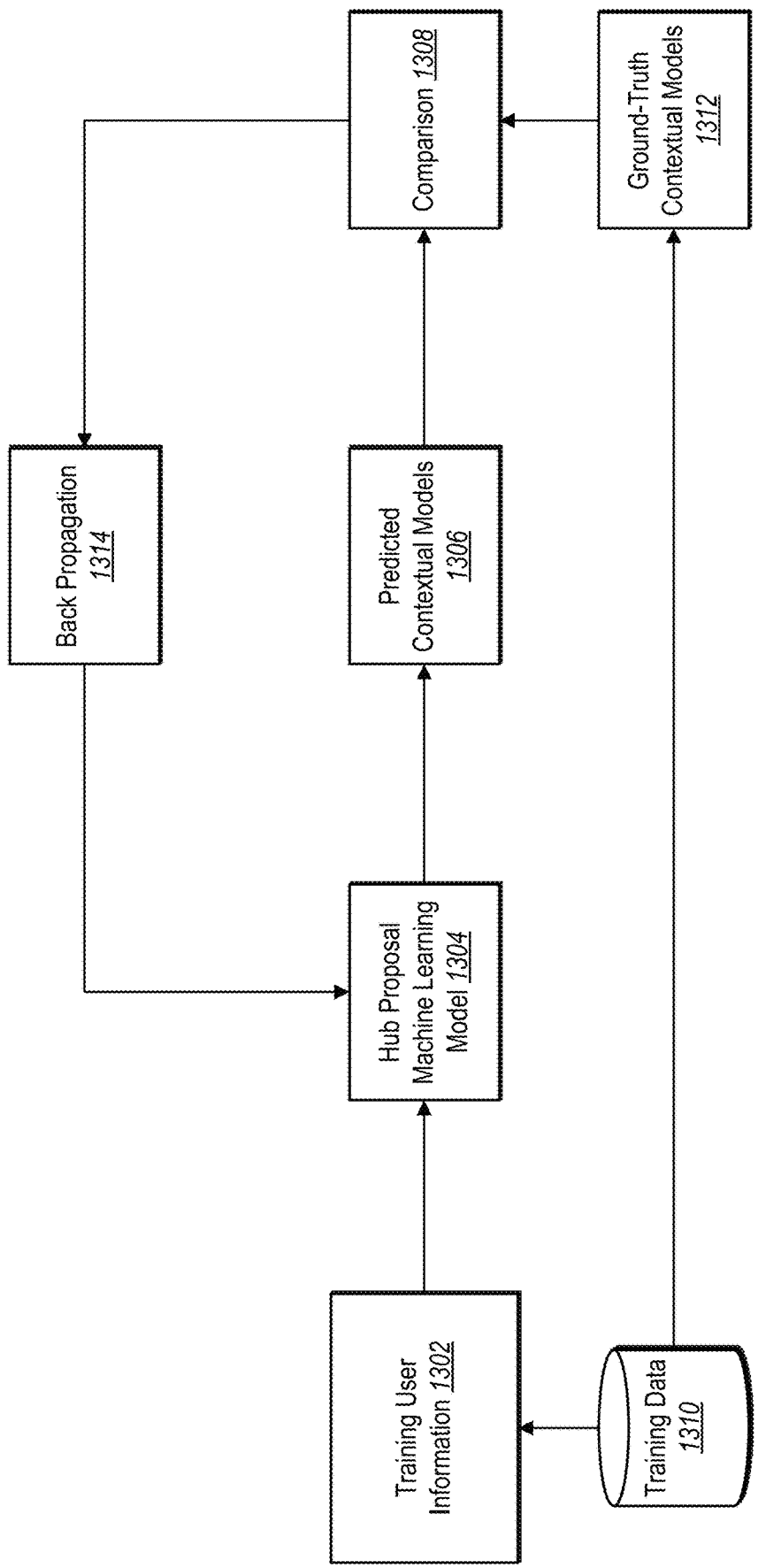
FIGS. 13A-13B illustrate training and applying a hub proposal machine learning model for proposing contextual models in accordance with one or more embodiments.
Figure 13B:
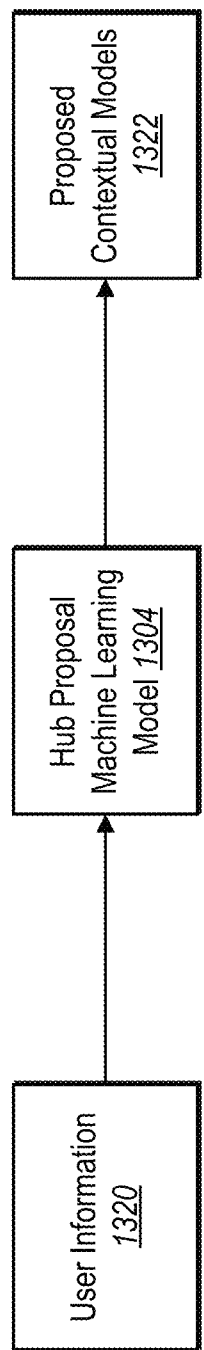

FIG. 12 and the corresponding discussion provide a specific example of how the contextual hub system 116 may generate and utilize the contextual graph 1200 to suggest one or more contextual hubs to a user. The contextual hub system 116 may utilize the contextual graph 1200 in other ways to propose contextual hubs to a user. Additionally, the contextual hub system 116 may implement a hub proposal machine learning model in generating and proposing contextual hubs. FIGS. 13A-13B illustrate training and applying a hub proposal machine learning model in accordance with one or more implementations.

As shown in FIG. 13A, the contextual hub system 116 accesses training user information 1302 and ground truth contextual models from training data 1310. The training user information 1302 comprises user information from third-party sources. For example, the training user information 1302 comprises links shared with the user, co-users connected with the user, a history of web pages accessed by the user, and other content. In at least one embodiment, the training user information 1302 is temporally limited and includes user information within a certain period of time. The ground truth contextual models 1312 comprise contextual models corresponding to ground truth contextual hubs.

The contextual hub system 116 inputs the training user information 1302 into the hub proposal machine learning model 1304 (e.g., a binary classification neural network or a probability determination neural network). The hub proposal machine learning model 1304 analyzes the training user information 1302 to generate and pass latent features and other data between various neurons and layers to generate predicted contextual models 1306.

The contextual hub system 116 performs a comparison 1308. Particularly, the contextual hub system 116 compares the ground truth contextual models 1312 with the predicted contextual models 1306. For example, the contextual hub system 116 performs the comparison 1308 by implementing a loss function to determine an error or a measure of loss associated with the hub proposal machine learning model 1304 by comparing the predicted contextual models 1306 with the ground truth contextual models 1312.

The contextual hub system 116 further performs a back propagation 1314. In particular, the contextual hub system 116 back propagates to adjust or modify various internal parameters of the hub proposal machine learning model 1304. For example, the contextual hub system 116 modifies weights, relationships, and other parameters to change the way the neurons and layers generate and pass information, thereby altering how the hub proposal machine learning model 1304 determines features from an input and ultimately generates an output. Thus, the contextual hub system 116 attempts to minimize or reduce the measure of loss or error associated with the hub proposal machine learning model 1304.

The contextual hub system 116 may further repeat the training process illustrated in FIG. 13A. In particular, the contextual hub system 116 repeats the training for a particular number of iterations or epochs and/or until the hub proposal machine learning model 1304 satisfies a threshold measure of loss (or until the predicted contextual models 1306 are within a threshold similarity of the ground truth contextual models 1312).

The contextual hub system 116 can apply a trained hub proposal machine learning model (e.g., the hub proposal machine learning model 1304) to determine proposed contextual models. FIG. 13B illustrates the contextual hub system 116 applying the hub proposal machine learning model 1304 to user information 1320 to generate proposed contextual models 1322.

As illustrated in FIG. 13B, the contextual hub system 116 accesses the user information 1320. As mentioned, the user information 1320 can comprise any information associated with the user. In particular, the user information 1320 comprises user information associated with third-party sources—including content that the user has accessed historically. The contextual hub system 116 inputs the user information 1320 into the hub proposal machine learning model 1304. The hub proposal machine learning model 1304 generates the proposed contextual models 1322. The contextual hub system 116 can present the proposed contextual models 1322 with their constraints to the user. The user may choose to accept, modify, or reject the proposed contextual models 1322.

Figure 14A:
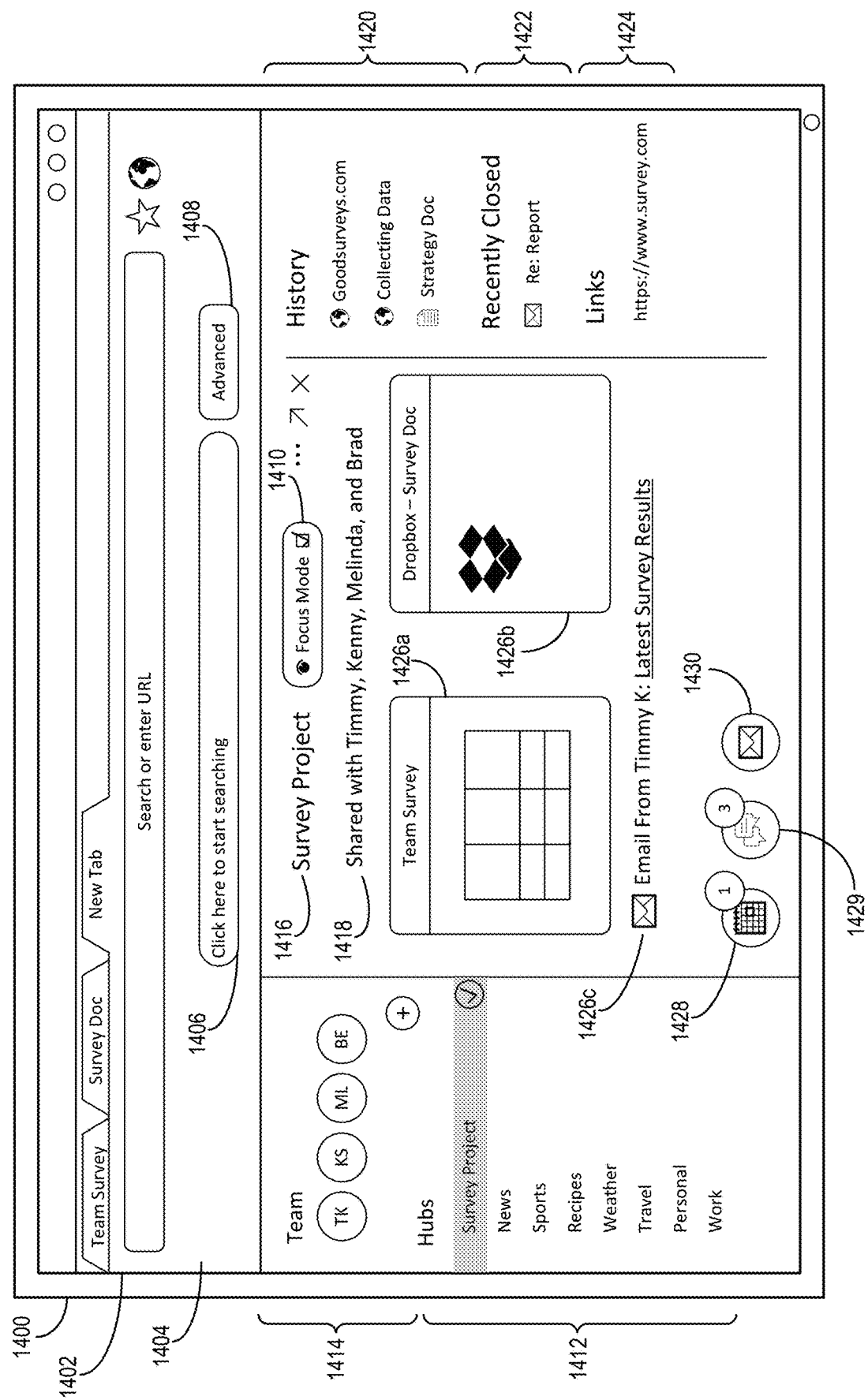
FIGS. 14A-14B illustrate a series of example contextual hub management graphical user interfaces for organizing and managing web-accessible content from various third-party sources in accordance with one or more embodiments.
Figure 14B:
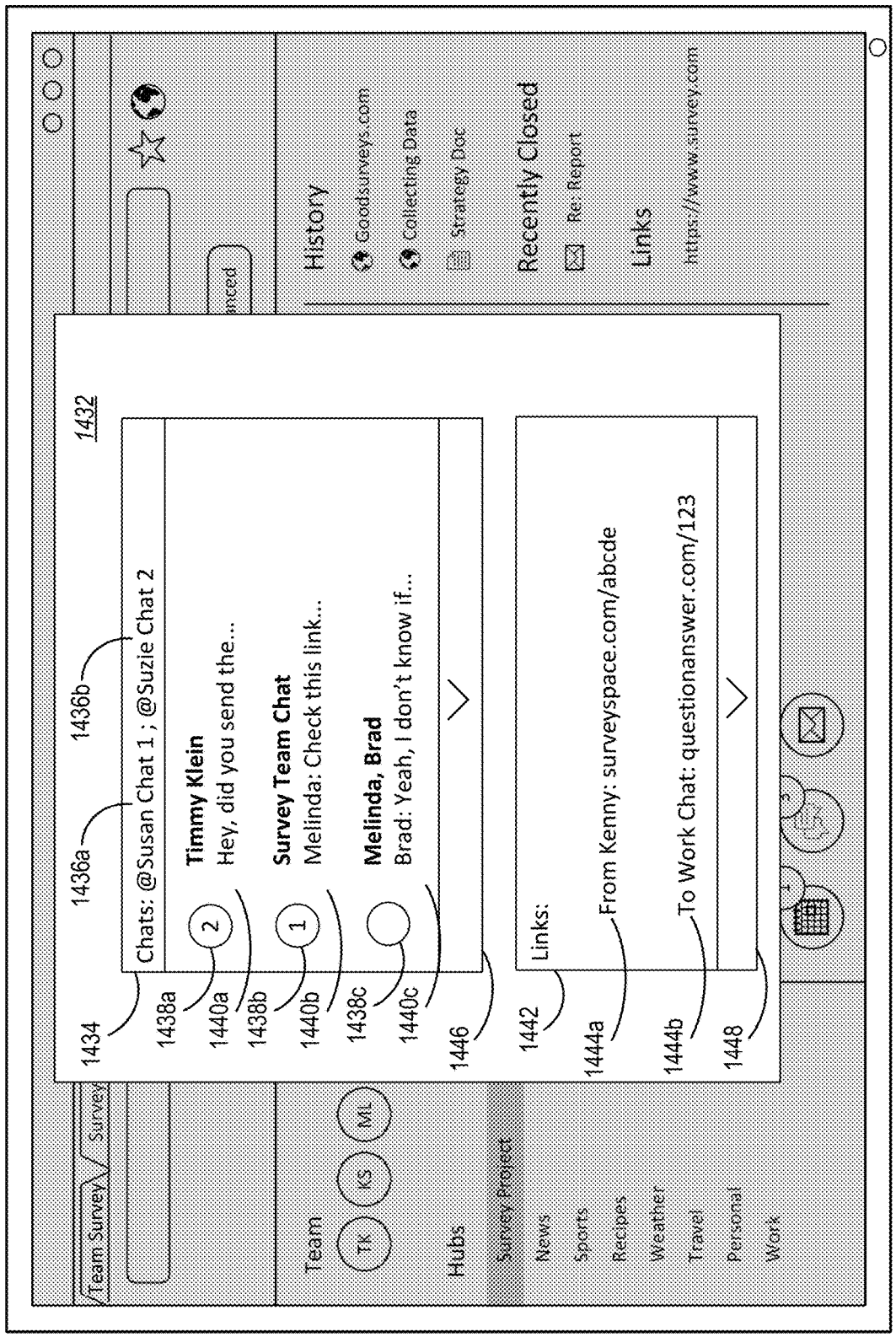

FIGS. 7-13B illustrate how the contextual hub system 116 can focus content from various third-party sources within a contextual hub. As mentioned previously, the contextual hub system 116 can provide references to third-party sources within a contextual hub via a contextual hub management graphical user interface. The contextual hub management graphical user interface enables a user to view contextually related content from various third-party sources. FIGS. 14A-14B and the description that follows illustrate various example embodiments of a contextual hub management graphical user interface and features in accordance with the features and functions as described above.

FIG. 14A illustrates an example contextual hub management graphical user interface that includes contextually related content from various third-party sources. Additionally, based on detected user selection of one or more third-party source elements in the contextual hub management graphical user interface, the contextual hub system 116 provides additional detail specific to the third-party source elements. FIG. 14B illustrates an example providing additional instant messaging data. Although FIG. 14B illustrates additional detail specific to an instant messaging system, the contextual hub system 116 can provide similar interfaces displaying content from other third-party sources.

In one or more embodiments, the contextual hub system 116 can provide graphical user interfaces to client devices via client applications installed thereon. For instance, FIG. 14A illustrates a contextual hub management graphical user interface 1404 displayed on a screen 1402 of a client device 1400. As illustrated, the contextual hub management graphical user interface 1404 includes various display areas and display elements including contextual hub 1416 together with related content 1426a-1462c, contextual hub history 1420, recently closed content 1422, and related links 1424.

As described previously, the contextual hub system 116 may organize related content within a contextual hub. Related content within a contextual hub can comprise any content (including links to related information) from third-party sources. As illustrated in FIG. 14A, the contextual hub management graphical user interface 1404 displays the contextual hub 1416 focused on a "Survey Project." In particular, the contextual hub 1416 includes the related content 1426a-1426c. The related content 1426a-1426c comes from different third-party sources. For instance, the related content 1426a comprises a web page titled "Team Survey," the related content 1426b comprises a digital document stored on Dropbox titled "Survey doc," and the related content 1426c comprises a link to an email from a collaborating user. The contextual hub system 116 may provide links to additional related content from various third-party sources to those illustrated in FIG. 14A.

As part of generating a contextual model, the contextual hub system 116 can identify collaborating users within a contextual hub. As illustrated in FIG. 14A, the contextual hub management graphical user interface 1404 includes a collaborating users elements 1414. The collaborating users elements 1414 indicates collaborating users within the contextual hub 1416. The contextual hub management graphical user interface 1404 may further indicate collaborating users via a collaborating users indicators 1418. As mentioned, the contextual hub system 116 can identify related content based on collaborating users listed within the collaborating users elements 1414.

As mentioned previously, the contextual hub system 116 enables efficient and user-friendly management of content within the contextual hub 1416. For instance, the contextual hub system 116 may move content to different contextual hubs, add content to particular hubs, and perform other operations on content within the contextual hub 1416. For instance, as illustrated in FIG. 14A, the contextual hub system 116 may move the related content 1426a to any of the other contextual hubs listed within a contextual hub menu element 1412 based on detecting a user dragging and dropping the related content 1426a on a contextual hub within the contextual hub menu element 1412.

The contextual hub system 116 also enables the search of contextually related content. As illustrated in FIG. 14A, the contextual hub management graphical user interface 1404 includes a search element 1406 and an advanced search element 1408. The contextual hub system 116 may search content across all contextual hubs listed within the contextual hub menu element 1412 or within the contextual hub 1416. For example, the contextual hub system 116 may specify requirements of a search based on advanced search requirements entered via the advanced search element 1408. In at least one embodiment, the contextual hub system 116 may restrict a search to a particular contextual hub. Furthermore, the contextual hub system 116 may utilize search requirements to restrict searches to particular third-party sources within a contextual hub. For instance, the contextual hub system 116 can search content from third-party instant messaging services. In at least one embodiment, the contextual hub system 116 can restrict searches to collaborating users with the contextual hub 1416. For instance, the contextual hub system can perform a search for content associated with a particular collaborating user (e.g., Timmy). The contextual hub system 116 may also define search restrictions based on a time period. The contextual hub system 116 may implement these and other search restrictions in one or more embodiments.

The contextual hub management graphical user interface 1404 illustrated in FIG. 14A also includes a focus mode element 1410. The contextual hub system 116 can activate a focus mode within a contextual hub. In particular, the contextual hub system 116 can limit content accessed within the contextual hub 1416 to content that is relevant to the topic of the contextual hub. In one embodiment, the contextual hub system 116 can generate a whitelist comprising relevant links and/or relevant link sources. Additionally, or alternatively, the contextual hub system 116 determines relevant content for a contextual hub based on the corresponding contextual model. As illustrated in FIG. 14A, based on detecting that the user has selected the focus mode element 1410, the contextual hub system 116 limits access to irrelevant content from within the contextual hub 1416. In some embodiments, the contextual hub system 116 blocks access to content from third-party sources that are either irrelevant to the contextual hub or related to a different contextual hub. For example, based on determining that the user has entered a URL corresponding to a web source related to the "Personal" contextual hub, the contextual hub system 116 may block the web page. Additionally, or alternatively, the contextual hub system 116 can generate and present a notification indicating that the user is requesting access to irrelevant content. The notification may present an option to continue to the irrelevant content or to return to the contextual hub 1416.

As illustrated in FIG. 14A, the contextual hub management graphical user interface 1404 includes the contextual hub history 1420. Generally, the contextual hub history 1420 lists historical content that has been accessed within the contextual hub 1416. For example, similar to web browsing history, the contextual hub history 1420 collects data relating to accessed content. For instance, the contextual hub history 1420 may store and display associated data such as content title and time of visit. In at least one embodiment, the contextual hub history 1420 includes content that was accessed via the contextual hub 1416 but that was navigated from, closed, or moved into another contextual hub from the contextual hub 1416. As illustrated in FIG. 14A, the contextual hub history 1420 includes historical web pages and a media content item (e.g., a document).

The contextual hub management graphical user interface 1404 illustrated in FIG. 14A also includes the recently closed content 1422. The recently closed content 1422 displays content that has been closed in the contextual hub 1416. The contextual hub system 116 can add or re-open content within the recently closed content 1422. For instance, a user may select and/or drag and drop content from within the recently closed content 1422 to the contextual hub 1416. Additionally, the contextual hub system 116 may move recently closed content directly to a different contextual hub based on the user dragging and dropping the recently closed content to a contextual hub within the contextual hub menu element 1412.

The contextual hub management graphical user interface 1404 illustrated in FIG. 14A also includes the related links 1424. The related links 1424 display links that the contextual hub system 116 determines are contextually related to the contextual hub 1416. The related links 1424 can include links that the user has sent or received via third-party sources. For example, the contextual hub system 116 may list, within the related links 1424, links to contextually related data that the user has received via an email messaging system, instant messaging system, or any other third-party source. Additionally, the related links 1424 can include links that the user has sent via the email messaging system, instant messaging system, or other third-party sources.

The contextual hub system 116 may, in addition to adding content from third-party sources to a contextual hub, facilitate access to third-party sources via the contextual hub management graphical user interface 1404. In particular, the contextual hub management graphical user interface 1404 includes various elements and features that present content, organized by third-party source, that is related to a contextual hub. For instance, the contextual hub management graphical user interface 1404 includes a calendar element 1428, an instant messaging element 1429, and an electronic messaging element 1430. In at least one embodiment, the calendar element 1428, the instant messaging element 1429, and the electronic messaging element 1430 comprise content that is added to the contextual hub (e.g., email 1426c shown in FIG. 14A). For instance, the contextual hub system 116 can determine that the user has received three new messages within one or more third-party messaging systems. Based on determining that the three new messages are related to the contextual hub 1416, the contextual hub system 116 adds the messages to the contextual hub 1416 and notifies the user of the three new messages via the instant messaging element 1429.

Additionally, or alternatively, the contextual hub system 116 includes, within the contextual hub management graphical user interface 1404, elements that present content from third-party sources that has not been added to the contextual hub 1416. For instance, in at least one embodiment, the calendar element 1428, the instant messaging element 1429, and the electronic messaging element 1430 comprise content that is related to but not yet added to the contextual hub 1416. For example, the calendar element 1428 can comprise a notification for a calendar event that the contextual hub system 116 determines is likely related to the contextual hub 1416. Based on detecting selection of the calendar element 1428, the contextual hub system 116 can present the calendar event via the contextual hub management graphical user interface 1404. The user may determine to add the calendar event to the contextual hub 1416.

The contextual hub system 116 can update the contextual hub management graphical user interface 1404 to present a third-party source access element. For instance, based on detecting user selection of any one of the calendar element 1428, the instant messaging element 1429, or the electronic messaging element 1430, the contextual hub system 116 can present a corresponding third-party source access element. For instance, the contextual hub system 116 can present a third-party source access element based on user selection of the instant messaging element 1429 illustrated in FIG. 14A. FIG. 14B illustrates an example third-party source access element presented based on selection of the instant messaging element 1429. In particular FIG. 14B illustrates third-party source access element 1432 displaying content related to one or more third-party instant messaging systems in accordance with one or more embodiments.

Generally, the third-party source access element 1432 provides user access to content within one or more third-party sources. For instance, the third-party source access element 1432 can display content specific to a particular contextual hub or unrelated to the contextual hub. The third-party source access element 1432 illustrated in FIG. 14B presents content related to a particular contextual hub.

As mentioned, the third-party source access element 1432 can include information from one or more third-party sources. In at least one embodiment, the third-party source access element 1432 presents information specific to a type of third-party source (e.g., instant messaging source, email source, etc.); thus, if a user maintains accounts within multiple third-party sources of the same type, the contextual hub system 116 can present content from the multiple third-party sources within the third-party source access element 1432. In at least one other embodiment, the third-party source access element 1432 presents content from a single third-party source. In any event, the contextual hub system 116 can present, within the third-party source access element 1432, content associated with multiple user accounts. For instance, as illustrated in FIG. 14B, the third-party source access element 1432 includes content associated with user accounts 1436a-1436b. The contextual hub system 116 can specify for which of the user accounts 1436a-1436b the third-party source access element 1432 displays content based on user selection of one of the user accounts 1436a-1436b.

As illustrated in FIG. 14B, the third-party source access element 1432 includes an instant message preview element 1434 and a links preview element 1442. Generally, the instant message preview element 1434 displays content such as instant messages transmitted within the instant messaging third-party source. The links preview element 1442 displays information relating to links transmitted within the instant messaging third-party source. Although FIG. 14B illustrates the third-party source access element 1432 displaying content specific to one or more third-party instant messaging systems, the contextual hub system 116 may generate a third-party source access element specific to any type of third-party source.

The instant message preview element 1434 includes conversations 1440a-1440c. The conversations 1440a-1440c comprise an exchange of instant messages with one or more specified users. For example, the conversation 1440a includes the exchange of instant messages with a user Timmy Klein. The conversation 1440b involves the exchange of instant messages between users within a survey team chat. The conversation 1440c involves users Melinda and Brad. As further illustrated in FIG. 14B, the instant message preview element 1434 can indicate unread messages. For instance, the contextual hub system 116 can present notifications 1438a-1438c indicating unread messages. The instant message preview element 1434 may also include an expand chat preview element 1446. Based on detecting user selection of the expand chat preview element 1446, the contextual hub system 116 can present additional conversations from the third-party instant messaging system. In one or more embodiments, the contextual hub system 116 can include individual messages or whole conversations within the contextual hub based on detecting that the user has selected, dragged, and dropped a selected message or conversation into the contextual hub.

As illustrated in FIG. 14B, the third-party source access element 1432 can also include a links preview element 1442. As mentioned, the links preview element 1442 displays data related to links transmitted within the third-party source. For example, the links preview element 1442 includes, for links 1444a-1444b, data including the sending user, the recipient, a corresponding conversation, and the link URL. The contextual hub system 116 can also provide an expand link preview element 1448 by which the user can view data for additional links. Based on detecting selection of one of the links 1444a-1444b, the contextual hub system 116 can add the selected link to the contextual hub.

Figure 15:
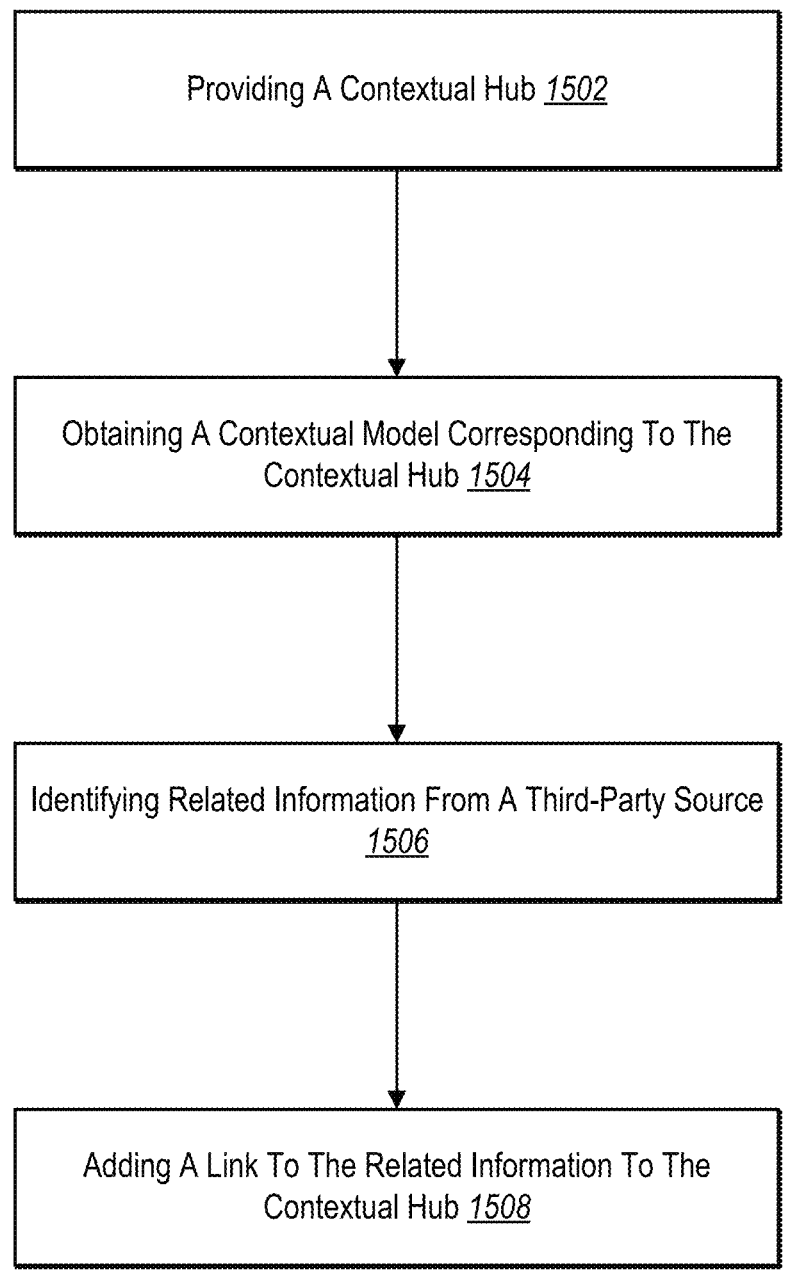
FIG. 15 illustrates a flowchart of a series of acts for adding a link to related information to a contextual hub in accordance with one or more embodiments.

FIGS. 7-14B, the corresponding text, and the examples, provide a number of different systems and devices for adding information to a contextual hub. In addition to the foregoing, embodiments of the present disclosure can also be described in terms of flowcharts comprising acts and acts in a method for accomplishing a particular result. For example, FIG. 15 illustrates a flowchart of exemplary methods in accordance with one or more embodiments of the present disclosure. The methods described in relation to FIG. 15 may be performed with fewer or more acts or the acts may be performed in a different order. Additionally, the acts described herein may be repeated or performed in parallel with one another or in parallel with different instances of the same or similar acts.

FIG. 15 illustrates a flowchart of one example method 1500 for adding a link to related information to a contextual hub. The method 1500 includes an act 1502 of providing a contextual hub. In particular, the act 1502 comprises providing, within a graphical user interface, a contextual hub comprising content associated with a plurality of third-party sources. In one or more embodiments, the act 1506 comprises providing, within a graphical user interface and at a client device associated with a user, a contextual hub comprising content associated with a plurality of third-party sources. In at least one embodiment, the plurality of third-party sources comprises at least one of: a digital messaging source; a digital web source; a digital media management source; or a calendar source.

The method 1500 also includes an act 1504 of obtaining a contextual model corresponding to the contextual hub. In particular, the act 1504 comprises obtaining a contextual model corresponding to the contextual hub based at least in part on contextual information associated with the plurality of third-party sources. In at least one embodiment, the act 1504 comprises obtaining a contextual model corresponding to the contextual hub based at least in part on contextual information associated with the plurality of third-party sources by utilizing a trained machine learning model. In one or more embodiments, the contextual information associated with the plurality of third-party sources comprises: associations between each of the plurality of users and each of the plurality of third-party sources; or information related to content of the plurality of third-party sources. Additionally, the act 1504 may further comprise utilizing, as input into the trained machine learning model, the contextual information associated with the plurality of third-party sources; and receiving the contextual model as output from the trained machine learning model.

The act 1504 may include additional acts comprising analyzing characteristics of contextual models in a repository of pre-generated contextual models; and determining, based on the characteristics of the pre-generated contextual models and the contextual information, a closest matching pre-generated contextual model.

The method 1500 includes an act 1506 of identifying related information from a third-party source. In particular, the act 1506 comprises identifying, using the obtained contextual model, related information from a third-party source other than the plurality of third-party sources. In one or more embodiments, the act 1506 comprises receiving, from the client device, a notification indicating access of a third-party source; and identifying, using the contextual model, related information from the third-party source.

The method 1500 includes an act 1508 of adding a link to the related information to the contextual hub. In particular, the act 1508 comprises adding a link to the related information within the graphical user interface of the contextual hub.

The method 1500 can include the additional act of associating the contextual hub with a plurality of users. Additionally, the method 1500 can include the additional act of obtaining the contextual model based on user-defined rules associated with the contextual hub. In at least one embodiment, the method 1500 includes the act of obtaining the contextual model by generating the contextual model based on user-defined rules associated with the contextual hub. Furthermore, the method 1500 can include the additional act of associating the web page with the contextual hub based on receiving an indication from the user that the web page is relevant to the contextual hub.

Additionally, the method 1500 can include the additional acts of updating the generated contextual model by: receiving user input indicating whether the related information is relevant to the contextual hub; and modifying parameters of the generated contextual model based on the user input.

The method 1500 can include the additional acts of updating the contextual model by: receiving user input indicating whether the related information is relevant to the contextual hub; and modifying parameters of the contextual model based on the user input.

In one or more embodiments, identifying the related information comprises determining, using the contextual model, that a message received at a third-party messaging source from the plurality of third-party sources associated with the contextual hub comprises the related information; and adding the link to the related information comprises adding a link that points to the message within the third-party source.

Furthermore, in one or more embodiments, identifying the related information comprises determining, using the contextual model, that text within a web page that is currently not associated with the contextual hub comprises the related information; and adding the link to the related information comprises adding a link that points to the web page.

The Contextual Hub as a Collaboration Tool

The contextual hub system 116 can facilitate collaboration between users connected within a contextual hub. For example, the contextual hub system 116 can link collaborating users within a contextual hub. The contextual hub system 116 can provide the viewership status of content items within a contextual hub to indicate whether a particular collaborating user has not seen, is currently viewing, or has seen web-accessible content. In addition to facilitating the sharing of content from third-party sources within a group, the contextual hub system 116 can efficiently send content to individual users from within a contextual hub.

The contextual hub system 116 may also create a real-time shared browsing experience where collaborating users simultaneously view and interact with web-accessible content. In particular, by monitoring events reported from third-party sources, the contextual hub system 116 can replicate events on collaborating user's browsers. Thus, the contextual hub system 116 presents actual web content, rather than a pre-recorded screen share video, to users participating in a shared browsing experience.

The contextual hub system 116 provides additional functionalities via contextual hubs. For example, the contextual hub system 116 can generate presentations comprising an ordered sequence of web-accessible content. Furthermore, the contextual hub system 116 also makes possible the indexing of a private web. For instance, the contextual hub system 116 may generate indexes specific to individual users, a group of collaborating users, and even entire organizations. The contextual hub system 116 can further leverage the private web indexing in web searches as well as building contextual models.

Figure 16:
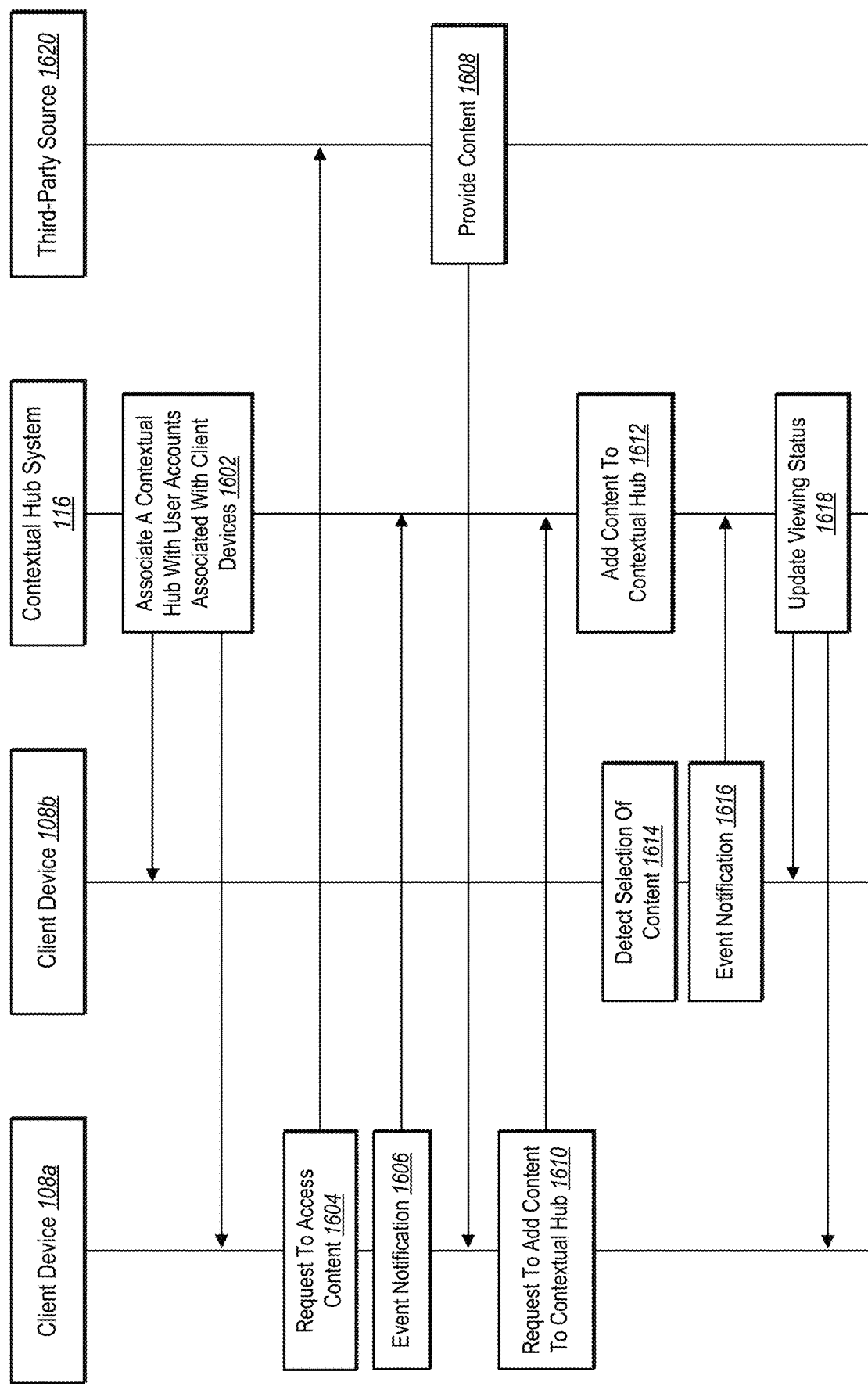
FIG. 16 illustrates a sequence diagram of processes involved in updating viewing status within a contextual hub for content from third-party sources in accordance with one or more embodiments.

As mentioned above, the contextual hub system 116 can facilitate collaboration between users by indicating whether collaborating users have seen or are currently viewing content from various third-party sources. FIG. 16 illustrates a sequence diagram of the contextual hub system 116 performing acts in connection with a contextual hub. More specifically, FIG. 16 illustrates the contextual hub system 116 updating a viewing status in accordance with one or more embodiments.

As shown in FIG. 16, the contextual hub system 116 associates a contextual hub with user accounts associated with client devices (1602). In particular, the contextual hub system 116 can create a contextual hub and link it to user accounts associated with the client device 108a and the client device 108b. For instance, the contextual hub system 116 can associate a set of permissions with the contextual hub that allows user accounts associated with the client device 108a and the client device 108b to access, edit, and otherwise modify content within the contextual hub. For example, the contextual hub system 116 can permit a user account associated with the client device 108a to add content to a contextual hub.

The client device 108a can send a request to access content (1604) to the third-party source 1620. The request to access content (1604) can include a request to access content hosted by the third-party source 1620. For example, as mentioned above, the client device 108a can provide, via the client application 110 installed on the client device 108a, selectable options to access third-party sources. For instance, the client application 110 can comprise an internet browser. Based on detecting user access of a web page via the client application 110, the client device 108a sends the request to access web-accessible content The client device 108a may also send an event notification 1606 to the contextual hub system 116. As used herein, the term "event notification" refers to an object that provides notice of an event. In particular, an event notification can indicate that a client device has identified that an event (e.g., state change or source state change) has occurred. For instance, an event notification can indicate that a client device 108a has performed an action or has identified a change of state. For example, as illustrated in FIG. 16, the event notification 1606 indicates that the client device 108a has requested access to the third-party source 1620. The contextual hub system 116 can log the event notification 1606.

As illustrated in FIG. 16, the third-party source 1620 can provide web-accessible content (1608) to the client device 108a. In particular, the third-party source 1620 responds to the request to access the third-party source from the client device 108a by transmitting the requested content. For example, in embodiments where the third-party source 1620 comprises a web server, the third-party source 1620 can send web page data to the client application 110 of the client device 108a.

The client device 108a requests to add the content to the contextual hub (1610). In particular, the client device 108a adds web-accessible content from the third-party source to the contextual hub. For example, as mentioned above, the client application 110 of the client device 108a can present one or more graphical user interfaces that include selectable tools and options to enable the user of the client device 106a to manage and organize content within contextual hubs. The client device 108a can determine a request to add content to a contextual hub based on user interaction with the graphical user interface(s). The client device 108a may then transmit the request to the contextual hub system 116.

After receiving the request to add the content to the contextual hub, the contextual hub system 116 adds the content to the contextual hub (1612). In particular, the contextual hub system 116 can store the web-accessible content in a data structure corresponding to contextual hub. By adding the content to the contextual hub (1612), the contextual hub system 116 grants access to the content via the contextual hub to user accounts associated with both the client device 108a and the client device 108b.

As further illustrated in FIG. 16, the client device 108b detects a user operation with respect to the content (1614). Generally, the client application 110 located on the client device 108b may present a series of graphical user interfaces that display the content within a contextual hub. As described above, the series of graphical user interfaces (e.g., the contextual hub management graphical user interface) present various elements and features that enable users to access the functionality of the contextual hub system 116. As used herein, the term "user operation" refers to any action carried out to accomplish a given task. In particular, a user operation includes a user-initiated action directed at web-accessible content. For instance, user operations can include a user accessing or viewing content, a user adding annotations (e.g., highlights or comments), or a user closing or terminating access of content, or a user removing content from the contextual hub.

Based on detecting the user operation with respect to the content, the client device 108b sends an event notification 1616 to the contextual hub system 116. In particular, the event notification 1616 indicates the particular user operation detected by the client device 108b. For example, the client device 108b can transmit, to the contextual hub system 116 event notifications that indicate that the user has accessed content, added annotations to content, closed the content, or otherwise interacted with the web-accessible content within the contextual hub.

As illustrated in FIG. 16, the contextual hub system 116 updates the viewing status (1618) of the web-accessible content. In particular, the contextual hub system 116 updates the viewing status to reflect the user operation. For example, the contextual hub system 116 can provide elements that indicate that a particular user has not viewed content, is currently viewing content, or has seen but is not currently viewing the content (in which case the elements can indicate the date and time of the user's last viewing of the content). Furthermore, the contextual hub system 116 can present various graphical user interface elements to notify collaborating users of the updated viewing status. Though not illustrated, the contextual hub system 116 may update the content within the contextual hub to reflect other user operations beside viewing status. For instance, the contextual hub system 116 can indicate that a user has left an annotation, has moved content, deleted content, or performed some other operation.

Importantly, the description above demonstrates that the contextual hub system 116 provides methods and systems that allow users to collaborate on third-party content. Indeed, some conventional systems would allow some collaboration on internal sources were the internal systems were developed and controlled by the same entity, for example. However, conventional systems failed at providing these types of collaboration tools with respect to independent third-party sources. Accordingly, it is worth noting that the contextual hub system 116 provides the features of viewing status, annotations, and the other described collaboration functions to third-party sources based on the principles discussed above and explained more fully below.

Figure 17A:
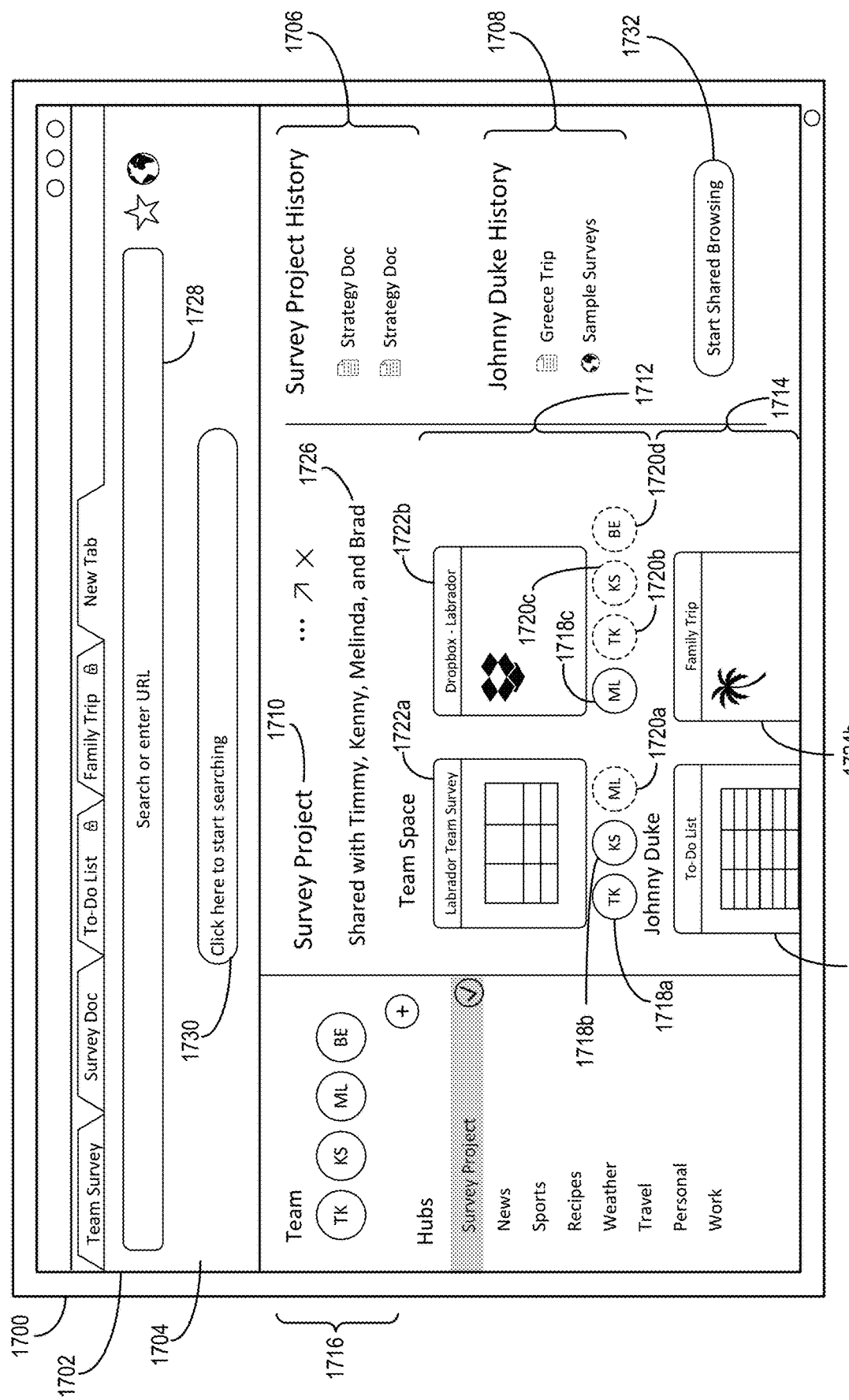
FIGS. 17A-17B illustrate a series of example contextual hub management graphical user interfaces for collaborating between users connected via a contextual hub in accordance with one or more embodiments.
Figure 17B:
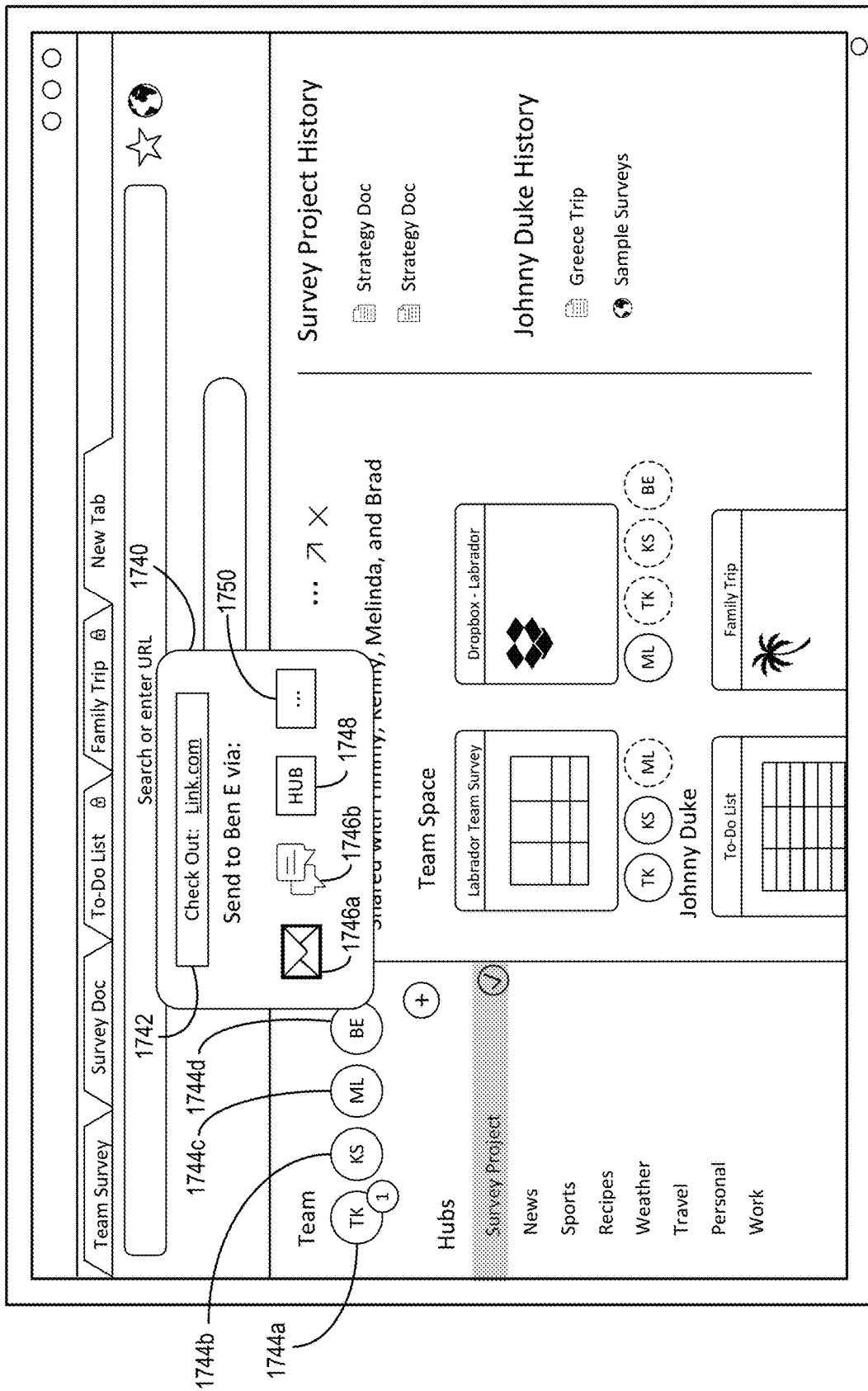

The contextual hub system 116 can facilitate group collaboration via the contextual hub manager graphical user interface. As mentioned, the contextual hub system 116 can provide graphical user interface elements and features to notify collaborating users that a particular user has not accessed, is currently accessing, or has seen but is not currently accessing content within a contextual hub. Furthermore, the contextual hub system 116 facilitates communication between collaborating users within a contextual hub. FIGS. 17A-17B illustrate various elements, areas, and features of the contextual hub management graphical user interface that facilitate collaboration between users connected within a contextual hub. For instance, FIG. 17A illustrates a contextual hub management graphical user interface displaying various view status elements that communicate the activity of collaborating users. FIG. 17B illustrates a communication element by which a user can send content directly to an individual co-user.

FIG. 17A illustrates various elements and areas within contextual hub management graphical user interface 1704 that facilitate collaboration between users linked within a contextual hub. FIG. 17A illustrates the contextual hub management graphical user interface 1704 displayed on a screen 1702 of a client device 1700. The contextual hub management graphical user interface 1704 displays information relating to a contextual hub 1710. For instance, the contextual hub management graphical user interface 1704 includes a group space 2261, a private space 1714, a group history 1706, and a private history 1708. The contextual hub system 116 also presents collaborating users element 1716 to indicate the identity of users collaborating users within the contextual hub.

As illustrated in FIG. 17A, the contextual hub system 116 provides the identities of collaborating users within the contextual hub via the collaborating users element 1716 and the listed collaborating users element 1726. As mentioned previously, the contextual hub system 116 can associate a contextual hub with one or more users. More specifically, the contextual hub system 116 may designate one or more additional users as collaborating users within a contextual hub. The contextual hub management graphical user interface 1704 displays the collaborating users element 1716 to indicate collaborating users. Furthermore, as will be discussed in further detail below with respect to FIG. 17B, the user icons within the collaborating users element 1716 may comprise interactive elements. For instance, based on detecting a user selection of a user icon within the collaborating users element 1716, the contextual hub system 116 may present user information such as a user profile or communications between the user and the selected collaborating user. In addition to presenting the collaborating users element 1716, the contextual hub system 116 may present listed collaborating users element 1726.

The contextual hub system 116 can manage permissions granted to collaborating users of a contextual hub. For instance, the contextual hub system 116 can determine that particular users may view, annotate, and/or edit content within a contextual hub. The contextual hub system 116 may designate a managing user who has authority to assign and manage permissions for collaborating users. The contextual hub system 116 can limit a user to viewing rights with which the user may view but not annotate or edit content within the contextual hub. The contextual hub system 116 may also limit a user to annotation rights which enables the user to view and annotate content within the contextual hub; however, the user is unable to move, add, or delete content within the contextual hub. In at least one embodiment, the contextual hub system 116 may grant editing rights to one or more collaborating users with which the user may add, remove, or otherwise edit content within the contextual hub.

Generally, the contextual hub system 116 may organize content into subcategories. In particular, the contextual hub system 116 can divide a contextual hub into a group shared space and an individual private space. The contextual hub system 116 may generate a subcategory for shared content between collaborating users and a subcategory for private content with limited access to a particular user (e.g., the creating user). As illustrated in FIG. 17A, the contextual hub system 116 divides the contextual hub 1710 into the group space 1712 and the private space 1714. Generally, the group space 1712 displays the shared content links 1722a-1722b that are accessible to all collaborating users. The private space 1714, on the other hand, displays private content links 1724a-1724b that is accessible only to the user (e.g., "Johnny Duke") and is hidden to the collaborating users. Both the shared content links 1722a-1722b and the private content links 1724a-1724b are stored within and can be contextually relevant to the contextual hub 1710.

Additionally, or alternatively, contextual hub system 116 may organize content into subcategories based on content. In particular, the contextual hub system 116 can further organize content within the group shared space and the individual private space into subcategories. Alternatively, the contextual hub system 116 can generate subcategories for a contextual hub when the contextual hub does not include group shared and individual private spaces. In particular, the contextual hub system 116 may utilize the contextual model to organize content within a contextual hub into contextually relevant subcategories. For instance, the contextual hub system 116 can organize content in the "survey project" contextual hub into subcategories including survey examples, general survey outlines, or any other type of detected subcategory.

The contextual hub management graphical user interface 1704 enables a user to quickly and efficiently share content with collaborating users. In particular, the contextual hub system 116 can convert private content to shared content and vice versa. For example, based on detecting a that a user selected, dragged, and dropped the private content link 1724a from the private space 1714 to the group space 1712, the contextual hub system 116 adds the private content link 1724a to the group space 1712 and shares the private content link 1724a with the collaborating users.

The contextual hub system 116 provides other methods for adding content to the private space 1714 and/or the group space 1712. In at least one embodiment, the contextual hub system 116 adds new content resulting from user interaction with a URL search element 1728 to the private space 1714 by default. In one embodiment, the contextual hub system 116 can provide a group space browsing element (e.g., an icon placed next to the URL search element 1728). Based on user selection of the group space browsing element, the contextual hub system 116 may switch and automatically add content resulting from user interaction with the URL search element 1728 to the group space 1712.

Figure 18:
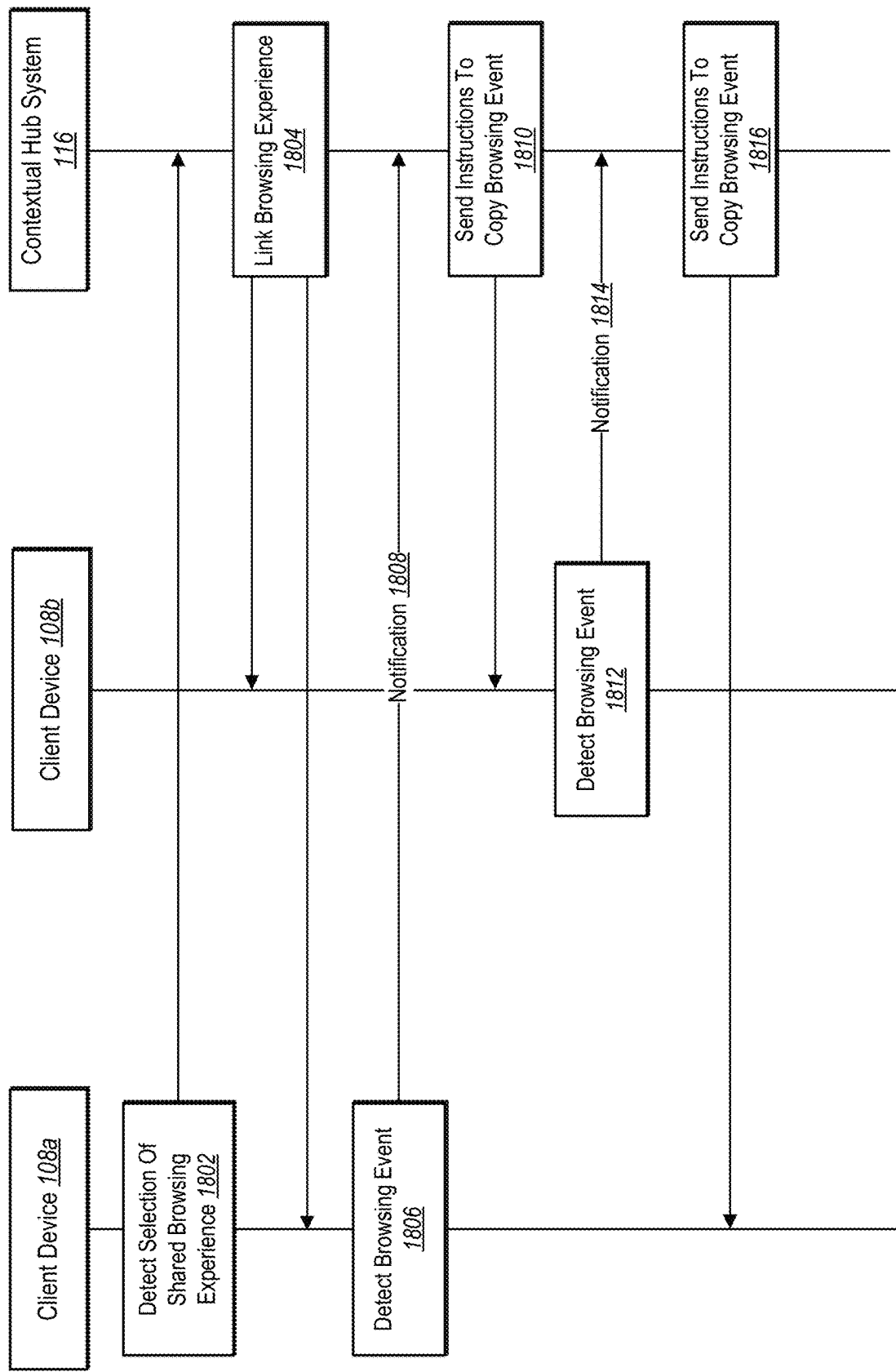
FIG. 18 illustrates a sequence diagram of processes involved in detecting and replicating browsing events between client devices associated with a contextual hub in accordance with one or more embodiments.
Figure 19A:
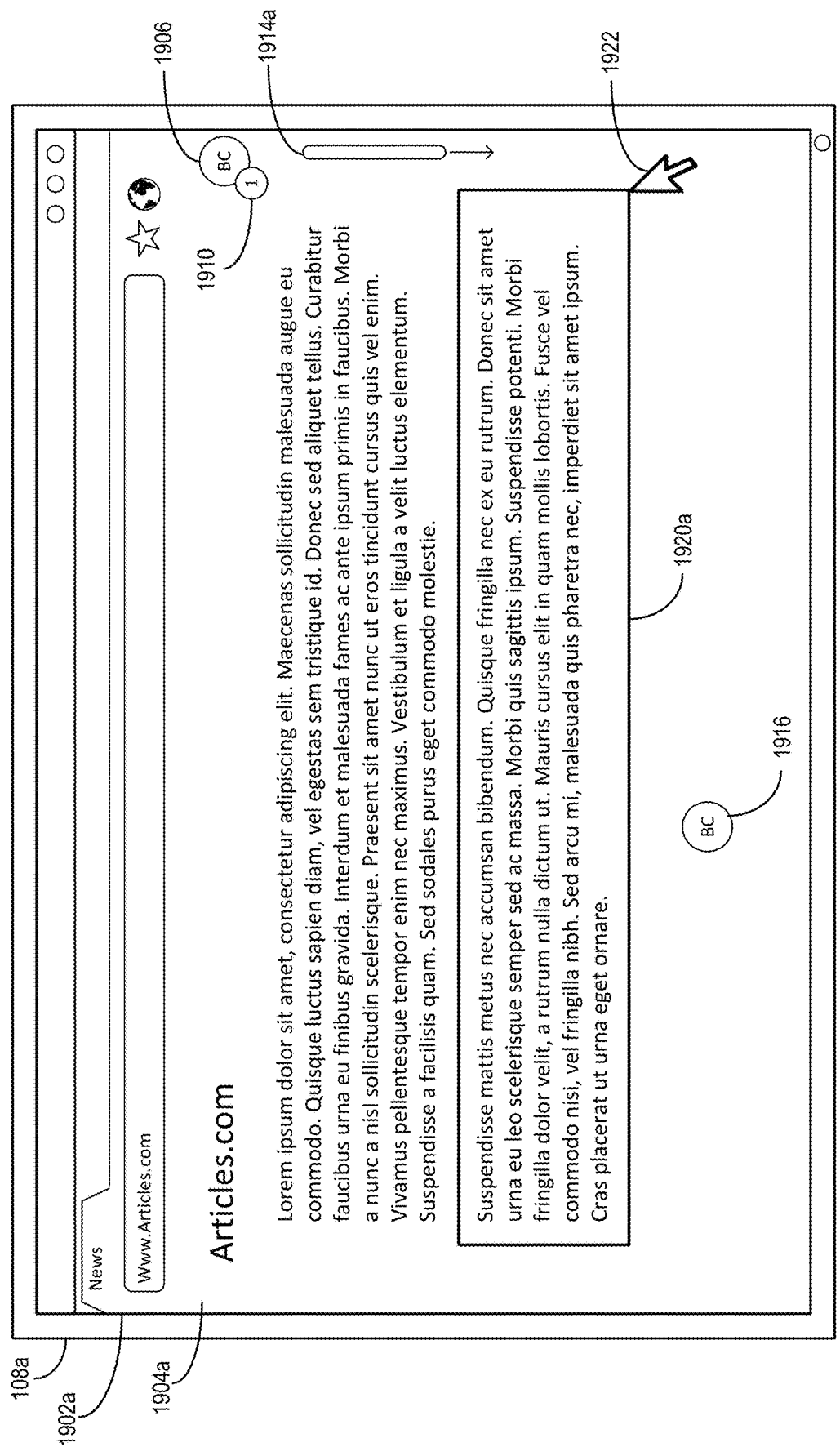
FIGS. 19A-19B illustrate a series of example shared browsing graphical user interfaces in accordance with one or more embodiments.
Figure 19B:
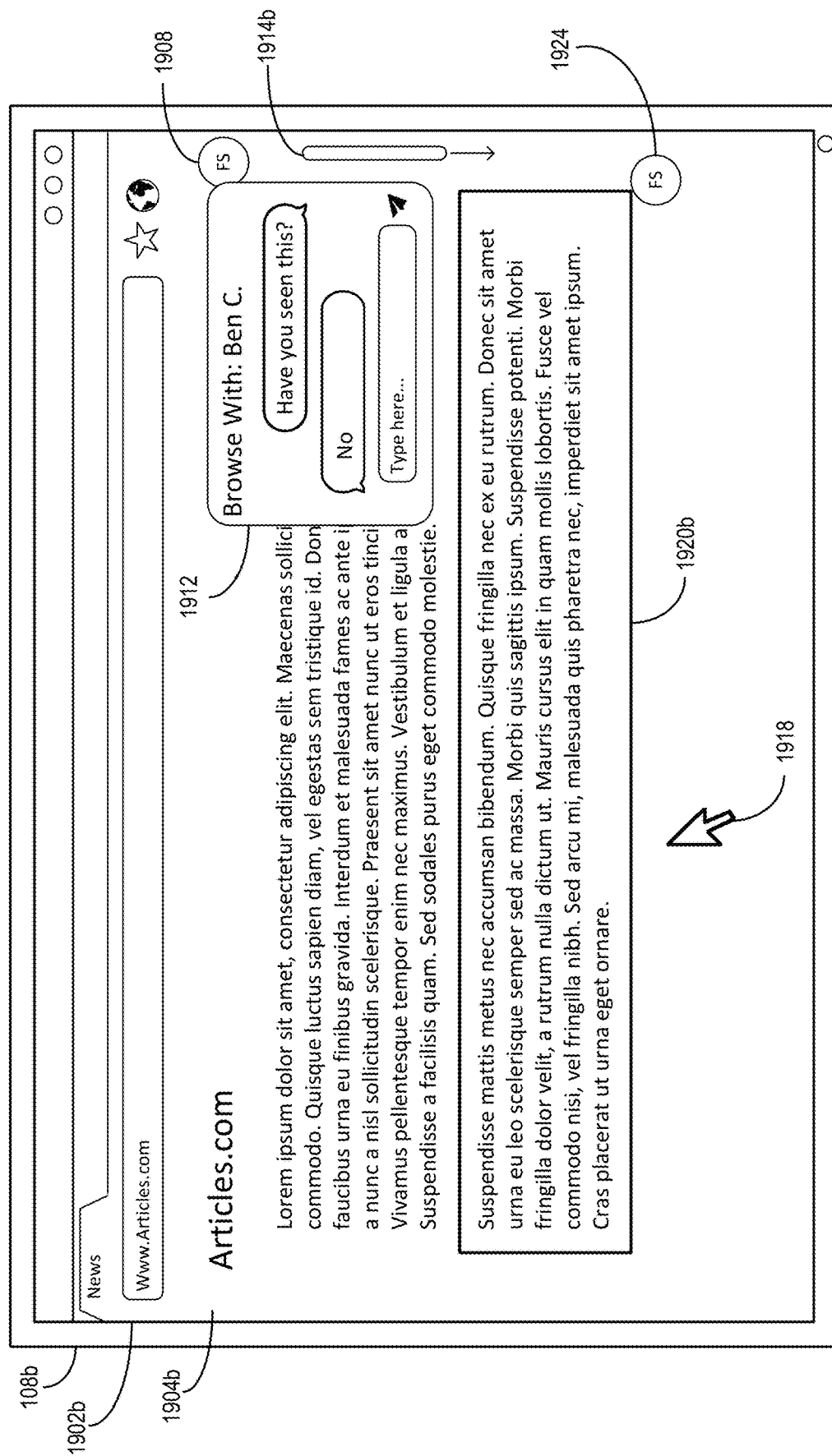

In at least one embodiment, the contextual hub system 116 adds content to the group space 1712 based shared browsing. For instance, as illustrated in FIG. 17A, the contextual hub system 116 presents a shared browsing element 1732. Based on detected selection of the shared browsing element 1732, the contextual hub system 116 generates and shares a shared browsing experience by which the collaborating users may simultaneously view and interact with web-accessible content. FIGS. 18 and 19 and the corresponding discussion provide additional detail regarding shared browsing.

As illustrated in FIG. 17A, the contextual hub system 116 can present viewership notifications that indicate a viewing status via the contextual hub management graphical user interface 1704. For instance, the contextual hub system 116 can present a viewership notification together with specific content within the contextual hub. In at least one embodiment, the viewership notifications comprise a "not seen" icon, a "present" icon, and a "seen" icon. The "not seen" icon reflects that the user has not yet accessed the content. The "present" icon reflects that a user is currently viewing or accessing the content. The "seen" icon reflects that the user has accessed but is not currently viewing the content.

To illustrate, in FIG. 17A, the contextual hub system 116 can indicate that a user is currently viewing content by presenting a user icon with a bold border. For instance, the contextual hub management graphical user interface 1704 displays the present icons 1718a-1718b next to the shared content link 1722a to indicate that the users "TK" and "KS" are currently viewing or accessing the corresponding shared content. Likewise, the present icon 1718e next to the shared content link 1722b indicates that the user "ML" is currently viewing the corresponding shared content.

As illustrated in FIG. 17A, the contextual hub system 116 presents seen icons 1720a-1720d to indicate that users have seen but are not currently viewing the content. For example, the seen icons 1720a-1720d can comprise user icons with a dashed border. As illustrated, the contextual hub system 116 indicates that the user "ML" has seen but is not currently viewing the shared content corresponding to the shared content link 1722a, and the users "KS," "ML," and "BE" have seen but are not currently viewing the shared content corresponding to the shared content link 1722b.

As mentioned, the contextual hub system 116 may also indicate that a user has not yet accessed content within the contextual hub. In some embodiments, the contextual hub system 116 presents a "not seen" icon. In other embodiments, and as illustrated in FIG. 17A, the contextual hub system 116 indicates that a user has not yet accessed (e.g., "not seen") content by not associating a user's icon with content. For instance, the contextual hub system 116 indicates that the user "BE" has not selected the shared content link 1722a by excluding the "BE" user icon in conjunction with the shared content link 1722a.

The contextual hub system 116 may separately log a group history and a private history. As illustrated in FIG. 17A, the contextual hub system 116 presents the group history 1706 and the private history 1708. In at least one embodiment, the contextual hub system 116 adds content to the group history 1706 based on detecting that a collaborating user has navigated from or closed the content from within the group space 1712. Similarly, the contextual hub system 116 adds content to the private history 1708 based on detecting that the user has navigated from or closed the content from within the private space 1714.

As further illustrated in FIG. 17A, the contextual hub system 116 may conduct a search based on user interaction with a search element 1730. In particular, the contextual hub system 116 may search contents of a contextual hub. Additionally, the contextual hub system 116 may limit a search to content within the group space 1712 and/or the private space 1714. The contextual hub system 116 can also conduct a search of a group and/or private history.

Though not illustrated in FIG. 17A, the contextual hub system 116 may organize content within a contextual hub using various other subcategories. For instance, instead of or in addition to group and private subcategories, the contextual hub system 116 may organize content into content-based subcategories. To illustrate, the contextual hub system 116 may divide the contextual hub 1710 into a subcategory for content relating to survey research and an additional subcategory for content relating to survey examples. The contextual hub system 116 can further designate the subcategories as including shareable group content or individual private content. As previously discussed, the contextual hub system 116 may associate different collaborating users and permissions with each of the subcategories. For instance, the contextual hub system 116 can grant, to the collaborating user Timmy and within the survey project contextual hub 1710, viewing permissions within a "survey research" subcategory, editing permissions within a "survey examples" subcategory, and no permissions (i.e., entirely exclude Timmy as a collaborating user) from a "mock surveys" subcategory.

In addition to facilitating the sharing of content to a group of collaborating users, the contextual hub system 116 may also send content to individual users. FIG. 17B illustrates an example communication element 1740 presented by the contextual hub system 116 for sending direct messages to individual collaborating users. In particular, the contextual hub system can send content to an individual user based on interaction with the communication element 1740. As illustrated, the communication element 1740 includes a message content element 1742, third-party messaging source icons 1746a-1746b, contextual hub icon 1748, and additional sources icon 1750.

The contextual hub system 116 may present the communication element 1740 based on user interaction with collaborating user icons 1744a-1744d listed within the collaborating users element 1716 of a contextual hub management graphical user interface. In at least one embodiment, the contextual hub system 116 presents the communication element 1740 based on detecting that a user has dragged content onto one of the collaborating user icons 1744a-1744d within the collaborating users element. For instance, and as illustrated in FIG. 17B, the contextual hub system 116 presents the communication element 1740 based on detecting that the user dragged content from the contextual hub to the collaborating user icon 1744d. Thus, the contextual hub system 116 can send the content to the user account corresponding with the collaborating user icon 1744d.

The contextual hub system 116 may send the content to a collaborating user within the contextual hub. For instance, and as illustrated in FIG. 17B, the contextual hub system 116 presents the contextual hub icon 1748. Based on detecting selection of the contextual hub icon 1748, the contextual hub system 116 sends the content to the collaborating user corresponding to the collaborating user icon 1744d. The contextual hub system 116 can provide, at a client device associated with the collaborating user, a notification of the received content. For instance, as illustrated in FIG. 17B, the collaborating user icon 1744a includes a notification indicating that the collaborating user "TK" has sent a message to the user.

Additionally, the contextual hub system 116 can send content to a collaborating user via a third-party source. In particular, the contextual hub system 116 can access and send messages via third-party electronic messaging and third-party instant messaging sources. For example, as illustrated in FIG. 17B, the contextual hub system 116 can send the content via a third-party electronic messaging system based on user selection of the third-party messaging source icon 1746a and/or via a third-party instant messaging system based on user selection of the third-party messaging source icon 1746b.

The contextual hub system 116 may also send content to a collaborating user via various other types of third-party sources. For instance, the contextual hub system 116 may send content via a third-party contextual graphing source or another third-party source with messaging capabilities. As illustrated in FIG. 17B, based on user selection of the additional sources icon 1750, the contextual hub system 116 presents additional options for sending the content via a third-party source.

As further illustrated in FIG. 17B, the contextual hub system 116 enables a user to customize a message including the content. For instance, the communication element 1740 includes the message content element 1742. The contextual hub system 116 may automatically populate the message content element 1742 with a message. The user may change the automatically generated message within the message content element 1742. Furthermore, although FIG. 17B illustrates the inclusion of a link to the content within the message content element 1742, the contextual hub system 116 may utilize various other methods for communicating the content. For example, the contextual hub system 116 can generate a link to the content within the contextual hub. Thus, the selection of the link brings the selecting user to the contextual hub management graphical user interface wherein the selected content is highlighted or otherwise emphasized.

As mentioned, the contextual hub system 116 can create shared browsing sessions in which two or more users may simultaneously access and interact with web-accessible content. FIGS. 18 and 19 provide additional detail regarding shared browsing sessions provided by the contextual hub system 116. In particular, FIG. 18 illustrates a sequence diagram of the contextual hub system 116 performing acts in accordance with one or more embodiments. FIG. 19 illustrates example shared browsing graphical user interfaces in accordance with one or more embodiments.

FIG. 18 and the corresponding disclosure provide details for creating a shared browsing experience. Generally, the contextual hub system 116 creates a shared browsing experience and connects multiple users within a single browsing experience. More particularly, the contextual system monitors browsing events reported from individual client devices and replicates those events in the browsers of other users.

As illustrated in FIG. 18, the client device 108a detects selection of a shared browsing experience (1802). In particular, the client device 108a may receive a selection of a shared browsing element (e.g., the shared browsing element 1732 of FIG. 17A) via the client application 110. As part of detecting selection of the shared browsing experience (1802), the client device 108a also receives a selection of one or more users. For example, as illustrated in FIG. 18, the client device 108a receives a selection of a user account associated with the client device 108*b*. Thus, the client device 108*a* sends a notification indicating the detected selection to the contextual hub system 116.

Based on receiving a notification of the detected selection of the shared browsing experience, the contextual hub system 116 links the browsing experience (1804). In particular, the contextual hub system 116 generates a group browsing experience and adds the first user associated with the client device 108*a* and the second user associated with the client device 108*b*. As part of linking the browsing experience (1804), the contextual hub system 116 may send a confirmation request to the client device 108*b* to confirm that the user associated with the client device 108*b* would like to join the shared browsing experience. In at least one embodiment, the contextual hub system 116 links the browsing experience (1804) by generating and sending shared browsing graphical user interfaces to participating client devices (e.g., the client devices 108*a* and 108*b*).

The client device 108*a* may detect a browsing event (1806). As used herein, the term "browsing event" refers to an action or occurrence within a web browser. In particular, a browsing event includes user-generated events logged during a shared browsing experience that are recognized by a client device to which a client device and/or the contextual hub system 116 may respond. For example, browsing events may include mouse (or trackpad) events such as scrolling, mouse movements (including distance and direction), mouse selections (e.g., left and right clicks), or a combination. Furthermore, browsing events may also include keyboard events such as logging keystrokes involving a combination of keys or individual keys.

The client device 108*a* detects a browsing event (1806) via the client application 110. In particular, the client device 108*a* can determine that the browsing event occurs within the window of a web browser and/or a contextual hub graphical user interface. For instance, the client device 108*a* can determine that the user associated with the client device 108*a* is scrolling within a web page, selecting information on a web page, adding annotations, and even navigating to a different web page. As further illustrated in FIG. 18, the client device 108*a* sends a notification 1808 of the browsing event to the contextual hub system 116.

The contextual hub system 116 receives the notification 1808 of the browsing event from the client device 108*a*. Based on receiving the notification 1808, the contextual hub system 116 sends instructions to copy the browsing event (1810) to the client device 108*b*. For instance, based on receiving a notification that the client device 108*a* detected a browsing event in which the user associated with the client device 108*a* scrolled from a first position in a web page to a second position in the web page, the contextual hub system 116 sends instructions to the client device 108*a* to automatically scroll from the first position in the web page to the second position in the web page.

Similarly, the client device 108*b* may detect a browsing event (1812). In particular, the client device 108*b* detects a browsing event (1812) and sends a notification 1814 to the contextual hub system 116 indicating the detected browsing event. For instance, the client device 108*b* can detect a browsing event comprising a user selection of content within a web page.

Based on receiving the notification 1814 indicating the detected browsing event from the client device 108*b*, the contextual hub system 116 sends instructions to copy the browsing event (1816) to the client device 108*b*. For instance, the contextual hub system 116 can send instructions to the client device 108*a* to select the same content within the web page.

Although FIG. 18 illustrates a sequence diagram of the contextual hub system 116 with two client devices (e.g., the client device 108*a* and the client device 108*b*), the contextual hub system 116 may generate a shared browsing experience involving multiple additional users. However, as the contextual hub system 116 adds more users to a shared browsing experience, the contextual hub system 116 may also receive more conflicting browser events. In particular, the contextual hub system 116 may resolve conflicting and/or competing browsing events. For instance, the client device 108*a* may detect a first user scrolling down, and the client device 108*b* may detect a second user scrolling up or navigating to a different web page. In at least one embodiment, the contextual hub system 116 resolves competing browsing events by assigning a higher priority to browsing event notifications received from a particular client device. For example, the contextual hub system 116 can determine to replicate browsing events by the client device 108*a* above browsing events from any other client device. In other embodiments, the contextual hub system 116 assigns a higher priority to browsing events of a specific type. For example, the contextual hub system 116 can prioritize clicking events (e.g., selecting passage) over scrolling events. Additionally, or alternatively, the contextual hub system 116 can designate a first group of users as controlling users and a second group of users as viewing users. For example, the contextual hub system 116 may receive and duplicate browsing signals for the first five (or a selected five) client devices and not receive browsing signals from any additional client devices within the shared browsing experience. The contextual hub system 116 may implement these and other competing signal resolution methods in one or more embodiments.

FIG. 19 illustrates a side-by-side comparison of a shared browsing graphical user interface 1904*a* displayed on a screen 1902*a* of the client device 108*a* and a shared browsing graphical user interface 1904*b* displayed on a screen 1902*b* of the client device 108*b*. In particular, the client device 108*a* is associated with a first user (e.g., associated with the identifier "FS"), and the client device 108*b* is associated with a second user (e.g., associated with the identifier "BC").

As mentioned above, the contextual hub system 116 can replicate browsing events including user mouse movements. For example, as illustrated in FIG. 19, the shared browsing graphical user interface 1904*a* displays a first user pointer 1922 at a first position. The contextual hub system 116 replicates browser events that of the first user pointer 1922 at the shared browsing graphical user interface 1904*b* of the client device 108*b* by displaying a second user pointer indicator 1924 at the first position.

The contextual hub system 116 can also replicate browsing events including user scrolling events. For example, as illustrated in FIG. 19, the contextual hub system 116 can detect a downward scrolling event via the shared browsing graphical user interface 1904*a* at the client device 108*a*. The shared browsing graphical user interface 1904*a* indicates the downward scrolling event by presenting a scroll element 1914*a* in a downward motion. The contextual hub system 116 replicates the downward scrolling browsing event at the shared browsing graphical user interface 1904*b* on the client device 108*b*. In particular, the shared browsing graphical user interface 1904*b* automatically includes a scroll element 1914*b* in a mirrored downward motion.

Additionally, the contextual hub system 116 can replicate browsing events including addition of annotations. As illustrated in FIG. 19, the addition of annotations includes the addition of a highlight. The client device 108*a* receives, via the shared browsing graphical user interface 1904*a*, a highlight 1920*a* by the first user pointer 1922. The contextual hub system 116 replicates the browsing events at the shared browsing graphical user interface 1904*b* on the client device 108*b* by automatically presenting the highlight 1920*b* and the position of the second user pointer indicator 1924.

In one or more embodiments, the contextual hub system 116 provides a messaging element within the shared browsing graphical user interfaces 1904*a*-1904*b*. In particular, the contextual hub system 116 enables users to communicate with each other as they share a real-time shared browsing experience. For example, the shared browsing graphical user interface 1904 at the client device 108*a* displays a user chat icon 1908 with a chat notification 1910. In particular, the user chat icon 1908, displayed at the client device 108*a* of a first user, indicates messages received from a second user associated with the client device 108*b*. Based on a user selection of the user chat icon 1908, the contextual hub system 116 can present a messaging element. For instance, the shared browser graphical user interface 1904*b* displays a messaging element 1912 and the user chat icon 1908. The messaging element 1912 includes messages sent from active users within the shared browsing experience.

Figure 20:
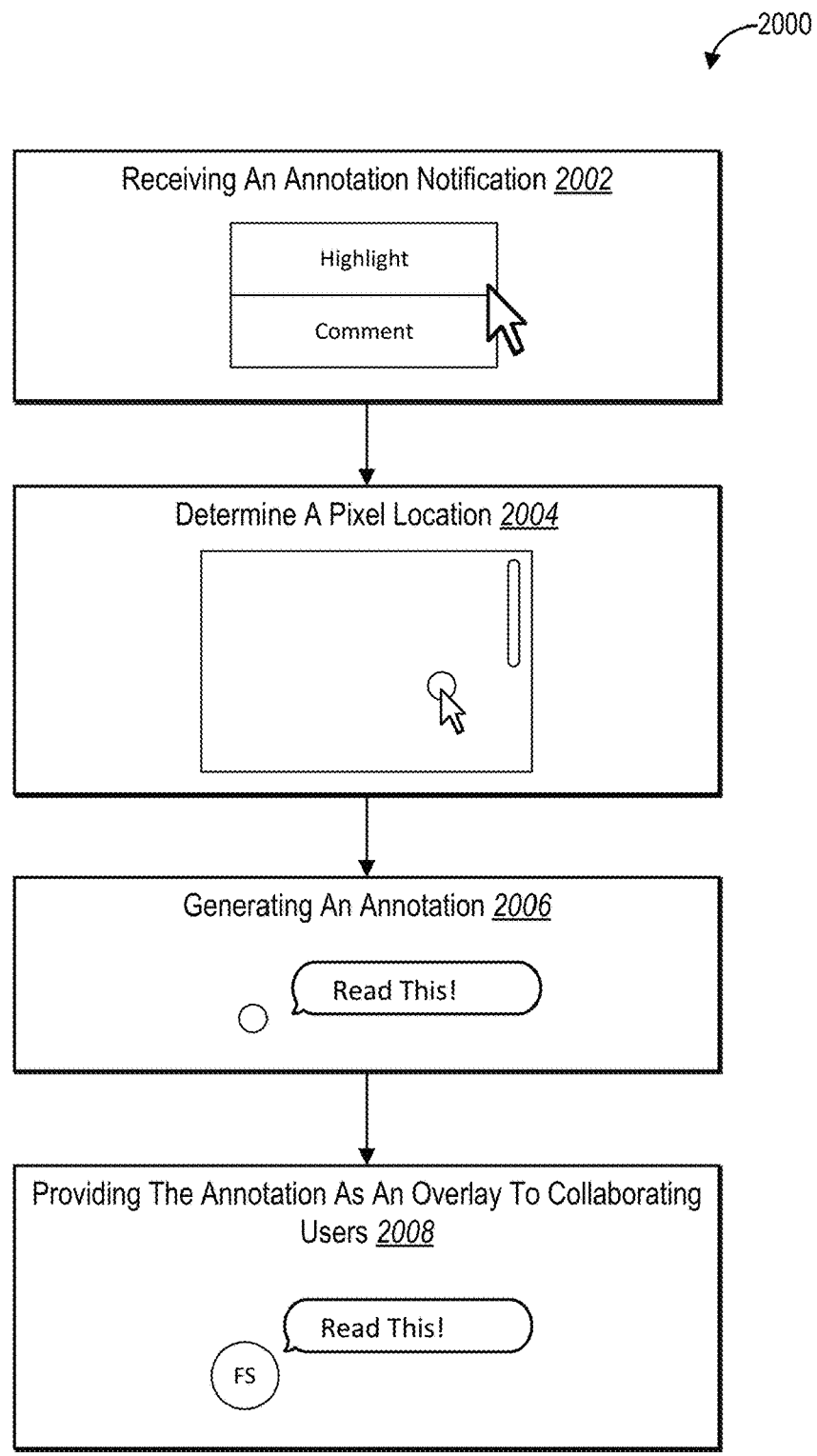
FIG. 20 illustrates a series of acts for providing an annotation on web-accessible content to collaborating users in accordance with one or more embodiments.

In addition to providing collaborating users with a real-time shared browsing experience, the contextual hub system 116 facilitates collaboration by annotating content from third-party sources. In particular, the contextual hub system 116 can add an annotation from a first user on web-accessible content and present the annotation to a second user when the second user accesses the web-accessible content. The contextual hub system 116 may present annotations both in during real-time shared browsing sessions and also outside of real-time shared browsing sessions. For instance, the contextual hub system 116 can create annotations from a first user and present the annotations at a second user's client device at a later time (e.g., whenever the second user accesses the contextual hub). FIG. 20 illustrates an overview of a series of acts 2000 for receiving an annotation from one user and providing the annotation for collaborating users. In particular, the series of acts 2000 comprises an act 2002 of receiving an annotation notification, an act 2004 of determining a pixel location, an act 2006 of generating an annotation, and an act 2008 of providing the annotation as an overlay to collaborating users.

As illustrated in FIG. 20, the series of acts 2000 includes the act 2002 of receiving an annotation notification. In particular, an annotation can comprise a user highlight, comment, or any sort of marker placed on or within content of a third-party source by a user. For instance, a client device can receive an annotation event and send a notification of the annotation event to the contextual hub system 116. In at least one embodiment, the client device presents options to add an annotation (e.g., a highlight or comment) to web-accessible content based on detecting that the user has right clicked the content. The client device may send, together with the notification of the annotation event, data relating to the annotation event including information identifying the annotating user, the location of the annotation, content associated with the annotation (e.g., text within a comment), and other data.

The series of acts 2000 includes the act 2004 of determining a pixel location. In particular, the contextual hub system 116 determines the pixel location of the annotation event. The contextual hub system 116 determines the pixel location so that it can accurately replicate the position of the annotation event relative to the web-accessible content for collaborating users. In at least one embodiment, the contextual hub system 116 analyzes the data relating to the annotation event to determine a pixel location of the annotation event. For example, the contextual hub system 116 can monitor data including the scroll location and the pointer location of the annotating user when the annotating user engaged the annotating event. By analyzing the scroll location and the pointer location, the contextual hub system 116 can identify coordinates for the annotation. In at least one embodiment, the contextual hub system 116 identifies the pixel location of the annotation event on an annotation layer that is separate and independent from the third-party context.

As illustrated in FIG. 20, the contextual hub system 116 performs the act 2006 of generating an annotation. As part of performing the act 2006, the contextual hub system 116 creates the selected annotation by generating annotation data and storing the annotation data with the web-accessible content. For instance, the annotation data can include the pixel location of the annotation, the annotation type (e.g., comment, highlight, etc.), annotation content. In one embodiment, the contextual hub system 116 generates the annotation at the pixel location on the annotation layer.

As part of the series of acts 2000, the contextual hub system 116 performs the act 2008 of providing the annotation as an overlay to collaborating users. In particular, based on detecting that one or more collaborating users accessed the annotated web-accessible content, the contextual hub system 116 accesses annotation data associated with the web-accessible content. In at least one embodiment, based on detecting a collaborating user selection of web-accessible content, the contextual hub system 116 identifies annotation data associated with the web-accessible content and presents the annotation at the pixel location for display to the collaborating user. For instance, the contextual hub system 116 can render the content from the third-party source and overlay the annotation at the pixel location. For example, in at least one embodiment, the contextual hub system 116 provides the annotation by superimposing the annotation layer over the content from the contextual hub system.

Figure 21:
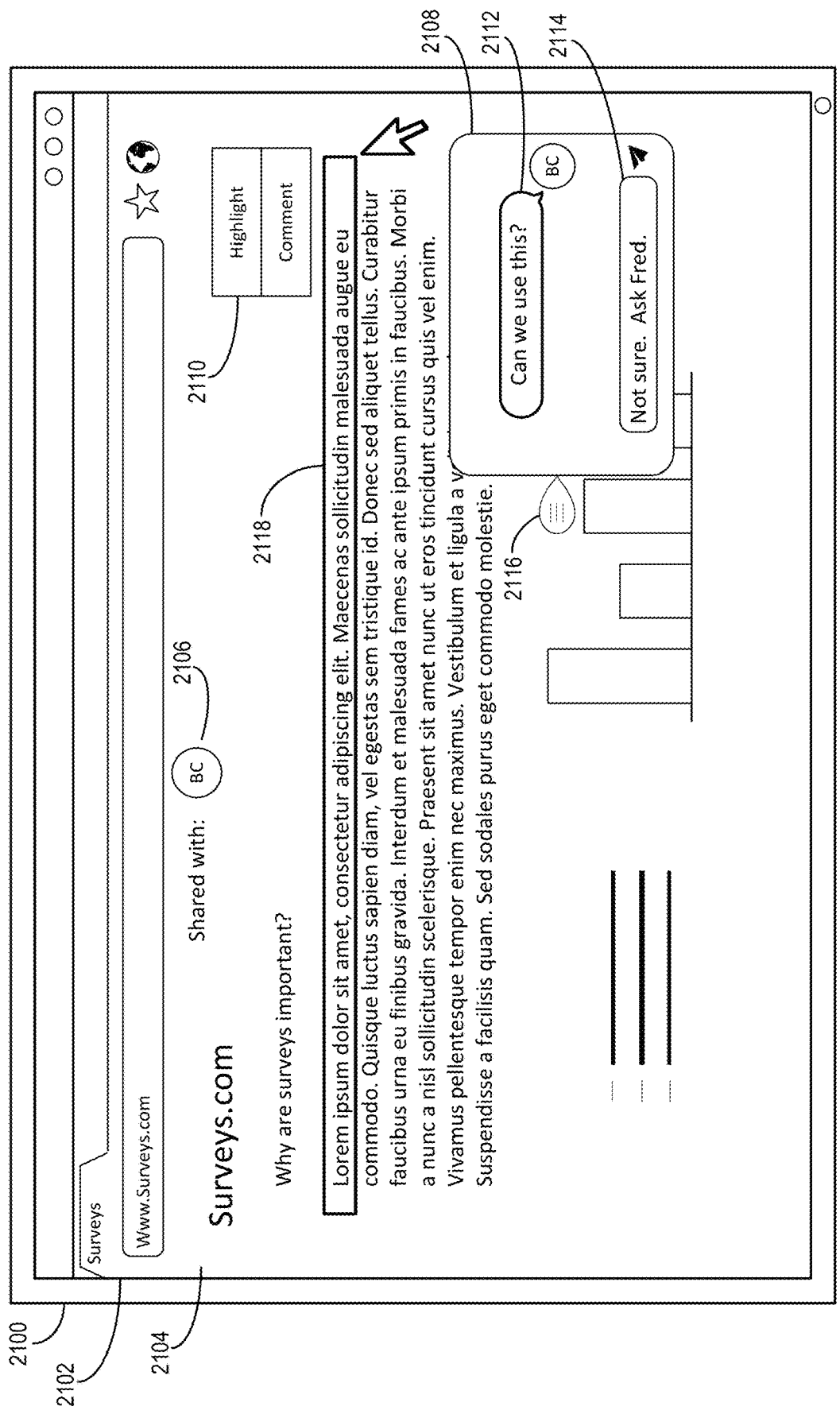
FIG. 21 illustrates an example annotation graphical user interface for receiving and presenting user annotations on web-accessible content in accordance with one or more embodiments.

As discussed, contextual hub system 116 can present user annotations as an overlay over the web-accessible content. For example, based on detecting user selection of shared content (e.g., the shared content links 1722*a*-1722*b* of FIG. 17) at a contextual hub management graphical user interface (e.g., the contextual hub management graphical user interface 1704 of FIG. 17), the contextual hub system 116 can generate and present an annotation graphical user interface. FIG. 21 illustrates an example annotation graphical user interface 2104 presented on screen 2102 of a user device 2100. In particular, the contextual hub system 116 can both add annotations based on user interactions with elements on the annotation graphical user interface 2104 and present annotations at the annotation graphical user interface 2104.

The contextual hub system 116 may receive user annotations via the annotation graphical user interface 2104. In particular, the annotation graphical user interface 2104 presents selectable elements for adding annotations to web-accessible content. In particular, the annotation graphical user interface 2104 includes the web-accessible content. The contextual hub system 116 may receive an annotation event via the annotation graphical user interface 2104. For example, as illustrated in FIG. 21, the contextual hub system 116 receives a user selection 2118 (e.g., a user click and drag gesture) via annotation graphical user interface 2104. Additionally, the contextual hub system 116 can present annotation options to the user via the annotation graphical user interface 2104. For instance, the contextual hub system 116 presents an annotation menu 2110 based on detecting that the user has right clicked. As illustrated, the annotation menu 2110 presents options to add a comment relating to the user selection 2118 or highlight the user selection 2118.

The contextual hub system 116 may also present user annotations via the annotation graphical user interface 2104. For example, and as illustrated in FIG. 21, the annotation graphical user interface 2104 includes a comment indicator 2116. Based on detecting user selection of the comment indicator 2116, the contextual hub system 116 presents a comment dialog element 2108. The comment dialog element 2108 presents user comments made at the pixel location indicated by the comment indicator 2116. Additionally, the contextual hub system 116 can receive additional user annotations via comment dialog element 2108 to create a dialog or conversation between collaborating users. The comment dialog element 2108 includes a collaborating user comment 2112 and a user comment input element 2114. The collaborating user comment 2112 comprises a comment previously added by a collaborating user. The contextual hub system 116 may add a new comment to the comment dialog element based on a user selecting and entering text into the user comment input element.

In at least one embodiment, the contextual hub system 116 indicates, within the annotation graphical user interface 2104 collaborating users who have access to the displayed content. For example, as illustrated in FIG. 21, the annotation graphical user interface 2104 includes a collaborating user indicator 2106 that displays identifying information for collaborating users who have access to the displayed content. More particularly, the collaborating user indicator 2106 displays which collaborating users may add and/or view annotations added to the web-accessible content.

Figure 22A:
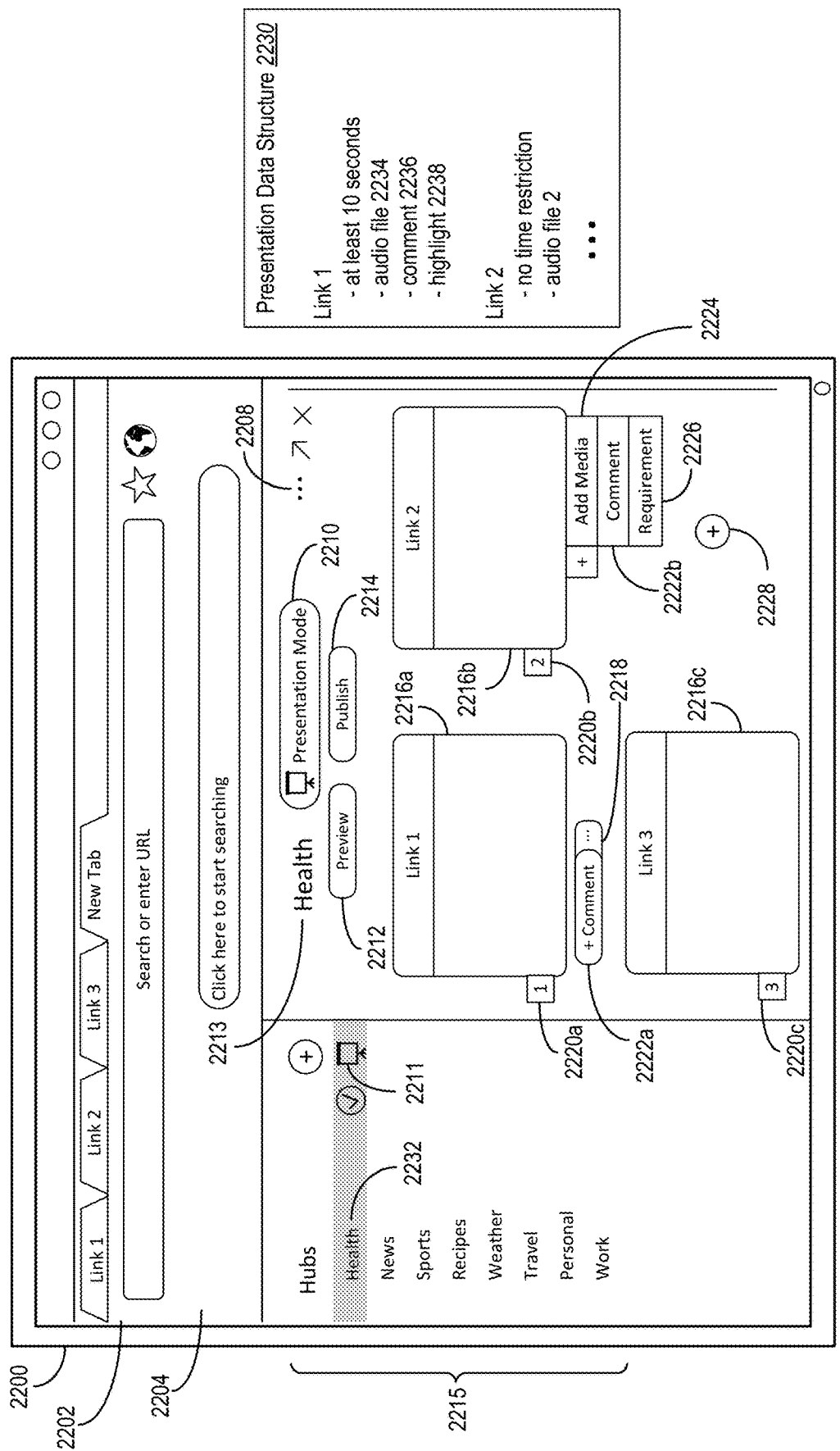
FIGS. 22A-22B illustrate an example presentation creation graphical user interface and an example presentation view graphical user interface in accordance with one or more embodiments.
Figure 22B:
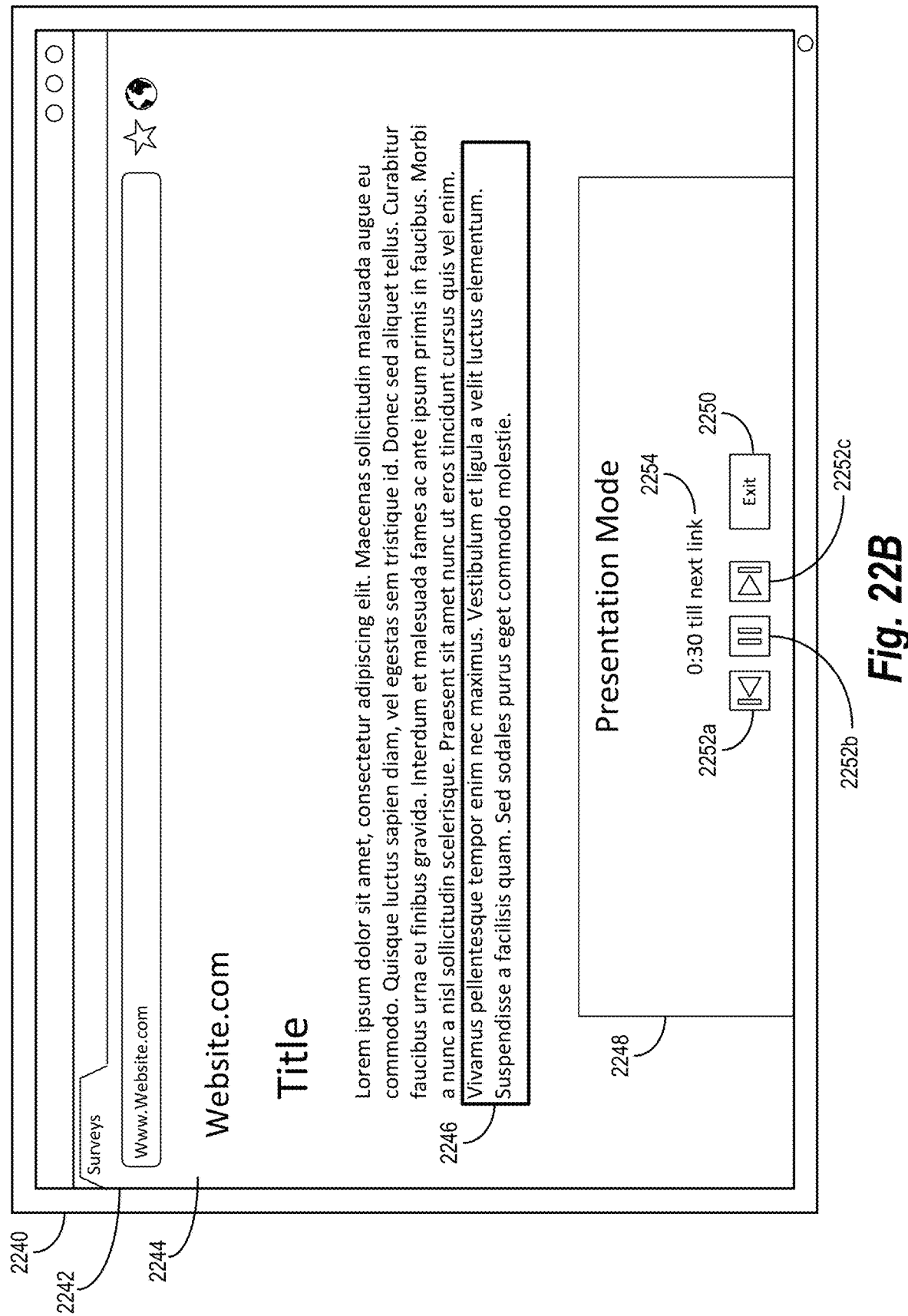

As mentioned previously, the contextual hub system 116 can generate presentations comprising an ordered sequence of web-accessible content. In general, the contextual hub system 116 creates a presentation by generating a presentation data structure that stores an order of web-accessible content, annotations associated with individual content items, presentation requirements, and/or other appended data. FIGS. 22A-22B illustrate an example presentation creation graphical user interface and a presentation view graphical user interface in accordance with one or more embodiments. In particular, FIG. 22A illustrates an example presentation creation graphical user interface and a corresponding presentation data structure presented to a creating user for creating a presentation. FIG. 22B illustrates an example presentation view presented to a viewing user.

FIG. 22A illustrates a presentation creation graphical user interface 2204 on a screen 2202 of a client device 2200 associated with a creating user (i.e., a user managing and ordering a presentation). Generally, the presentation creation graphical user interface 2204 includes web-accessible content 2216a-2216c within a contextual hub 2213, a preview element 2212, and a publish element 2214. As illustrated, the contextual hub system 116 indicates that presentation mode options are available to apply to the contextual hub 2213 by presenting a presentation mode indicator 2210. The contextual hub system 116 may also present a presentation mode icon 2211 within a contextual hub menu 2215 to indicate that the contextual hub 2213 is currently within a presentation mode.

The contextual hub system 116 may present the presentation creation graphical user interface 2204 based on user selection of an additional options element 2208. For instance, the contextual hub system 116 can present a selectable presentation mode option based on selection of the additional options element 2208. Thus, the contextual hub system 116 may efficiently apply presentation mode options to the web-accessible content 2216a-2216c within the contextual hub 2213. Similarly, the contextual hub system 116 may also efficiently remove presentation mode options from the contextual hub 2213.

As illustrated in FIG. 22A, the contextual hub system 116 presents the web-accessible content 2216a-2216c in an ordered sequence. In particular, the contextual hub system 116 indicates the presentation sequence of the web-accessible content 2216a-2216c by displaying order indicators 2220a-2220c. In at least one embodiment, the contextual hub system reorders the web-accessible content 2216a-2216c based on detecting that the creating user drags and drops the any of the web-accessible content 2216a-2216c into a new position.

The contextual hub system 116 may add web-accessible content to the contextual hub 2213 and subsequently the presentation. In at least one embodiment, the contextual hub system 116 can add web-accessible content to the contextual hub 2213 based on user selection of an add web-accessible content element 2228. For instance, based on detecting selection of the add web-accessible content element 2228, the contextual hub system 116 may present options to the creating user to navigate to a web-accessible source, enter the address of a web-accessible source, or otherwise access a desired web-accessible source. Additionally, or alternatively, the contextual hub system 116 adds web-accessible content to the contextual hub 2213 when a user drags and drops web-accessible content from another contextual hub onto or around a contextual hub icon 2232 in the contextual hub menu.

In addition to creating a presentation with an ordered sequence of web-accessible content, the contextual hub system 116 can associate data with the web-accessible content 2216a-2216c. In particular, the contextual hub system can associate annotations, media items, requirement, and other data to present together with the web-accessible content 2216a-2216c to a viewing user. The contextual hub system 116 may add annotations including comments and highlights to the web-accessible content 2216a-2216c. In at least one embodiment, the contextual hub system 116 adds annotations to the web-accessible content 2216a-2216c as described above with respect to FIGS. 20-21. For example, as illustrated in FIG. 22A, the contextual hub system 116 can add a comment to the web-accessible content 2216a based on detecting user selection of a add comment element 2222a. The contextual hub system 116 may add a comment to the web-accessible content 2216a, generally, or to a specific portion within the web-accessible content.

In addition to associating annotations, the contextual hub system 116 may also associate media items with the web-accessible content 2216a-2216c. As described above, media items include audio files, document files, image files, and other types of files. As illustrated in FIG. 22A, the contextual hub system 116 associates media items based on user selection of an add media element 2224. For example, the contextual hub system 116 may add an audio recording to the web-accessible content 2216b. In at least one embodiment, the contextual hub system 116 associates a recording (such as a user describing web-accessible content) with identified web-accessible content.

The contextual hub system 116 may also associate requirements with the web-accessible content 2216a-2216c. In particular, requirements comprise conditions that must be fulfilled or completed when the contextual hub system 116 presents a first web-accessible content before the contextual hub system 116 presents the second web-accessible content. For example, a requirement may dictate that a viewing user view web-accessible content for a threshold amount of time, access a particular section of the web-accessible content, access a threshold proportion of the web-accessible content (e.g., as determined based on scrolling events), or fulfill some other condition. As illustrated in FIG. 22A, based on user selection of an add requirement element 2226, the contextual hub system 116 provides options for user-dictated requirements.

As further illustrated in FIG. 22A, the contextual hub system 116 stores all web-accessible content and associated data within the presentation data structure 2230. For example, the presentation data structure 2230 reflects the order of the web-accessible content 2216a-2216c within the presentation. Furthermore, the contextual hub system 116 stores, within the presentation data structure 2230 data associated with each of the web-accessible content 2216a-2216c. For example, and as illustrated, the contextual hub system 116 associates a time requirement that a viewing user accesses the web-accessible content 2216a (i.e., "Link 1") for at least 10 seconds before proceeding to the web-accessible content 2216b (i.e., "Link 2"). Furthermore, the contextual hub system 116 associates an audio file 2234, a comment 2236, and a highlight 2238 with the web-accessible content 2216a. In at least one embodiment, the contextual hub system 116 can display the presentation data structure 2230 to the creating user via the presentation creation graphical user interface 2204.

Furthermore, the contextual hub system 116 can generate a preview to display to the creating user. As illustrated in FIG. 22A, the presentation creation graphical user interface 2204 includes the preview element 2212. Based on detecting user selection of the preview element 2212, the contextual hub system 116 creates and presents the presentation to the creating user.

The contextual hub system 116 can publish a presentation to viewing users. As illustrated in FIG. 22A, the presentation creation graphical user interface 2204 includes the publish element 2214. Based on user selection of the publish element 2214, the contextual hub system 116 presents options by which the creating user can select viewing users. For example, the contextual hub system 116 can suggest and present particular co-users to the creating user. Based on detecting a selection of viewing users, the contextual hub system 116 can add users as collaborators to the contextual hub 2213. More specifically, the contextual hub system 116 may limit permissions of viewing users to viewing the presentation.

Based on user selection of the publish element 2214, the contextual hub system 116 may present a presentation view graphical user interface at client devices associated with viewing users. FIG. 22B illustrates a presentation view graphical user interface 2244 on a screen 2242 of a client device 2240 associated with a viewing user. The presentation view graphical user interface 2244 displays web-accessible content within a contextual hub. Additionally, the presentation view graphical user interface 2244 includes a presentation view element 2248.

As illustrated in FIG. 22B, the presentation view graphical user interface 2244 displays web-accessible content within a presentation view. In particular, in at least one embodiment, the presentation view graphical user interface 2244 enables a viewing user to interact with web-accessible content. In at least one embodiment, in contrast to a captured screen share file that presents a video or image of fixed content, a viewing user may interact with the web-accessible content presented via the presentation view graphical user interface 2244. In at least one embodiment, the contextual hub system 116 limits the viewing user from deviating from the presentation. For example, the contextual hub system 116 requires the viewing user to view web-accessible content in the dictated presentation sequence and limits the viewing user from navigating to other web pages or web-accessible content excluded from the presentation.

In yet other embodiments, the contextual hub system 116 may generate a presentation by monitoring browsing events from the client device associated with the creating user and replicating the browsing events at the client device associated with the viewing user. In such embodiments, the presentation view graphical user interface 2244 presents web-accessible content to the viewing user while also replicating browsing elements monitored and recorded by the creating user's client device. For instance, the contextual hub system 116 may automatically scroll within the presentation view graphical user interface 2244 to display particular portions of the web-accessible content.

The presentation view graphical user interface 2244 includes data associated with the web-accessible content. In particular, the presentation view graphical user interface 2244 displays annotations associated with the web-accessible content. For example, as illustrated in FIG. 22B, the presentation view graphical user interface 2244 displays a highlight 2246. Though not illustrated, the presentation view graphical user interface 2244 may also include a comment added by the creating user.

Additionally, the presentation view graphical user interface 2244 may indicate data associated with the web-accessible content via the presentation view element 2248. For example, the presentation view element 2248 illustrated in FIG. 22B includes a requirement indicator 2254. The requirement indicator 2254 shows what requirements are associated with the currently viewed web-accessible content. As illustrated, the contextual hub system 116 requires the viewing user to access the currently viewed web-accessible content for at least another 30 seconds. The requirement indicator 2254 may reflect any other type of requirement such as requirements described above with respect to FIG. 22A.

The presentation view element 2248 also provides the viewing user with various interactive elements. As illustrated in FIG. 22B, the presentation view element 2248 includes presentation navigation elements 2252a-2252c and an exit element 2250. The contextual hub system can navigate backward within the presentation based on user selection of the presentation navigation element 2252a, pause the presentation based on user selection of the presentation navigation element 2252b, and navigate forward within the presentation based on user selection of the presentation navigation element 2252c. Furthermore, based on user selection of the exit element 2250, the contextual hub system 116 can quit the presentation and enable to user to freely navigate and interact with the web-accessible content. Though not illustrated, the contextual hub system 116 may subsequently present a resume presentation element with which the viewing user may interact to continue the presentation.

Figure 23:
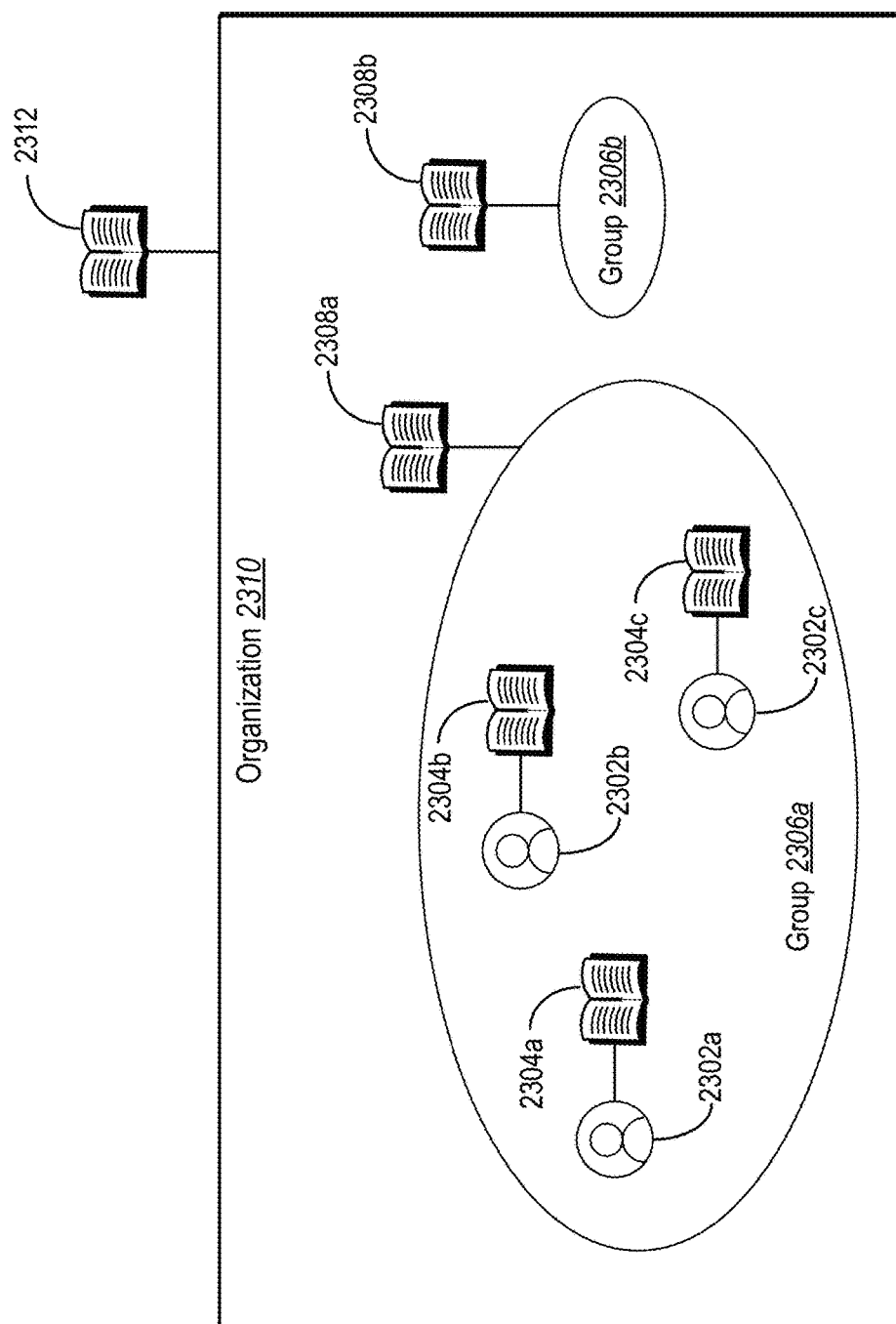
FIG. 23 illustrates various organizational levels for which the contextual hub system can generate private web indexes in accordance with one or more embodiments.

In addition to providing collaborative functionalities such as updating viewing status, creating shared browsing experiences, generating user annotations, and utilizing a presentation mode, the contextual hub system 116 can make possible the indexing of a private web. FIG. 23 illustrates various organizational levels for which the contextual hub system 116 can generate private web indexes. Generally, the contextual hub system 116 may leverage a private web index to personalize web searches and build more accurate contextual models. In particular, a web index comprises web-accessible content that a user or particular group of users has accessed. Based on accessing and analyzing the web index, the contextual hub system 116 can personalize future searches by prioritizing web-accessible content that is similar or related to sources accessed in the past.

Similarly, the contextual hub system 116 can personalize contextual models based on a private web index. For instance, the contextual hub system 116 can modify parameters of a contextual model to identify web-accessible content that is similar or related to web-accessible content within a private web index. Thus, the contextual hub system 116 can more accurately identify contextually relevant information and content to add to a contextual hub.

As mentioned, FIG. 23 illustrates various organizational levels for which the contextual hub system 116 may generate private web indexes. Generally, the contextual hub system 116 can monitor and index web-accessible content for individual users 2302a-2302c, groups 2306a-2306b, and an organization 2310. In particular, the contextual hub system 116 can generate individual web indexes 2304a-2304c corresponding with each of the individual users 2302a-2302c. For example, the contextual hub system 116 catalogs web-accessible content accessed by the individual user 2302a in the individual web index 2304a. Thus, the contextual hub system 116 may personalize web searches and contextual models for the individual user 2302a.

Furthermore, as illustrated in FIG. 23, the contextual hub system 116 may generate group web indexes 2308a-2308b for groups 2306a-2306b. The groups 2306a-2306b may comprise a group of collaborating users within a contextual hub. In some embodiments, the group web indexes 2308a-2308b comprise a combination of individual web indexes. For example, the group web index 2308a can comprise a combination of the individual web indexes 2304a-2304c. Additionally, or alternatively, the group web index 2308a comprises a catalog of web-accessible content accessed via shared contextual hubs. For example, the contextual hub system may exclude, from the group web index 2308a, private web browsing results associated with the individual users 2302a-2302c and include only web-accessible content accessed by the group 2306a as a whole.

The contextual hub system 116 may also generate an organization web index 2312 for the organization 2310. The organization 2310 includes the groups 2306a-2306b. For instance, the organization 2310 can comprise a company or any other meaningful collection of groups. The contextual hub system 116 may generate the organization web index 2312 by compiling the contextual hub system 116 can combine the group web indexes 2308a-2308b to generate the organization web index 2312.

Figure 24:
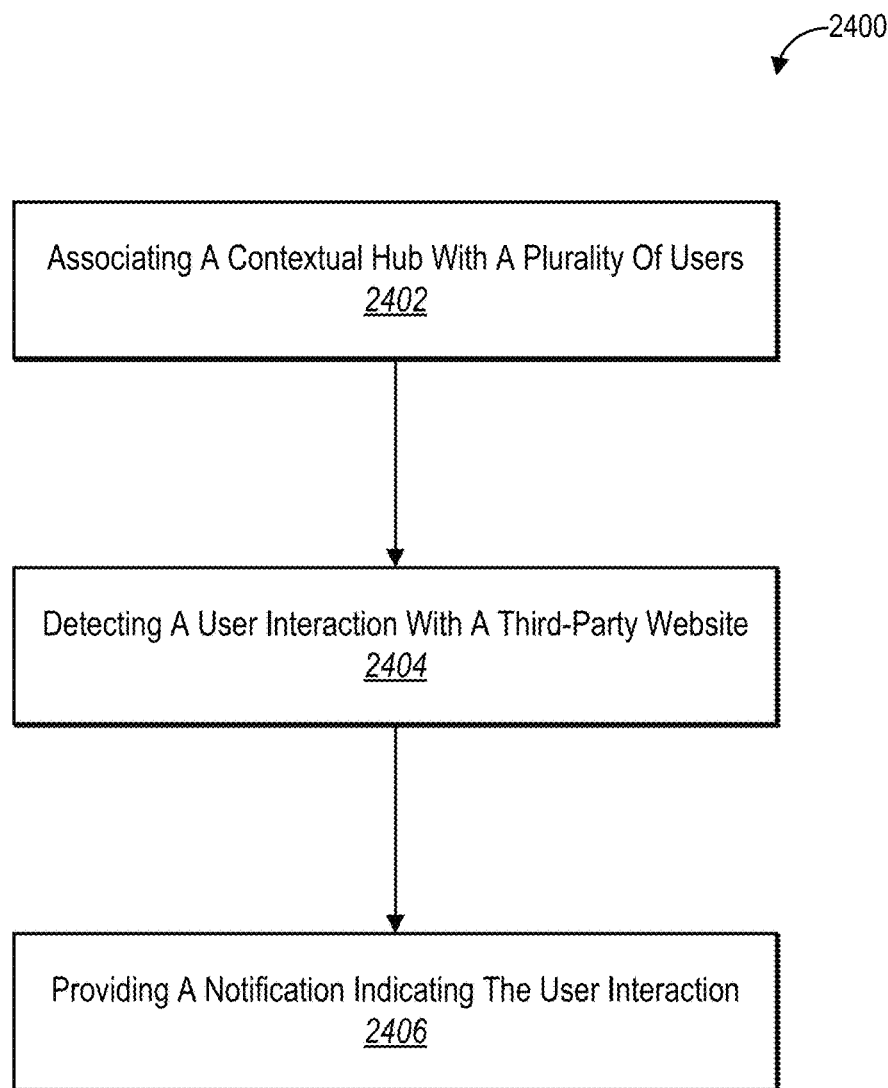
FIG. 24 illustrates a flowchart of a series of acts for providing, for display within a contextual hub, a notification indicating a user interaction with content in accordance with one or more embodiments.

FIGS. 16-23, the corresponding text, and the examples, provide a number of different systems and devices for facilitating collaboration between users. In addition to the foregoing, embodiments of the present disclosure can also be described in terms of flowcharts comprising acts in a method for accomplishing a particular result. For example, FIG. 24 illustrates a flowchart of exemplary methods in accordance with one or more embodiments of the present disclosure. The methods described in relation to FIG. 24 may be performed with fewer or more acts or the acts may be performed in a different order. Additionally, the acts described herein may be repeated or performed in parallel with one another or in parallel with different instances of the same or similar acts.

FIG. 24 illustrates a flowchart of one example method 2400 of providing a notification indicating user interaction. The method 2400 comprises an act 2402 of associating a contextual hub with a plurality of users. In particular, the act 2402 comprises associating a contextual hub with a plurality of users and a plurality of third-party websites. In at least one embodiment, the plurality of third-party websites associated with the contextual hub comprises a contextual grouping of third-party websites.

The method 2400 further comprises an act 2404 of detecting a user interaction with a third-party website. In particular, the act 2404 comprises detecting, from a first client device associated with a first user of the plurality of users, a user interaction with a third-party website from the plurality of third-party websites by the first user. In at least one embodiment, the user interaction of the first user comprises at least one of: viewing the third-party website; or adding an annotation to the third-party website. In one or more embodiments, the act 2404 comprises receiving, from a first client device associated with a first user of the plurality of users, an annotation corresponding to a third-party website from the plurality of third-party websites.

In one or more embodiments, the act 2404 comprises detecting, from a first client device associated with a first user of the plurality of users, the first user viewed a third-party website from the plurality of third-party websites.

The method 2400 also includes an act 2406 of providing a notification indicating the user interaction. In particular, the act 2406 comprises providing, for display at a second client device associated with a second user of the plurality of users and within a graphical user interface corresponding to the contextual hub, a notification indicating the user interaction of the first user with the third-party website. In at least one embodiment, the notification indicating the user interaction indicates that the first user has seen but is not currently viewing the third-party website. In one or more embodiments, the act 2406 comprises providing, to a second client device associated with a second user of the plurality of users for display within a graphical user interface corresponding to the contextual hub, a notification indicating the annotation corresponding to the third-party website.

In one or more embodiments, the act 2406 comprises providing, to a second client device associated with a second user of the plurality of users for display within a graphical user interface corresponding to the contextual hub, a notification indicating the first user viewed the third-party website. In at least one embodiment, the notification indicating the first user viewed the third-party website further indicates that the first user is currently viewing the third-party web site.

The method 2400 can further comprise the acts of receiving, from the first client device associated with the first user, an annotation at the third-party website; and providing the annotation for display at the second client device associated with the second user.

The method 2400 can further comprise the acts of: associating, with the contextual hub, a first website based on receiving a first indication to add the first website from the first client device associated with the first user of the plurality of users; and associating, with the contextual hub, a second website based on receiving a second indication to add the second website from the second client device associated with the second user of the plurality of users.

The method 2400 can further comprise the additional act of generating a group history index comprising a history of websites accessed by the plurality of users associated with the contextual hub. The additional act can further comprise receiving a search request; and generating a plurality of search results based on the group history index.

The method 2400 may comprise the additional acts of: receiving a selection of a shared browsing experience option involving the plurality of users; receiving, from the first client device associated with the first user of the plurality of users, a notification of a browsing event; and sending instructions to replicate the browsing event to a plurality of client devices associated with the plurality of users.

The method 2400 may comprise the additional acts of: receiving, from the first client device associated with the first user, an indication of a selection of a real-time shared browsing experience; providing, for display at the second client device associated with the second user and at the first client device, a shared browsing graphical user interface including the website; receiving, from the first client device, a browsing event; and providing the browsing event for display at the second client device. The method 2400 may further comprise the additional acts of: detecting the second client device associated with the second user has accessed the third-party website; and providing the annotation for display in conjunction with the third-party website. In at least one embodiment, providing the annotation for display in conjunction with the third-party website comprises overlaying the annotation on the third-party website in a defined position with respect to content within the third-party website.

The method 2400 may comprise the additional acts of receiving, from the first client device associated with the first user, an annotation corresponding to content on the third-party website; determine a pixel location of the content on the third-party website; and providing, based on the annotation and the pixel location, the annotation as an overlay on the third-party website for display at the second client device associated with the second user.

Figure 25A:
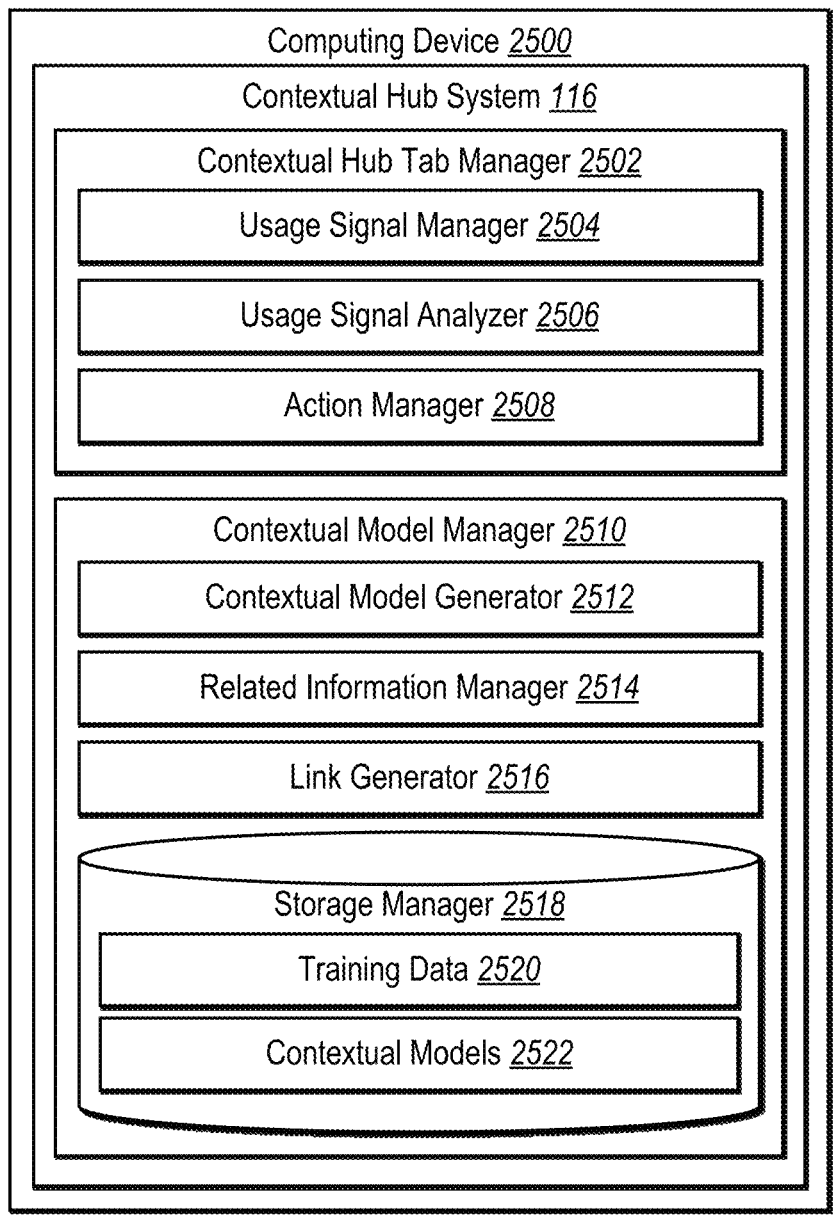
FIGS. 25A-25B illustrate example contextual hub systems in accordance with one or more embodiments.
Figure 25B:
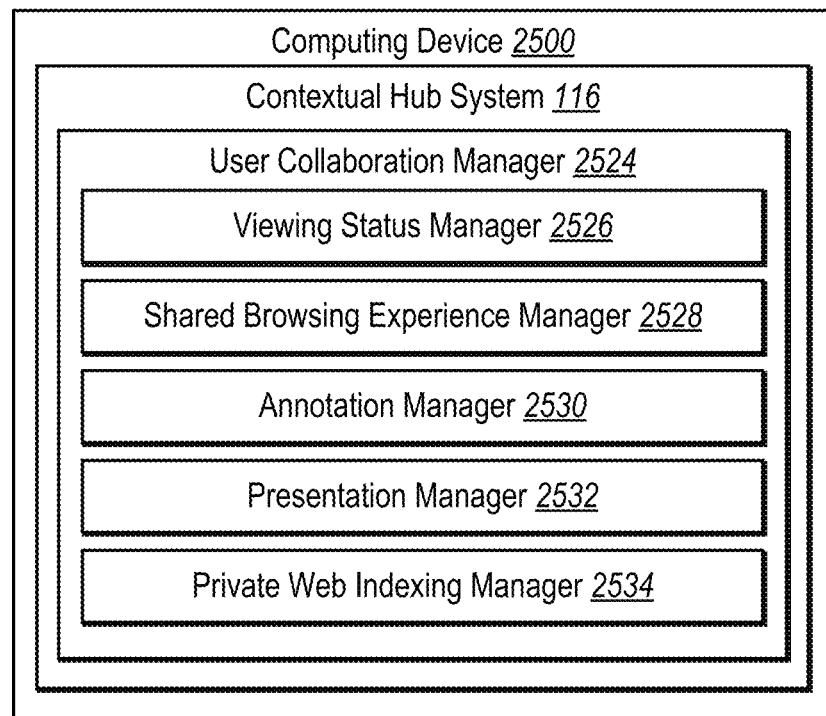

FIGS. 25A-25B illustrate schematic diagrams of the contextual hub system 116 located on a computing device 2500 (e.g., one or more of the client devices 108a-108n and/or the server(s) 102). In particular, as illustrated in FIG. 25A, the contextual hub system 116 includes a contextual hub tab manager 2502 and the contextual model manager 2510. As further shown in FIG. 25B, the contextual hub system 116 may include a user collaboration manager 2524.

As illustrated in FIG. 25A, the contextual hub system 116 includes a contextual hub tab manager 2502. The contextual hub tab manager 2502 includes a usage signal manager 2504, a usage signal analyzer 2506, and an action manager 2508. Generally, the contextual hub tab manager 2502 organizes and manages tabs within a contextual hub. For instance, the contextual hub tab manager 2502 can move tabs containing to web-accessible content between windows corresponding to individual contextual hubs.

As illustrated, the contextual hub tab manager 2502 includes the usage signal manager 2504. In particular, the usage signal manager 2504 accesses and monitors usage signals associated with a tab of the contextual hub. More specifically, the usage signal manager 2504 accesses usage signals including view frequency, time last accessed, content type, time viewed, or other user-defined signals.

The contextual hub tab manager 2502 includes the usage signal analyzer 2506. In particular, the usage signal analyzer 2506 analyzes usage signals and determines actions to perform based on the usage signals. For instance, the usage signal analyzer 2506 can associates particular usage signals with specific actions. Thus, based on identifying a set of usage signals, the usage signal analyzer 2506 can determine to perform one or more actions with respect to a tab of the contextual hub.

The contextual hub tab manager 2502 also includes the action manager 2508. The action manager 2508 performs determined actions with respect to a tab of a contextual hub. In particular, the contextual hub tab manager 2502 may communicate with the usage signal analyzer 2506 to identify a determined action. The action manager 2508 may perform the action on the tab of the contextual hub.

As further illustrated in FIG. 25A, the contextual hub system 116 also includes the contextual model manager 2510. In particular, the contextual model manager 2510 includes a contextual model generator 2512, a related information manager 2514, a link generator 2516, and a storage manager 2518.

As illustrated in FIG. 25A, the contextual model manager 2510 includes the contextual model generator 2512. The contextual model generator 2512 trains and/or otherwise generates a contextual model corresponding to a contextual hub. In particular, the contextual model generator 2512 can analyze contextual information of content within a contextual hub. Additionally, or alternatively, the contextual model generator 2512 can analyze user information to generate a predicted contextual model.

The contextual model manager 2510 also includes the related information manager 2514. The related information manager 2514 identifies information or content from web-accessible sources that is related to content within a contextual hub. The related information manager 2514 can further determine to add the related information to a contextual hub. In one embodiment, the related information manager 2514 can identify related information existing within a contextual hub. Additionally, the related information manager 2514 may also identify related information that has not yet been added to a contextual hub.

As further illustrated in FIG. 25A, the contextual model manager 2510 includes the link generator 2516. In particular, the link generator 2516 generates a link to related information. More specifically, the link generator 2516 adds the generated link to the contextual hub.

The contextual model manager 2510 also includes the storage manager 2518. The storage manager 2518 can further include training data 2520 and contextual models 2522. The training data 2520 includes all training data required to train machine learning models implemented by the contextual hub system 116. For instance, the training data 2520 includes training contextual information, training web-accessible content, and ground truth relevance data required to train a contextual machine learning model. Furthermore, the training data 2520 includes training user methods and ground truth contextual models used in training hub proposal machine learning models.

As further illustrated in FIG. 25A, the storage manager 2518 includes the contextual models 2522. In particular, the contextual models 2522 include machine learning models utilized by the contextual hub system 116. For instance, the contextual models 2522 store contextual machine learning models as well as training hub proposal machine learning models. More specifically, the contextual models 2522 also store data relevant to the machine learning models include model parameters.

FIG. 25B illustrates additional components that may be part of the contextual hub system 116. In particular, the contextual hub system 116 includes the user collaboration manager 2524. Generally, the user collaboration manager 2524 manages functionalities for facilitating collaboration between users via a contextual hub. As illustrated in FIG. 25B, the user collaboration manager 2524 includes a viewing status manager 2526, a shared browsing experience manager 2528, an annotation manager 2530, a presentation manager 2532, and a private web indexing manager 2534.

As illustrated in FIG. 25B, the user collaboration manager 2524 includes the viewing status manager 2526. Generally, the viewing status manager 2526 monitors and receives event notification from client devices associated with user accounts connected within a contextual hub. Based on receiving event notifications, the status manager 2526 updates the viewing status of web-accessible content to reflect whether a user has not seen, is present (i.e., currently accessing), or has seen web-accessible content.

The user collaboration manager 2524 includes the shared browsing experience manager 2528. The shared browsing experience manager 2528 links a browsing experience between client devices associated with collaborating users. Furthermore, the shared browsing experience manager 2528 monitors browsing events reported by client devices. The shared browsing experience manager 2528 replicates browsing events to client devices by sending instructions to copy browsing events.

The user collaboration manager 2524 includes the annotation manager 2530. Generally, the annotation manager 2530 manages and generates annotations associated with web-accessible content. In at least one embodiment, the annotation manager 2530 generates an annotation layer including annotations (e.g., highlights and comments) at determined pixel locations. The annotation manager 2530 can superimpose the annotation layer over the web-accessible content to present user annotations at client devices associated with collaborating users within a contextual hub.

The user collaboration manager 2524 includes the presentation manager 2532. Generally, the presentation manager 2532 generates and manages a presentation mode. In particular, the presentation manager 2532 receives input via a client device associated with a creating user. The presentation manager 2532 organizes content in a sequential order based on user input. Additionally, the presentation manager 2532 associates content with presentation data within a presentation data structure. The presentation manager 2532 can manage and present graphical user interfaces including a presentation graphical user interface and a presentation view graphical user interface.

The user collaboration manager 2524 includes the private web indexing manager 2534. The private web indexing manager 2534 stores content accessed within contextual hubs for individuals, groups, and even organizations. More specifically, the private web indexing manager 2534 can create private web indexes for various individuals and groups. Furthermore, the user collaboration manager 2524 communicates the private web indexes for use in generating contextual models and optimizing web searches for individuals, groups, and/or organizations.

In one or more implementations, each of the components of the contextual hub system 116 are in communication with one another using any suitable communication technologies. Additionally, the components of the contextual hub system 116 can be in communication with one or more other devices including one or more client devices described above. It will be recognized that although the components of the contextual hub system 116 are shown to be separate in FIGS. 25A-25B, any of the subcomponents may be combined into fewer components, such as into a single component, or divided into more components as may serve a particular implementation. Furthermore, although the components of FIGS. 25A-25B are described in connection with the contextual hub system 116, at least some of the components for performing operations in conjunction with the contextual hub system 116 described herein may be implemented on other devices within the environment.

The components of the contextual hub system 116 can include software, hardware, or both. For example, the components of the contextual hub system 116 can include one or more instructions stored on a computer-readable storage medium and executable by processors of one or more computing devices (e.g., the computing device 2500). When executed by the one or more processors, the computer-executable instructions of the contextual hub system 116 can cause the computing device 2500 to perform the methods described herein. Alternatively, the components of the contextual hub system 116 can comprise hardware, such as a special purpose processing device to perform a certain function or group of functions. Additionally, or alternatively, the components of the contextual hub system 116 can include a combination of computer-executable instructions and hardware.

Furthermore, the components of the contextual hub system 116 performing the functions described herein may, for example, be implemented as part of a stand-alone application, as a module of an application, as a plug-in for applications including content management applications, as a library function or functions that may be called by other applications, and/or as a cloud-computing model. Thus, the components of the contextual hub system 116 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 26:
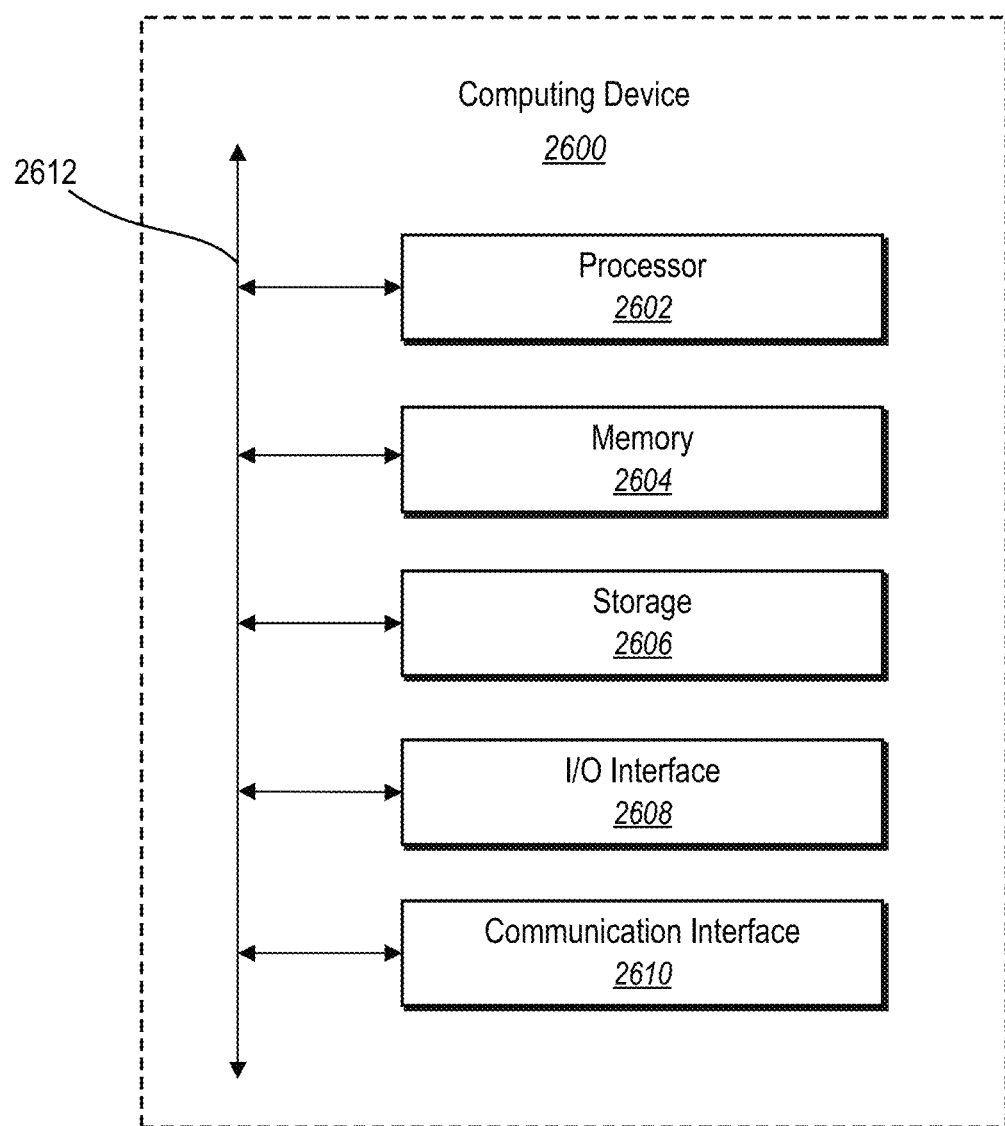
FIG. 26 illustrates a block diagram of an exemplary computing device in accordance with one or more embodiments.

FIG. 26 illustrates a block diagram of exemplary computing device 2600 that may be configured to perform one or more of the processes described above. One will appreciate that server(s) 104, the client devices 108a-108n, and/or the computing device 2600 may comprise one or more computing devices such as computing device 2600. As shown by FIG. 26, computing device 2600 can comprise processor 2602, memory 2604, storage device 2606, I/O interface 2608, and communication interface 2610, which may be communicatively coupled by way of communication infrastructure 2612. While an exemplary computing device 2600 is shown in FIG. 26, the components illustrated in FIG. 26 are not intended to be limiting. Additional or alternative components may be used in other implementations. Furthermore, in certain implementations, computing device 2600 can include fewer components than those shown in FIG. 26. Components of computing device 2600 shown in FIG. 26 will now be described in additional detail.

In particular implementations, processor 2602 includes hardware for executing instructions, such as those making up a computer program. As an example and not by way of limitation, to execute instructions, processor 2602 may retrieve (or fetch) the instructions from an internal register, an internal cache, memory 2604, or storage device 2606 and decode and execute them. In particular implementations, processor 2602 may include one or more internal caches for data, instructions, or addresses. As an example and not by way of limitation, processor 2602 may include one or more instruction caches, one or more data caches, and one or more translation lookaside buffers (TLBs). Instructions in the instruction caches may be copies of instructions in memory 2604 or storage device 2606.

Memory 2604 may be used for storing data, metadata, and programs for execution by the processor(s). Memory 2604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 2604 may be internal or distributed memory.

Storage device 2606 includes storage for storing data or instructions. As an example and not by way of limitation, storage device 2606 can comprise a non-transitory storage medium described above. Storage device 2606 may include a hard disk drive (HDD), a floppy disk drive, flash memory, an optical disc, a magneto-optical disc, magnetic tape, or a Universal Serial Bus (USB) drive or a combination of two or more of these. Storage device 2606 may include removable or non-removable (or fixed) media, where appropriate. Storage device 2606 may be internal or external to computing device 2600. In particular implementations, storage device 2606 is non-volatile, solid-state memory. In other implementations, Storage device 2606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 2608 allows a user to provide input to, receive output from, and otherwise transfer data to and receive data from computing device 2600. I/O interface 2608 may include a mouse, a keypad or a keyboard, a touch screen, a camera, an optical scanner, network interface, modem, other known I/O devices or a combination of such I/O interfaces. I/O interface 2608 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 2608 is configured to provide graphical data to a display for presentation to a user. The graphical data may be representative of one or more graphical user interfaces and/or any other graphical content as may serve a particular implementation.

Communication interface 2610 can include hardware, software, or both. In any event, communication interface 2610 can provide one or more interfaces for communication (such as, for example, packet-based communication) between computing device 2600 and one or more other computing devices or networks. As an example and not by way of limitation, communication interface 2610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 2610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 2610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 2610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 2612 may include hardware, software, or both that couples components of computing device 2600 to each other. As an example and not by way of limitation, communication infrastructure 2612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 27:
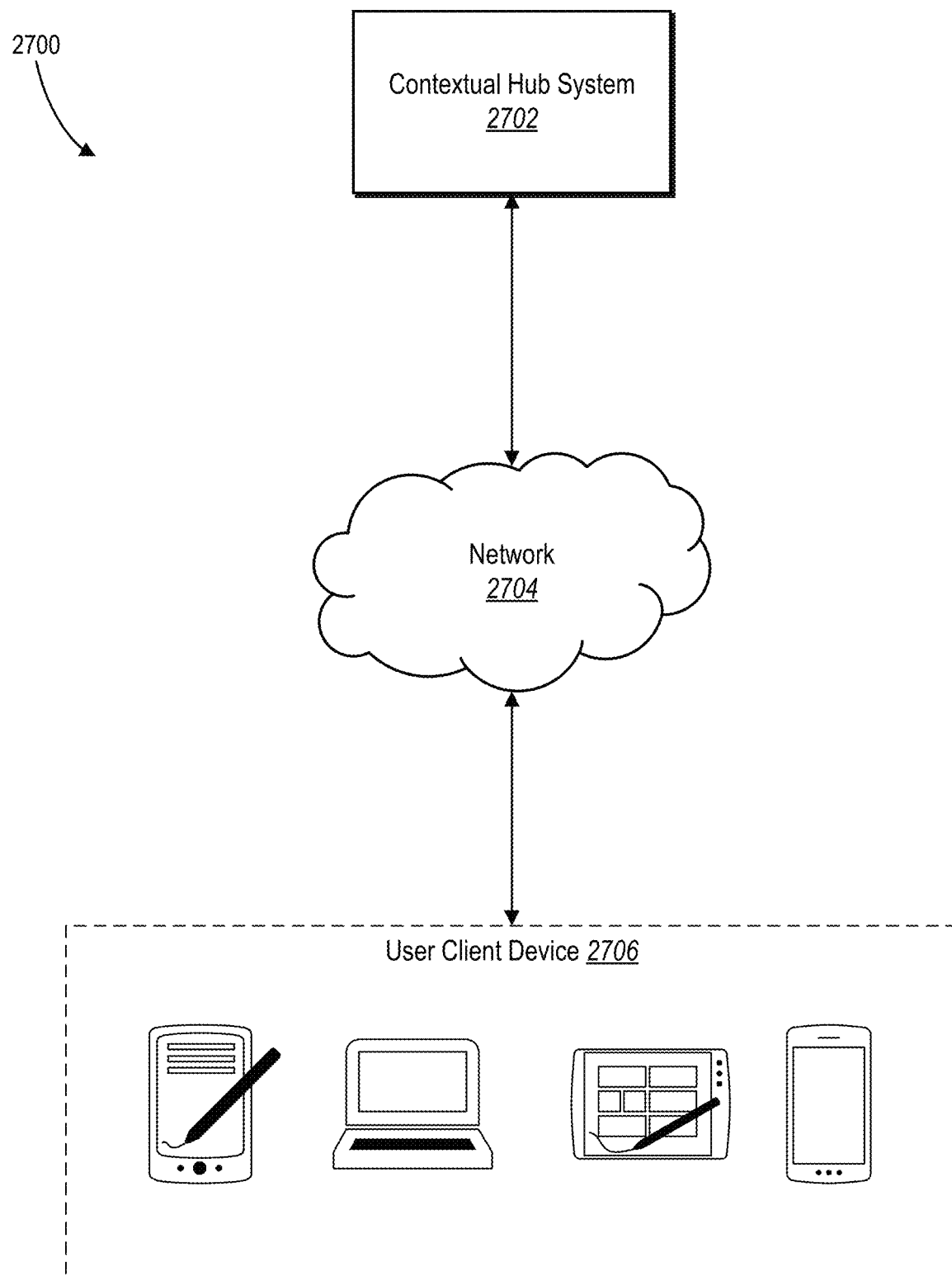
FIG. 27 illustrates a networking environment of a contextual hub system in accordance with one or more embodiments.

FIG. 27 is a schematic diagram illustrating environment 2700 within which one or more implementations of the contextual hub system 116 can be implemented. As discussed above with respect to FIG. 1, in some embodiments the contextual hub system can be part of a content management system. In such cases, the contextual hub system can perform various functions a content management system, as described below. Contextual hub system 2702 may generate, store, manage, receive, and send digital content (such as digital videos). For example, contextual hub system 2702 may send and receive digital content to and from client devices 2706 by way of network 2704. In particular, contextual hub system 2702 can store and manage a collection of digital content. Contextual hub system 2702 can manage the sharing of digital content between computing devices associated with a plurality of users. For instance, contextual hub system 2702 can facilitate a user sharing a digital content with another user of contextual hub system 2702.

In particular, contextual hub system 2702 can manage synchronizing digital content across multiple client devices 2706 associated with one or more users. For example, a user may edit digital content using client device 2706. The contextual hub system 2702 can cause client device 2706 to send the edited digital content to contextual hub system 2702. Contextual hub system 2702 then synchronizes the edited digital content on one or more additional computing devices.

In addition to synchronizing digital content across multiple devices, one or more implementations of contextual hub system 2702 can provide an efficient storage option for users that have large collections of digital content. For example, contextual hub system 2702 can store a collection of digital content on contextual hub system 2702, while the client device 2706 only stores reduced-sized versions of the digital content. A user can navigate and browse the reduced-sized versions (e.g., a thumbnail of a digital image) of the digital content on client device 2706. In particular, one way in which a user can experience digital content is to browse the reduced-sized versions of the digital content on client device 2706.

Another way in which a user can experience digital content is to select a reduced-size version of digital content to request the full- or high-resolution version of digital content from contextual hub system 2702. In particular, upon a user selecting a reduced-sized version of digital content, client device 2706 sends a request to contextual hub system 2702 requesting the digital content associated with the reduced-sized version of the digital content. Contextual hub system 2702 can respond to the request by sending the digital content to client device 2706. Client device 2706, upon receiving the digital content, can then present the digital content to the user. In this way, a user can have access to large collections of digital content while minimizing the amount of resources used on client device 2706.

Client device 2706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 2706 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 2704.

Network 2704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 2706 may access contextual hub system 2702.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   monitor past usage signals associated with a plurality of tabs within a contextual hub, wherein the plurality of tabs is associated with third-party sources, wherein monitoring the past usage signals for a tab comprises analyzing source-specific signals based on content of a source of the tab to determine that the source of the tab comprises an intermediate web page;
   based on determining that the source of the tab comprises an intermediate web page, cause, by the at least one processor, an action to be performed with respect to the first tab, the action comprising closing the tab.

2. The non-transitory computer readable medium as recited in claim 1, wherein monitoring the past usage signals for the tab further comprises analyzing tab-specific signals indicating user interaction with the tab.

3. The non-transitory computer readable medium as recited in claim 2, wherein the tab-specific signals comprise at least one of: a number of times each of the plurality of tabs is accessed, a time each of the plurality of tabs was last accessed, and a total time spent viewing each of the plurality of tabs.

4. The non-transitory computer readable medium as recited in claim 1, further comprising instructions that, when executed by the at least one processor, cause the computing device to:
   generate, by the at least one processor, a plurality of usage scores corresponding to the plurality of tabs based on the past usage signals associated with the plurality of tabs; and
   compare, by the at least one processor, a usage score for a tab of the plurality of tabs with one or more usage scores associated with one or more tabs from the plurality of tabs.

5. The non-transitory computer readable medium as recited in claim 1, wherein:
   analyzing the source-specific signals comprises determining a content type of the source of the tab.

6. The non-transitory computer readable medium as recited in claim 1, further comprising instructions that, when executed by the at least one processor, cause the computing device to determine the action to perform with respect to the tab based in part on user-defined tab management preferences.

7. A method comprising:
   monitoring past usage signals associated with a plurality of tabs within a contextual hub, wherein the plurality of tabs comprise content from a plurality of third-party sources, wherein monitoring the past usage signals for a tab comprises:

analyzing source-specific signals based on content of a source of the tab to determine that the source of the tab comprises an intermediate web page; and based on determining that the source of the tab comprises an intermediate web page, causing an action to be performed with respect to the tab, the action comprising closing the tab.

8. The method as recited in claim 7, wherein monitoring the past usage signals for the tab further comprises analyzing tab-specific signals indicating user interaction with the tab.

9. The method as recited in claim 8, wherein the tab-specific signals comprise at least one of: a number of times each of the plurality of tabs is accessed, a time each of the plurality of tabs was last accessed, and a total time spent viewing each of the plurality of tabs.

10. The method as recited in claim 7, wherein analyzing the past usage signals comprises comparing the past usage signals associated with the tab with past usage signals associated with one or more tabs from the plurality of tabs.

11. The method as recited in claim 7, further comprising presenting a notification to close the tab.

12. The method as recited in claim 7, further comprising determining the action to perform with respect to the tab based in part on user-defined tab management preferences.

13. The method as recited in claim 12, further comprising periodically generating a plurality of usage scores, wherein the plurality of usage scores comprises a content similarity score reflecting a similarity between the content of the source of the tab and contextual information related to a second contextual hub.

14. The method as recited in claim 7, wherein the plurality of third-party sources comprise third-party web pages.

15. A system comprising:
at least one processor; and
a non-transitory computer readable medium comprising instructions that, when executed by the at least one processor, cause the system to:

monitor past usage signals associated with a plurality of tabs within a contextual hub, wherein the plurality of tabs is associated with third-party sources wherein monitoring the past usage signals for a tab comprises analyzing source-specific signals based on content of a source of the tab to determine that the source of the tab comprises an intermediate web page; and based on determining that the source of the tab comprises an intermediate web page, cause, by the at least one processor, an action to be performed with respect to the tab, the action comprising closing the tab.

16. The system as recited in claim 15, wherein monitoring the past usage signals for the tab further comprises analyzing tab-specific signals indicating user interaction with the tab.

17. The system as recited in claim 16, wherein the tab-specific signals comprise at least one of: a number of times each of the plurality of tabs is accessed, a time last each of the plurality of tabs was last accessed, and a total time spent viewing each of the plurality of tabs.

18. The system as recited in claim 15, further comprising instructions that, when executed by the at least one processor, cause the system to:
generate a plurality of usage scores corresponding to the plurality of tabs based on the past usage signals associated with the plurality of tabs; and
compare, by the at least one processor, a usage score for a tab of the plurality of tabs with one or more usage scores associated with one or more tabs from the plurality of tabs.

19. The system as recited in claim 15, wherein analyzing the source-specific signals comprises determining a content type of the source of the tab.

20. The system as recited in claim 15, further comprising instructions that, when executed by the at least one processor, cause the system to determine the action to perform with respect to the first tab based at least in part on user-defined tab management preferences.

* * * * *